(12) United States Patent
Catthoor et al.

(10) Patent No.: US 7,831,951 B2
(45) Date of Patent: *Nov. 9, 2010

(54) TASK CONCURRENCY MANAGEMENT DESIGN METHOD

(75) Inventors: Francky Catthoor, Temse (BE); Peng Yang, Leuven (BE); Chun Wong, Leuven (BE); Paul Marchal, Blanden (DE); Aggeliki Prayati, Athens (GR); Nathalie Cossement, Rekkem (BE); Rudy Lauwereins, Winksele (BE)

(73) Assignees: Interuniversitair Microelektronica Centrum (IMEC), Leuven (BE); Katholieke Universiteit Leuven, Leuven (BE); University of Patras, Patras (GR)

( * ) Notice: Subject to any disclaimer, the term of this patent is extended or adjusted under 35 U.S.C. 154(b) by 654 days.

This patent is subject to a terminal disclaimer.

(21) Appl. No.: 11/761,275

(22) Filed: Jun. 11, 2007

(65) Prior Publication Data
US 2007/0245273 A1 Oct. 18, 2007

Related U.S. Application Data

(63) Continuation of application No. 09/935,789, filed on Aug. 22, 2001, now Pat. No. 7,234,126.

(60) Provisional application No. 60/227,339, filed on Aug. 23, 2000.

(51) Int. Cl.
*G06F 17/50* (2006.01)
(52) U.S. Cl. .............................. 716/18; 716/1
(58) Field of Classification Search ............... None
See application file for complete search history.

(56) References Cited

U.S. PATENT DOCUMENTS

| | | | |
|---|---|---|---|
| 5,202,975 A | 4/1993 | Rasbold et al. |
| 5,327,561 A | 7/1994 | Choi et al. |
| 5,594,864 A | 1/1997 | Trauben |
| 5,664,193 A | 9/1997 | Tirumalai |
| 5,742,814 A | 4/1998 | Balasa et al. |
| 5,930,510 A | 7/1999 | Beylin et al. |
| 5,978,509 A | 11/1999 | Nachtergaele et al. |

(Continued)

OTHER PUBLICATIONS

Al-Furiah et al., "Memory Hierarchy Management for Interactive Graph Structures", Proceedings, IEEE International Symposium on Parallel and Distributed Processing, Mar.-Apr. 1998.

(Continued)

*Primary Examiner*—Leigh Marie Garbowski
(74) *Attorney, Agent, or Firm*—Knobbe Martens Olson & Bear LLP

(57) ABSTRACT

A system and method of designing digital system. One aspect of the invention includes a method for designing an essentially digital system, wherein Pareto-based task concurrency optimization is performed. The method uses a system-level description of the functionality and timing of the digital system. The system-level description comprises a plurality of tasks. Task concurrency optimization is performed on said system-level description, thereby obtaining a task concurrency optimized system-level description, including Pareto-like task optimization information. The essentially digital system is designed based on said task concurrency optimized system-level description. In one embodiment of the invention, the description is includes a "grey-box" description of the essentially digital system.

55 Claims, 34 Drawing Sheets

U.S. PATENT DOCUMENTS 6,064,819 A     5/2000    Franssen et al.
6,078,745 A     6/2000    De Greef et al.
6,151,705 A    11/2000   Santhanam

OTHER PUBLICATIONS

Al-Mouhamed, M., et al., "A Heuristic Storage for Minimizing Access Time of Arbitrary Data Patterns", IEEE Transactions on Parallel and Distributed Systems, vol. 8, No. 4, Apr. 1997, pp. 441-447.
Balasa, F., et al., "Dataflow-Driven Memory Allocation for Multi-Dimensional Signal Processing Systems", Proceedings IEEE International Conference on Computer Aided Design, San Jose, CA, pp. 31-34, Nov. 1994.
Catthoor et al., "Global Communication and Memory Optimizing Transformations for Low Power Signal Processing Systems", IEEE workshop on VLSI signal processing, 1994, pp. 178-187.
Catthoor et al., "System-Level Data-Flow Transformations for Power Reduction in Image and Video Processing", Proceedings of the Third IEEE International Conference on Electronics, Circuits and Systems, 1996, pp. 1025-1028.
Catthoor, "Power-Efficient Data Storage and Transfer Methodologies: Current Solutions and Remaining Problems", IEEE Computer Society Workshop on VLSI System Level Design, 1998, 7 pages.
Catthoor et al., "Proposal for Unified System Design Meta Flow in Task-Level and Instruction-Level Design Technology Research for Multi-Media Applications", Proceedings on the 11$^{th}$ International Symposium on System Synthesis, pp. 89-95, Dec. 1998.
Chen, Tien-Fu et al., A Hierarchical Memory Directory Scheme via Extending SCI for Large Scale Multiprocessors, High Performance Computing on International Superhighway, Apr.-May 1997, pp. 18-23.
Danckaert et al., "System Level Memory Optimization for Hardware-Software Co-Design", Proceedings of the Fifth International Workshop on Hardware/Software Co-Design, 1997, pp. 55-59.
De Greef, E., et al., "Mapping Real-Time Motion Estimation Type Algorithms to Memory Efficient, Programmable Multi-Processor Architectures", Microprocessing and Microprogramming, 41(5): 409-423, Oct. 1995.
De Greef, E., et al., "Memory Size Reduction Through Storage Order Optimization for Embedded Parallel Multimedia Applications", International Parallel Processing Symposium (IPPS) in Proceedings Workshop on Parallel Processing and Multimedia, Geneva, Switzerland, pp. 84-98, Apr. 1997.
Diguet et al., "Formalized Methodology for Data Reuse Exploration in Hierarchical Memory Mappings", International Symposium on Low Power Electronics and Design (IEEE Cat. No. 97TH8332), pp. 30-35, Aug. 1997.
Eles, P., et al., "Scheduling of Conditional Process Graphs for the Synthesis of Embedded Systems", Proc. 1$^{st}$ ACM/IEEE Design and Test in Europe Conf., Paris, France, pp. 132-128, Feb. 1998.
Fang, J., et al., "An Iteration Partition Approach for Cache or Local Memory Thrashing on Parallel Processing", IEEE Transactions on Computers, vol. C-42, No. 5, pp. 529-546, May 1993.
Franssen et al., "Control Flow Optimization for Fast System Simulation and Storage Minimization", European Design and Test Conference, 1994, pp. 20-24.
Ha, S., "Compile-Time Scheduling of Dynamic Constructs in Dataflow Program Graphs", IEEE Trans. on Computers, vol. C-47, No. 7, pp. 768-778, Jul. 1997.
Hoang, P., "Scheduling of DSP Programs onto Multiprocessors for Maximum Throughput", IEEE Trans. on Signal Processing, vol. 41, No. 6, Jun. 1993, pp. 2225-2235.
Hong, I., et al., On-Line Scheduling of Hard Real-Time Tasks on Variable Voltage, IEEE International Conf. on Comp. Aided Design, Santa Clara, CA, pp. 653-656, Nov. 1998.
Li, Y., et al., "Scheduling and Allocation on Single-Chip Multiprocessors for Multimedia", IEEE Wsh. on Signal Processing Systems (SIPS), Leicester, UK, pp. 97-106, Nov. 1997, pp. 153-156.

Li, YanBing, et al., "A Task-Level Hierarchical Memory Model for System Synthesis of Multiprocessors", Proceedings, 34$^{th}$ Design Automation Conference, Jun. 1997.
Lippens, P., et al., "Allocation of Multiport Memories for Hierarchical Data Streams", Proceedings IEEE International Conference on Computer Aided Designs, pp. 728-735, Santa Clara, Nov. 1993.
Marchal, P., et al., "Impact of task-level concurrency transformations on the MPEG4 IM1 player for weakly parallel processor platforms", Wsh. on Compilers and Operating Systems for Low Power (COLP'00) in conjunction with Intnl. Conf. on Parallel Arch. And Compilation Techniques (PACT), Philadelphia, PA, Oct. 2000, 6 pages.
Marchal, P., et al., "Dynamic memory oriented transformations in the MPEG4 IM1-player on a low power platform", Proc. Intnl. Wsh. On Power Aware Computing Systems (PACS), Cambridge, MA, pp. 31-40, Nov. 2000.
Moolenaar, et al., "System-Level Power Exploration for MPEG-2 Decoder on Embedded Cores: A Systematic Approach", IEEE Workshop on Signal Processing Systems, 1997, pp. 395-404.
Nachtergaele, L., et al., "Optimization of Memory Organization and Hierarchy for Decreased Size and Power in Video and Image Processing Systems", Proceedings International Workshop on Memory Technology, Design and Testing, San Jose, CA, pp. 82-87, Aug. 1995.
Nachtergaele L., et al., "Low Power Storage Exploration for H.263 Video Decoder, IEEE Workshop on VLSI Signal Processing", Monterey, CA, pp. 114-124, Oct. 1996.
Pinter, S.S., "Register Allocation with Instruction Scheduling A New Approach", ACM SIGPLAN Notices, vol. 28, pp. 248-257, Jun. 1993.
Prayati, A., et al., "Task concurrency management experiment for power-efficient speed-up of embedded MPEG4 IM1 player", Proc. IEEE Conf. on Parallel Proc., Wsh. on Parallel and Distributed Multimedia Systems, Toronto, Canada, pp. 453-460, Aug. 2000.
Sentieys, O., et al., "Memory Module Selection For High Level Synthesis", Proceedings IEEE Workshop on VLSI Signal Processing, Monterey, CA, pp. 272-283, Oct. 1996.
Slock, P., et al., "Fast and Extensive System-Level Memory Exploration for ATM Application", Accepted for Proceedings 10$^{th}$ ACM/IEEE International Symposium on System-Level Synthesis, Antwerp, Belgium, pp. 74-81, Sep. 1997.
Stok, L., "Data Path Synthesis", The VLSI Journal, vol. 18, pp. 1-71, Jun. 1994.
Thoen, F., et al., "Modeling, Verification and Exploration of Task-Level Concurrency in Real-Time Embedded Systems", ISBN 0-7923-7737-0, Kluwer Acad. Publ., Boston, 1999, no page numbers.
Tuck, B., "Raise your Sights to the System Level—Design Report 1997 Paris Forum", Computer Design, pp. 53-74, Jun. 1997.
Verhaegh, W., et al., "Improved Force-Directed Scheduling in High-Throughput Digital Signal Processing", IEEE Transactions on CAD and Systems, vol. 14, No. 8, pp. 945-960, Aug. 1995.
Wong, C., et al., "Task concurrency management methodology to schedule the MPEG-4 IM1 player on a highly parallel processor platform", Proc. Wsh. on Hardware/Software Co-Design (Codes), Copenhagen, Denmark, pp. 170-175, Apr. 2001.
Wuytack, S., et al., "Flow Graph Balancing for Minimizing the Required Memory Bandwidth", IEEE in System Synthesis, 1996 Proceedings, 9$^{th}$ Ed., 1996, pp. 127-132.
Wuytack, S., et al., "Power Exploration for Data Dominated Video Applications", Proceedings IEEE International Symposium on Low Power Design, Monterey, CA, pp. 359-364, Aug. 1996.
Yang, P., et al., "Dynamic Scheduling of Concurrent Tasks with Cost Performance Trade-off", Proc. IEEE Intnl. Conf. on Compliers, Architecture and Synthesis for Embedded Systems (CASES), San Jose, CA, pp. 103-109, Nov. 2000.
Yang, P., et al., "Energy-Aware Runtime Scheduling for Embedded Multi-processor SOCs", IEEE Design and Test of Computers, Special Issue on Application-specific multi-processor mapping, vol. 18, No. 5, pp. 46-58, Sep. 2001.
Yang, P., et al., "Managing Dynamic Concurrent Tasks in Embedded Real-Time Multimedia Systems", invited paper in Proc. 15$^{th}$ ACM/IEEE Intnl. Symp. on System on System-Level Synthesis (ISSS), Kyoto, Japan, pp. 112-119, Oct. 2002.

Code expansion in IM1(2)

Remove constructs that make concurrency analysis difficult

TASK CONCURRENCY MANAGEMENT DESIGN METHOD

RELATED APPLICATION

This Application is a continuing application of, and claims priority to, U.S. patent application Ser. No. 09/935,789, filed Aug. 22, 2001 now U.S. Pat. No. 7,234,126 and titled "Task Concurrency Management Design Method," and U.S. Provisional Patent Application No. 60/227,339, filed Aug. 23, 2000 and titled "Task Concurrency Design Method".

FIELD OF INVENTION

The invention relates to system level hardware-software codesign method especially including the management of concurrent tasks.

BACKGROUND OF THE INVENTION

Semiconductor processing technology nowadays allows complex systems to be integrated on one single chip. A consistent system design technology is in great need to cope with such complexity and with the ever shortening time-to-market requirements (B. Tuck Raise your sights to the system level—design report: '97 Paris forum (round-table discussion). *Computer Design*, pp. 53-74, June 1997.). It should allow to map these applications cost-efficiently to the target realisation while meeting all real-time and other constraints.

The target applications of our task-level system synthesis approach are advanced real-time multi-media and information processing (RMP) systems, such as consumer multimedia electronics and personal communication systems. These applications involve a combination of complex data- and control-flow where complex data types are manipulated and transferred. Most of these applications are implemented with compact and portable devices, putting stringent constraints on the degree of integration (i.e. chip area) and on their power consumption. Secondly, these systems are extremely heterogeneous in nature and combine high performance data processing (e.g. data processing on transmission data input) as well as slow rate control processing (e.g. system control functions), synchronous as well as asynchronous parts, analog versus digital, and so on. Thirdly, time-to-market has become a critical factor in the design phase. Finally, these systems are subjected to stringent real-time constraints (both hard and soft deadlines are present), complicating their implementation considerably.

The platform for these applications include one or more programmable components, augmented with some specialized data paths or co-processors (accelerators). The programmable components run software components, being slow to medium speed algorithms, while time-critical parts are executed on dedicated hardware accelerators.

When looking at contemporary design practices for mapping software (and hardware) on such a platform, one can only conclude that these systems nowadays are designed in a very ad hoc manner (F. Thoen, F. Catthoor, "Modeling, Verification and Exploration of Task-level Concurrency in Real-Time Embedded Systems," ISBN 0-7923-7737-0, Kluwer Acad. Publ., Boston, 1999.) The design trajectory starts by identifying the global specification entities that functionally belong together, called tasks or processes. This step is followed by a manual 'hardware-software partitioning'. Because of separate implementation of the different tasks and of the software and hardware, afterwards a system integration step is inevitable. This manual step performs the 'system/software embedding' and synthesizes the interface hardware, which closes the gap between the software and the hardware component.

The main goal of system/software embedding is to encapsulate the concurrent tasks in a control shell which takes care of the task scheduling (software scheduling in the restricted sense) and the inter-task communication. Task scheduling is an error-prone process that requires computer assistance to consider the many interactions between constraints. Unfortunately, current design practices for reactive realtime systems are ad hoc and not very retargetable. Designers have used real-time operating systems (RTOS) or kernels to solve some of these scheduling problems. Both of RTOSs and kernels assume a specific processor and a particular I/O configuration. Such practices result in poor modularity and limited retargetability, thus severely discourage exploitation of the co-design space. This is the case even if the program is written in a high-level language. Moreover, these RTOSs in fact only provide limited support for real-timeness, and leave satisfaction of the timing constraints to the designer. They can be considered as nothing more than an optimized back-end for performing the task scheduling, and typically they are not integrated in a design framework in which a global specification model serves as entry point.

Existing approaches we will work neither at the detailed white-box task model (see e.g. P. Eles, K. Kuchcinski, Z. Peng, A. Doboli, P. Pop, "Scheduling of conditional process graphs for the synthesis of embedded systems," *Proc. 1st ACM/IEEE Design and Test in Europe Conf.*, Paris, France, pp. 132-138, February 1998. P. Hoang, J. Rabaey, "Scheduling of DSP programs onto multiprocessors for maximum throughput," *IEEE Trans. on Signal Processing*, Vol. SP-41, No. 6, pp. 2225-2235, June 1993.) where all the operations are considered already during the mapping and where too much information is present to allow a thorough exploration, nor at the black-box task model (see e.g. S. Ha, E. Lee, "Compile-time scheduling of dynamic constructs in dataflow program graphs," *IEEE Trans. on Computers*, Vol. C-47, No. 7, pp. 768-778, July 1997. I. Hong, M. Potkonja, M. Srivastava, "On-line scheduling of hard real-time tasks on variable voltage processor," *Proc. IEEE Int. Conf. on Comp. Aided Design*, Santa Clara Calif., pp. 653-656, November 1998. Y. Li, W. Wolf, "Scheduling and allocation of single-chip multiprocessors for multimedia," *Proc. IEEE Wsh. on Signal Processing Systems (SIPS)*, Leicester, UK, pp. 97-106, November 1997. where insufficient information is available to accurately steer even the most crucial cost trade-offs.

Other work P. Eles, K. Kuchcinski, Z. Peng, A. Doboli, P. Pop, "Scheduling of conditional process graphs for the synthesis of embedded systems," *Proc. 1st ACM/IEEE Design and Test in Europe Conf*, Paris, France, pp. 132-138, February 1998.) considers task scheduling as a separate issue from cost. In their work, the assignment to processors with different power or varying supply voltage is either "automatic," i.e., without trade-off between timing and cost, e.g., the processor energy costs, or not treated.

AIM OF THE INVENTION

It is the aim of the invention to present an approach for management of concurrent tasks as part of a system level hardware-software codesign being capable of exploring both timing and processor cost issues with a reasonable complexity.]

SUMMARY OF THE INVENTION

It is an aspect of the invention to incorporate in the design steps of an essentially digital system a two-level scheduling approach. In said approach said description describes the functionality and timing aspects of said digital system and comprises of a set of or plurality of communicating tasks while each of said tasks comprise of a set of or a plurality of nodes. With two-level scheduling approach is meant that first for at least one of said tasks its nodes are scheduled. When scheduling of at least one of said tasks is performed, scheduling of tasks itself is performed. In an embodiment of said two-level scheduling approach scheduling within tasks, thus of task nodes can be denoted static scheduling. Said task scheduling can be denoted dynamic scheduling. The terminology static and dynamic finds its origin in the fact that the so-called grey-box is constructed by placing deterministic, thus rather static behavior in nodes while non-deterministic behavior, thus rather dynamic behavior, is placed in tasks. In an embodiment of said two-level scheduling approach said scheduling within tasks, thus of task nodes includes besides time constraints also cost optimization, more in particular said cost is related to the processors on which said task nodes are executed. Said two-level scheduling includes thus besides ordening of said task nodes, being a typical output of scheduling, also assignment of task nodes to processors. In said two-level scheduling a concurrent architecture with a set or a plurality of processors is assumed. Examples are given for two processor architectures below but the invention is not limited thereto. In an embodiment of said two-level scheduling approach said static scheduling results in a plurality of partial static scheduled description. Said partial static scheduled descriptions or partial static schedule options are further exploited in said dynamic scheduling, meaning that said dynamic scheduling performs a step of selecting for said tasks one of said partial static schedules. Further design of said essentially digital system is then performed based on the partial scheduled description resulting from said dynamic scheduling step. Each static scheduling step generates cost-cycle budget trade-off curves which are exploite by said dynamic scheduling step. Alternatively one can state that said static scheduling step generates scheduling options, being different in cost and cycle budget, each option being related to a particular scheduling of nodes and allocation of nodes on processors. Said dynamic scheduling step selects for each of said tasks one of said options while guaranteeing that said options are compatible, meaning taking into account the limited resources or processors into account. It is an aspect of the invention to incorporate in the design steps of an essentially digital system a step of modifying a description of said essentially digital systems with task concurrency improvement transformations. Said description describes the functionality and timing aspects of said digital system and comprises of a set of or a plurality of communicating tasks while each of said tasks comprise of a set of or a plurality of nodes. The modifying step transforms a first or initial description into a second or improved description. Said transformation are aimed at improving the concurrency between said tasks. With concurrency is meant the ability to execute tasks at least partial in parallel. Often within said first or initial description hiddes that some tasks have concurrent behavior, meaning have the ability to be executed partially simultaneously. So hidding of concurrency is most often due to data dependencies. However often within said first description data dependencies which are not functionally necessary are introduced, thereby preventing concurrency of tasks unnecessary. Said task concurrency improvement transformations comprises of a data dependency removing step while maintaining the functionality of the digital system, possibly by introducing some buffering, meaning introducing some storage space for data. It can be noted that although concurrency improvement of tasks is aimed at, said concurrency improvement steps can have as extra effect that concurrency of nodes within tasks is improved also. In an embodiment said task concurrency improvement transformations are used on said descriptions used in said two-level scheduling approach, more in particular before performing static scheduling. It is an aspect of the invention to recognize that task concurrency management should be performed early in the design flow for designing essentially digital system. With early is meant before hardware-software partitioning, thus before deciding which tasks will be performed by running software on a predefined processor (software implementation) and which tasks will be performed by the running of a dedicated custom, meaning further to be designed, processor. It must be noted that the processor representation used in the schedulings are only abstractions of the later physical realisation of the system. The invention can be formalized as follows: A method for designing an essentially digital system, comprising the steps of:

1. describing the functionality and timing of said digital system in a description being a set of (at least two) or a plurality of thread frames (also denoted tasks), each of said thread frames being a set of (at least two) or a plurality of thread nodes;

2. generating a plurality of static schedulings for at least two of the thread nodes of one of said thread frames;

3. performing a dynamic scheduling on at least two of said thread frames, said dynamic scheduling comprising of selecting for at least one of said thread frames one of said generated plurality of static schedulings, said dynamic scheduling resulting in an at least partial scheduled description; and 4. designing said digital system from said at least partial scheduled description.

The method described above, wherein said essentially digital system being modelled as a set of or a plurality of processors and said generating of a plurality of static schedulings comprising solving of a first time-constraint cost optimization problem wherein thread nodes are assigned to said processors and said cost essentially being related to said processors. The method described above, wherein said generating of a plurality of static scheduling generates cost-cycle budget trade-off curves for at least two thread frames, said cost-cycle budget trade-off curves comprise of points representing said static schedulings. The method described above, wherein said dynamic scheduling comprises of a second time-constraint cost optimization problem. The method described above, wherein said first time-constraint cost optimization optimizes a cost function comprising at least energy consumption of a processor executing a scheduled thread node. The method described above, wherein said second time-constraint cost optimization optimizes a cost function comprising at last energy consumption of a processor Executing a scheduled thread node. The method described above, wherein said generating of static schedulings for a thread frame being capable of modifying the amount of thread nodes within said thread frame. The method describing above, wherein said tasks are communicating. The method described above, wherein non-deterministic behavior of said essentially digital system is described by the dynamical scheduling of the thread frames while the deterministic behavior is modelled inside the thread frames by the static scheduling of the thread nodes. The method described above wherein said designing step comprises the step of partitioning said at least partially scheduled description over a plurality of processors. The method describe above, wherein said designing step comprises the step of performing a hardware/software partitioning step on said at least partially scheduled description. The method described above, wherein before generating said plurality of static schedulings for at least one thread frame a task concurrency improving transformation on said thread frame is performed.

It is a first aspect of the invention to disclose a method for designing an essentially digital system, wherein Pareto-based task concurrency optimization is performed. Within said method a system-level description of the functionality and timing of said digital system, said system-level description comprising of a plurality of tasks, is generated. Task concurrency optimization is performed on said system-level description, thereby obtaining a task concurrency optimized system-level description, including Pareto-like task optimization information. Finally said essentially digital system is designed based on said task concurrency optimized system-level description.

It is a first embodiment of said first aspect to work with a grey-box description within said method.

It is a second embodiment of said first aspect to include within said task concurrency optimized system-level description a real-time operating system, exploiting said Pareto-like task optimization information.

It is a second aspect of the invention to disclose a method for designing an essentially digital system, wherein grey-box task concurrency optimization is performed Within said method a description of the functionality and timing of said digital system is generated, said description being a grey-box system-level description comprising of a plurality of tasks. Task concurrency optimization is performed on said grey-box system-level description, thereby obtaining a task concurrency optimized grey-box system-level description. Finally said essentially digital system is designed based on said task concurrency optimized grey-box system-level description.

It is a first embodiment of said second aspect to work with a Pareto-based approach for optimization.

It is a second embodiment of said second aspect to include within said task concurrency optimized system-level description a real-time operating system.

It is an embodiment of said two aspects to use a grey-box description wherein non-deterministic behavior of said digital system is modeled by interacting of said tasks, while each of said tasks describe part of the deterministic behavior of said digital system.

It is an embodiment of said two aspects to use within said task concurrency optimization a design-time intra-task scheduling performing design-time intra-task scheduling for at least two of said tasks separately, thereby generating a plurality of intra-task schedules for each of said tasks. Said design-time intra-task scheduling is also denoted a first static scheduling.

In a further embodiment thereof said plurality of intra-task schedules is a subset of all possible intra-task schedules, said subset containing essentially only Pareto optimal schedules. This means that in terms of cost—constraint terms, these schedules are withheld with for a certain cost the minimal constraint and for a certain constraint minimal cost. The cost can be the power consumption needed while executing a task on said digital device or an estimate thereof. The constraint can be the time needed for execution of a task on said digital device or an estimate thereof. Said time is also denoted the cycle budget.

In a still further embodiment said digital system is assumed to have at least one processor and said design-time intra-task scheduling takes into account processor power consumption optimization.

In an alternative still further embodiment said digital system is assumed to comprise of a plurality of processors, said design-time intra-task scheduling takes into account processor power consumption optimization, including assignment of tasks to processors.

Hence said task concurrency optimization, and in particular the static or design-time scheduling part thereof, performs a pre-ordering within tasks under real-time constraints while minimizing processor operation costs.

In a particular implementation said static scheduling exploits a mixed integer linear programming (MILP) approach.

In an embodiment of these last two embodiments at least one processor is considered to be a multi supply voltage processor, with either fixed or variable supply voltages.

It is an embodiment of said two aspects of the invention to design after static scheduling a run-time scheduler, being part of a real-time operating system. Said scheduler is capable of performing dynamic scheduling of at least two of said tasks, said dynamic scheduling comprising of selection for at least one of said tasks one of said generated static schedules. Said dynamic scheduling selection is based on cost-constraint information of said generated static schedules. Hence said dynamic scheduling comprises of a second time-constraint cost optimization problem. Said second time-constraint cost optimization optimizes a cost function comprising at least energy consumption of a processor, executing a scheduled task.

In a particular implementation said dynamic scheduling exploits a constraint integer linear programming approach.

Within said two aspects of the invention the concept of tasks is defined as grouping of logical operations, functionally grouped together. With task is meant a real-time task, thus at least partly dynamically created or deleted. Said tasks are typically concurrent, interacting or communicating. A suitable grey-box description can be based on a MTG-CDFG model, wherein the multi-thread graph (MTG) is used for inter-task descriptions and the control data flow graph (CDFG) is used for intra-task descriptions. Said tasks concurrency optimization taking into account only part of the logical operations needed for describing the functionality and timing of said digital system. Said tasks are design-time analyzable parts of said grey-box description.

In an embodiment of the invention said grey-box system-level description comprise of a set of at least two or a plurality of tasks, also denoted thread frames, each of said thread frames being a set of at least two or a plurality of thread nodes. Said thread frame's or task's nodes comprise of logical operations, functionally belonging together.

Within such frame-node description said static or design-time scheduling generates a plurality of static schedulings of at least two of the thread nodes of one of said thread frames. When said essentially digital system is modeled as a set of or a plurality of processors, said generating of a plurality of static schedulings within a task comprising solving of a first time-constraint cost optimization problem wherein thread nodes are assigned to said processors and said cost essentially being related to said processors. Cost-cycle budget trade-off curves are generated for at least two thread frames, said cost-cycle budget trade-off curves comprise of a list of points representing part of all possible said static schedulings, said part being Pareto optimal schedulings in terms of the cost and cycle budget. Said generating of static schedulings for a thread frame can further be capable of modifying the amount of thread nodes within said thread frame.

The invented design method is a system-level design approach, meaning that said task concurrency optimization is performed before hardware/software co-design, hence before it is decided which task will be performed by dedicated hardware or be mapped on a programmable processor. Thus a final hardware/software co-design step follows after task concurrency optimization. Said co-design step will result in a final implementation, whereon a real-time operating system, including a run-time scheduler, using Pareto-like task optimization information for his scheduling activities.

In an embodiment of the invention wherein said grey-box description is obtained by performing task concurrency enabling steps on a first initial description or global specification of said digital system. Said task concurrency enabling steps include automatic grey-box description extraction, obtaining a first initial grey-box description or unified specification. Said task concurrency enabling steps include applying task concurrency improving transformations on said first initial grey-box description or unified specification, thereby obtaining said grey-box description being a task concurrency improved or enabled grey-box description.

In an alternative implementation before said task concurrency optimization dynamic memory management and/or task level DTSE transformations are performed.

BRIEF DESCRIPTION OF THE DRAWINGS

List of Figures
1a Prior Art . . .
1b Embodiment Overview . . .
2 TCM overview . . .
3 TCM run-time scheduler . . .
4 System layer of MPEG4 IM1 player, with several concurrent modules and complex dynamic control constructs . . .
5 System layer of MPEG4 IM1 player, with several concurrent modules and complex dynamic control constructs . . .
6 Illustration of important grey-box model elements . . .
7 A real-life example of a grey-box model extracted from system layer of the MPEG4 IM1-player . . .
8 A global unified system design methodology covering different levels of abstraction with emphasis on the concurrent task related context . . .
9 Global Pareto curve after TCM scheduling and processor allocation/assignment exploration . . .
10 Global Pareto curve after TCM concurrency extraction and transformations . . .
11 Selection of appropriate point on Pareto curves for TCM characterized task clusters, after entering a foreign task cluster from the network . . .
12 System level modules of the MPEG4 IM1 player . . .
13 Increasing the amount of concurrency by breaking data dependencies . . .
14 Comparison between scheduling the original and the transformed graphs . . .
15 Hierachical rewriting hides less important constructs for TCM . . .
16 Hierachical rewriting illustrated on IM1 player . . .
17 Hide undesired constructs without trade-off . . .
18 Code expansion creates freedom for scheduling . . .
19 Code expansion in IM1 (1) . . .
20 Code expansion in IM1 (2) . . .
21 Remove constructs that make concurrency analysis difficult . . .
22 Trade-off complexity/ifreedom must be taken into account (1) . . .
23 Trade-off complexity/freedom must be taken into account (2) . . .
24 Transform constructs that cannot be removed . . .
25 Concurrency analysis focuses on parallelism . . .
26 Remove unused or redundant code . . .
27 Weight-based hiding reduces complexity further with trade-off . . .
28 Partitioning clusters tasks with high interaction . . .
29 An example of a task graph . . .
30 Static scheduling result . . .
31 Dynamic scheduling of two example thread frame . . .
32 The dynamic scheduling of ADSL . . .
33 ADSL digital modem schematic . . .
34 Comparison between scheduling the initial and the second transformed graphs . . .
35 Examples of scheduling the second transformed graph . . .
36 The difference between case 1 and case 2 . . .
37 All possible schedules of the timers in case 3 . . .
38 DM oriented transformations illustrated on the input buffers of the IM1-player . . .
39 Constraints on the task-schedule reducing the DM requirements of a system . . .

LIST OF TABLES

Figures 1A, 1B:
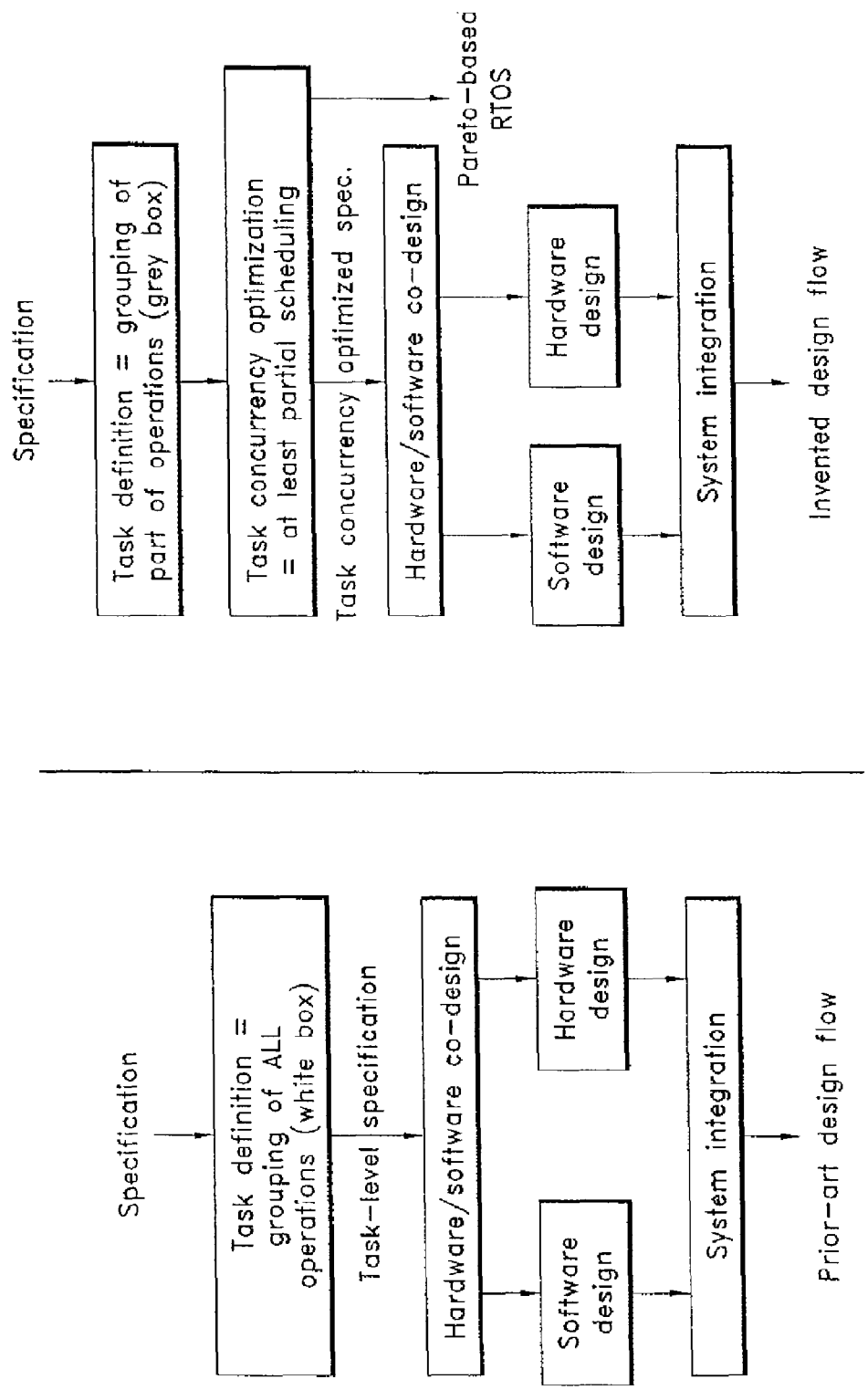

1 Thread nodes performance . . .
2 Two example thread frames . . .
3 Assumption on processors . . .
4 Dead line and execution time of SW tasks . . .
5 Execution time and energy consumption in one TB, case 1 . . .
6 Scheduling result, case 1 . . .
7 Execution time and energy consumption in one TB, case 2 . . .
8 Scheduling result, case 2 . . .
9 Execution time and energy consumption in one TB, case 3 . . .
10 Scheduling result, case 3 . . .
11 Execution time and energy consumption in one TB, case 4 . . .
12 Scheduling, result, case 4 . . .
13 Execution time and energy consumption in one TB, case 5 . . .
14 Scheduling result, case 5 . . .
15 Energy cost of different cases at different working voltages . . .
16 Energy cost of different cases at the same working voltages . . .
17 Execution times and processing energy of most important tasks in IM1-player on a heterogeneous platform with one and two hardware accelerators . . .
18 Memory requirements and memory energy of most important tasks in IM1-player on a heterogeneous platform with one and two hardware accelerators . . .

DETAILED DESCRIPTION OF THE INVENTION

We will first give a broad overview of the steps that we have invented to solve the problems presented in the prior-art. Afterwards we will explain in more detail each of the steps: grey-box model extraction, transformations, static and dynamic scheduling.

Overview

Motivation

From FIG. 1A, one can conclude that there is a lack of methodology and tool support at the system level for the co-design of hardware and software and for the task concurrency management, often resulting in an iterative and error-prone design cycle.

At the top there is a need for an unified specification model with the power to represent system-level abstraction like task concurrency, dynamic task creation, inter-task communication and synchronization, and real-time constraints. The main problem is to close the gap from concurrent, communicating task specification to the actual (usually single-threaded) target processor implementation, without making a compromise on the required real-time performance and with actively considering cost effectiveness (especially energy consumption). A systematic approach towards (software) system design aiming at reducing the design-time and the number of errors and the debugging effort of embedded systems/software, consisting more and more of distributed (software) behavior running and communicating across multiple processors, is mandatory.

Target Application Domain

With reference to FIG. 1b, the target application domain of the task-level system synthesis approach advocated by us is advanced real-time multi-media and information processing (RMP) systems, such as consumer multi-media electronics and personal communication systems. These applications belong to the class of real-time embedded systems involving a combination of complex data- and control-flow where complex data types are manipulated and transferred. Most of these applications are compact and portable devices, putting stringent constraints on the degree of integration (i.e. chip area) and on their power consumption. Secondly, these systems are extremely heterogeneous in nature and combine high performance data processing (e.g. data processing on transmission data input) as well as slow rate control processing (e.g. system control functions), synchronous as well as asynchronous parts, analog versus digital, and so on. Thirdly, time-to-market has become a critical factor in the design phase. Fourthly, these systems are subjected to stringent real-time constraints (both hard and soft deadlines are present), complicating their implementation considerably.

Another major driver for this type of research are applications like the new MPEG4 standard (see FIG. 12), which involves a massive amount of specification code (more than 100K lines of high-level C++ code) and which combines video, synthetic images, audio and speech modules with a system protocol. The IM1 application on which we are focussing is based on the MPEG4 standard, which specifies a system for the communication of interactive audio-visual scenes composed of objects.

Task Concurrency Management at the Grey-Box Level

We propose to look at a new abstraction level of mapping such real-time embedded systems, with emphasis on performance and timing aspects (concurrency management and meeting of the timing constraints or 'timeliness') while minimizing (abstract) processor cost overhead. Our focus lies especially on the task-level abstraction. But in contrast to existing approaches we will work neither at the detailed "white box" task model where all the operations are considered already during the mapping and where too much information is present to allow a thorough exploration, nor at the "black box" task model, where insufficient information is available to accurately steer even the most crucial cost trade-offs. Indeed, in the latter case the tasks are precharacterized by an initial design stage. But during the mapping, these costs and constraint parameters are not updated, which is crucial to obtain a good mapping involving transformations on the internal and I/O behaviour of the tasks.

At our targeted abstraction level the distinction between "hardware synthesis" and "software mapping/synthesis" is practically gone so that all steps in the proposed design trajectory can then be shared for both target types of platforms. That enables a much more global design space exploration than in the traditional way. One of the major consequences is that the system cost can be significantly reduced and tighter timing/performance constraints can be met. In addition, the automation support can be mostly unified, which heavily limits the man-power investment required in research, development and production at this stage.

Figure 6:
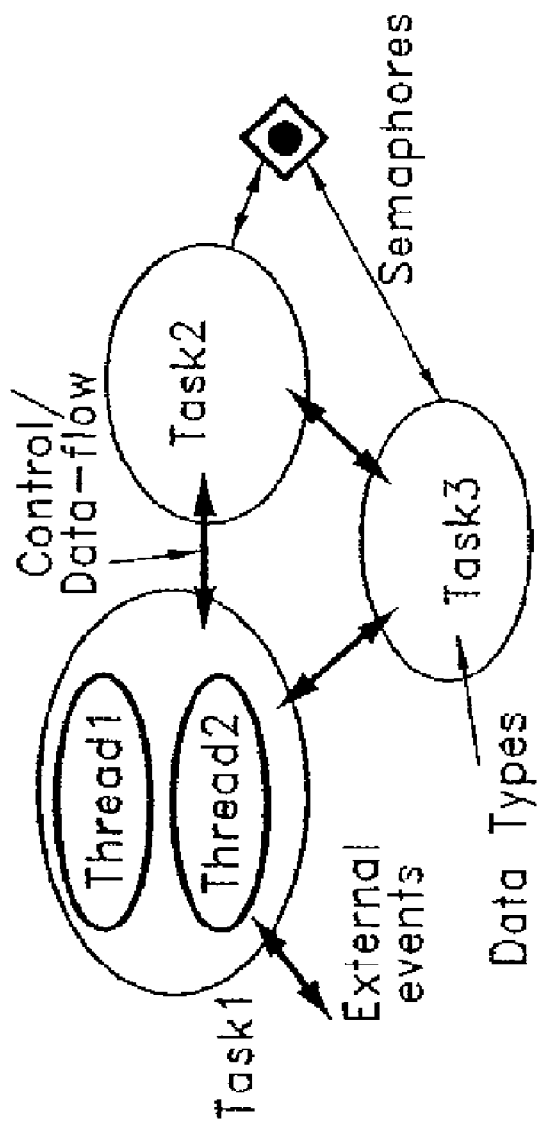
Figure 7:
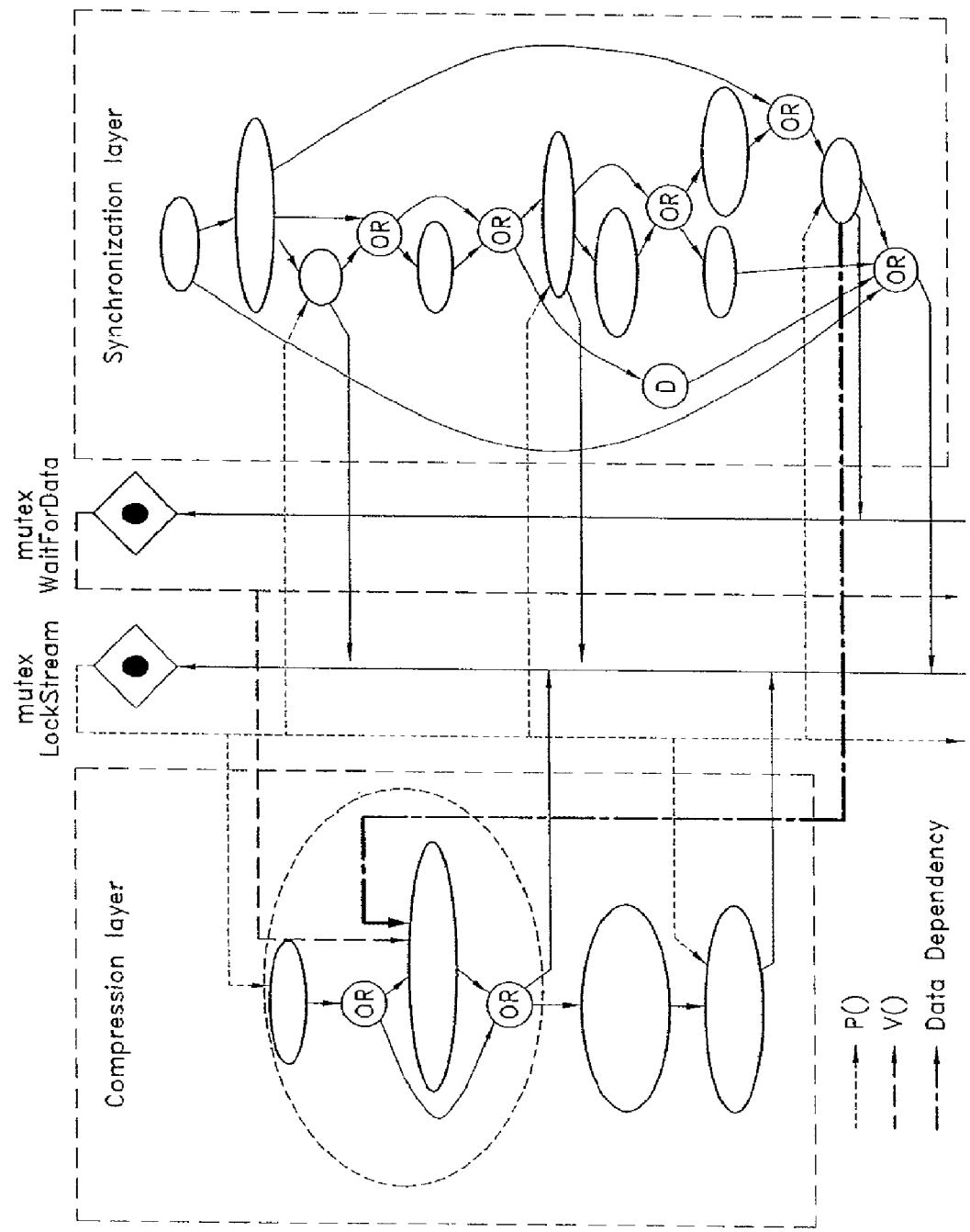

The main problems are:

1. Very complex (software type) specs. So the traditional solutions (white box view approach) fail. Instead we propose to use a grey-box modeling approach where only the essential data types, control/data-flow and dynamic constructs like semaphores and external events are present (see FIG. 6). A real-life example is presented in FIG. 7 On this initial grey-box model, we have to apply task-level transformations to further reduce the complexity and to expose more concurrency.

2. These systems are extremely dynamic due to the inherent user interactivity, the scalability and the presence of agents/applets. So conventional DSP models (derived in the past mostly from the "physical/link" layer of terminals) are not feasible any longer, and these have to be substituted by support of the global dynamic control flow at the grey box level. Instead, we need a model like the multi-tread graph (MTG).

3. Many complex data co-exist where manipulation is more important than the applied operations. Hence a strong focus on storage and transfer is needed. Solutions from the operation-level can be largely reused here for the data transfer and storage exploration stage. However, in addition, aggressive static data type refinement and (due to the dynamic nature) dynamic memory management have to be supported. At the end the address and condition/loop overhead introduced by the code transformations of these stages has to be removed again too.

4. Complex timing and concurrency constraints are present. As a result, in current design practice, nobody can really manage a thorough "exploration" at this stage either because of a too low abstraction level (white box level with too many details) or of not enough info (UML and black box models). In contrast, our grey-box abstraction provides the right level to efficiently explore this, i.e. focussing on the dynamic constructs (events, semphares, threads) and the timing issues, together with the main data types and their control-data flow dependencies.

5. Cost-efficiency is still required for embedded systems, so power, required band-width, memory size are all very crucial to incorporate during the system design. Hence, we need a global exploration, driven by analysis feedback as opposed to the (nearly) blind mapping which designers are stuck with today (because only the last phase of the system design trajectory is supported by compiler tools). For this analysis fully automated and fast exploration tools with appropriate internal models are required, because interaction with designer is hopeless due to bookkeeping and global information processing during this "search space exploration."

Embedded Systems—Task-Level Design Problems

We aim at providing design support for the development of real-time embedded systems, with special focus at the task-level, so the understanding of the development process is essential.

Figure 8:
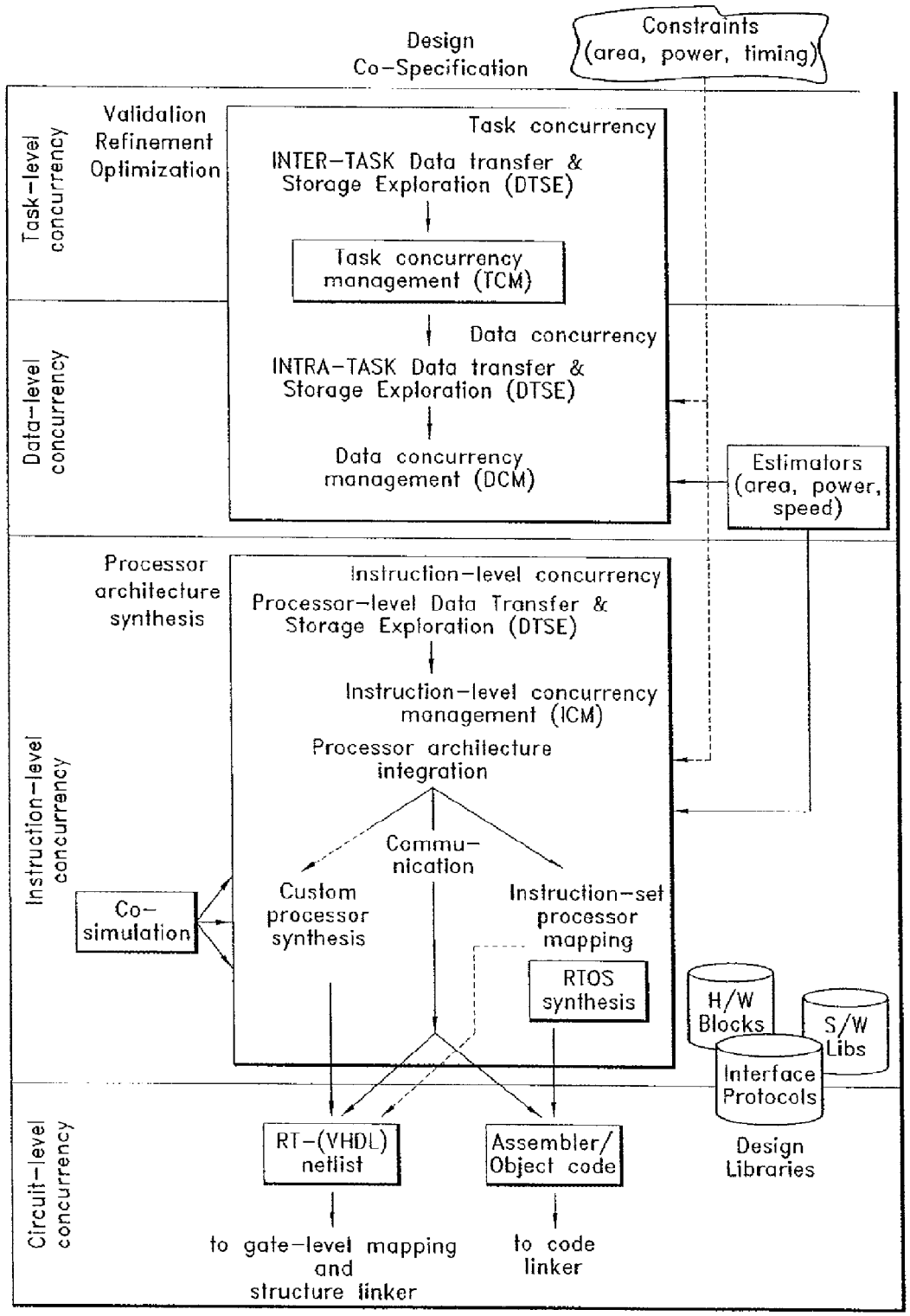

The cost-effective implementation of real-time embedded systems should span two levels of abstraction (see also FIG. 8). At the more traditional 'operation/instruction level,' the design consists of the actual coding of the different concurrent sub-behaviours in the system, often called 'tasks', on the (programmable) instruction-set or custom processor. At a higher level, which we call 'task level,' a concurrency management stage must be performed. This stage takes care that the different tasks coordinate (i.e. communicate, synchronize, coordination of resources, . . . ) on the same processor or on a set of processors, within the real-time constraints.

At each concurrency level, decisions relevant to that specific abstraction-level are introduced. These decisions are propagated as top-down 'constraints' to the subsequent levels. This gradually restricts the design search space and supports 'gradual refinement' of the design across different abstraction levels, leading to a global optimal result. To cut the dependency on lower level design decisions—i.e. a bottom-up dependency—of a higher level stage, 'estimators' must be resided to which give an approximation for the lower level design decision impact. Similarly, bottom-up information regarding pre-taken architectural (or other) design decisions (e.g. selection upfront the target programmable processor) needs to be propagated from the lower to higher level stages. The data concurrency level—which can be exploited by allocating 'array-processors in the architecture—will not be discussed further here. At each concurrency level, both the data transfer and storage issues and the concurrency issues are addressed. The former are performed in the 'Data Transfer and Storage Exploration' (DTSE) stages (see FIG. 8). These DTSE stages are all focused on the manipulation of the complex data types (like arrays).

Operation/instruction level. This belongs to the prior-art and hence it will not be discussed here any further.

Task level. The challenge of tomorrow is to map a complete system-level behavioural description, merely consisting of a number of interacting processes rather than a single algorithm to these valuable components.

The main problem is to close the gap between these two abstraction levels (i.e. system-level versus operation/instruction-level) by automating the 'system/software embedding' step; by this step, we mean the actions taking care that the set of processes can run on the same target by coordinating their interaction with each other and with the environment, and that the component is embedded in the rest of the system.

A major feature of our proposed approach is that additional abstraction levels and design stages (labeled 'validation-refinement-optimization') are introduced. These have to be tackled before the traditional SW/HW partitioning is performed, as indicated in FIG. 8.

The main sub-problems which we discern and that should be solved at the task-level are:

1. task concurrency extraction: the system specification may contain implicit task-level concurrency, requiring a separate pre-processing step which analyzes and extracts the amount of concurrency. In several cases, (control) transformations provide considerable improvements on the available concurrency, the freedom in scheduling and the reduction of the critical paths.

2. real-time system model: powerful and portable programming models supporting real-time are needed which isolate the (task-level) specification from the underlying processor hardware (either programmable or custom) and in this way enhance portability and modularity and stimulate reuse.

3. automatic time-driven task scheduling and scheduling algorithm selection: as indicated above, the scheduling in the presence of various constraints is too difficult to perform manually. Moreover, there is a clear need for algorithms which consider the concept of time directly (i.e. 'time-driven'). The automated selection of the scheduling algorithm is needed since the requirements of different applications widely vary. A massive amount of work on scheduling has been performed and in this in a variety of communities but few approaches are available on 'selection,'

4. processor allocation and assignment: as multi-processor targets are key elements in future systems, the partitioning of the specification over the different processors is too complex to be left to the designer, due to the complex and interacting cost functions, like schedulability, communication and memory overhead.

5. resource estimators: in order to generate an optimal mapping and scheduling of the specification onto the available processors and in order to generate the schedule as well as to verify its feasibility, data on the use of CPU resource (i.e. cycles) and memory is required. Furthermore, the number of processors, buffer lengths, . . . are key to both scheduling and partitioning sub-tasks. Estimations can be generated using profiling, simulation, source code analysis and generated code inspection (e.g. linker map tables).

6. high-level timing estimators: at a high-level in the design script, timing estimators are needed to guide the design decisions (e.g. processor allocation), ensuring timeliness of their outcome. It is merely estimators for the execution times of behaviour capable of dealing with partially implemented behaviour which are lacking rather than the timing analysis. Existing timing analysis approaches can be re-used by feeding in the execution time estimations provided by these tools. These estimators must be capable of dealing with, amongst others, incompletely refined communication (e.g. no insertion of data type conversion, protocol conversion, and even without bus assignment), absence of memory (hierarchy) decisions (e.g. levels of caching, number of memories and their number of ports, memory organization) and absence of partitioning and allocation decisions.

7. interface refinement: comprises of the following: (1) synchronization refinement, (2) data type conversion, and (3) scalar buffering. The first refines the high-level communication present in the input specification into a concrete IO-scenario taking into account processor characteristics (like peripherals), the throughput requirements and the size of inserted buffers. Software device drivers have to be synthesized and dedicated logic must be inserted to interface the (programmable or custom) processors to each other or to dedicated peripherals. The second ensures data type compatibility on the different communication sides by inserting behavioural conversions.

Pareto Curves and their Use at the Task Level

Figure 9:
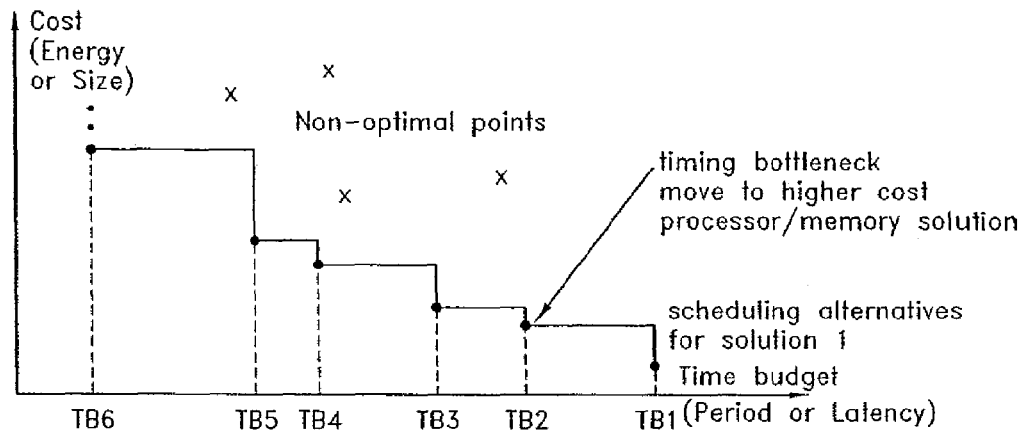

Due to the task-level exploration with the steps proposed above, it is possible to derive Pareto curves which indicate the points in the search space where a (set of) cost(s) is optimal relative to a constraint like the time budget. Non-optimal points in the search space that are "dominated" by other points should not be considered for subsequent implementation. That information is crucial for the system designer to decide on trade-offs with other subsystems present in the entire application. If the cost is energy, and when we map the initial MTG/CDFG specification on a pair of two processors, one with high Vdd and one with low Vdd, we can trade-off time and energy by moving more tasks from the low Vdd to the high Vdd one. The execution time indeed goes up roughly linearly with Vdd while the energy decreases quadratically. The optimal trade-off points typically lead to a curve as indicated in FIG. 9. That curve should include both the data transfer and storage (DTS) related cost and the processor core related cost. In practically all current exploration approaches that DTS cost is ignored or considered as constant. However, when the time budget is decreased, both these costs typically go up. The DTS cost increases because usually more system pipelining (buffering) has to be introduced and also the mapping on the SDRAM organisation and the processor caches becomes more costly under stringent time budget constraints. The processor cost increases because more subtasks have to be moved from the low Vdd to the high Vdd processor during assignment and scheduling, in order to meet the more stringent timing requirements.

Figure 10:
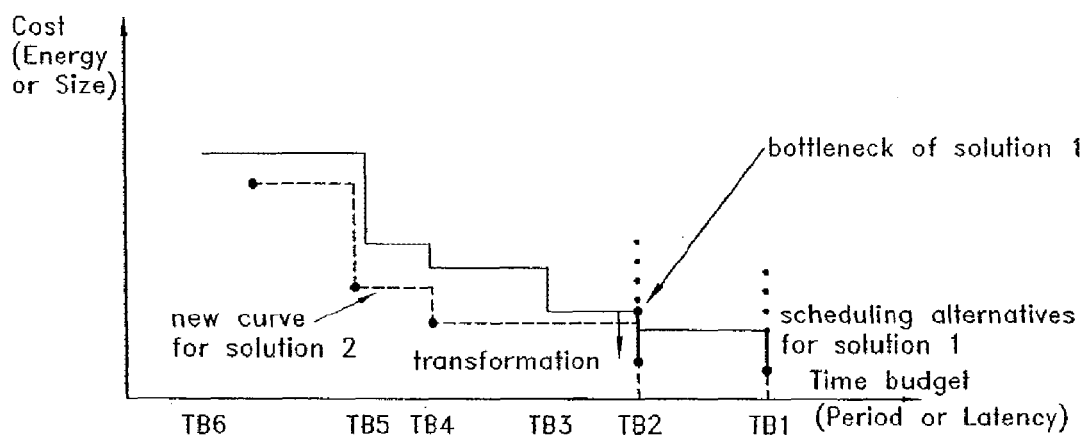

Due to the aggressive application of task-level concurrency extraction and concurrency improving transformations, the additional concurrency and reduced complexity can be exploited to move the location of the Pareto curve left and down for the processor core contribution (see FIG. 10). This indeed allows to better exploit the low Vdd processor during the task-level assignment and scheduling. Consequently the (energy) cost goes down. The DTS cost can be improved also because DTSE related code transformations allow to remove redundant accesses, and to improve the regularity, locality and data reuse behaviour. In addition, the concurrency improving transformations provide more access ordering freedom to remove part of the internal overhead (size especially) for the dynamically sized buffers. The transformations can however also be used to speed up the implementation, i.e. to break up the critical path and hence enable tighter time budgets to be achieved (at a potentially higher cost of course). As a result, the global Pareto curve after the transformations represents significantly improved solutions in the search space, both in terms of the cost required for a given time budget and in terms of the minimal time budget that can be reached.

Figure 11:
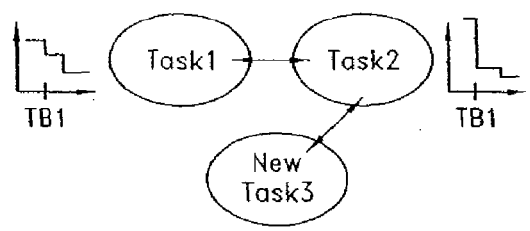

When these Pareto curves are precomputed for several task clusters at design time for a given embedded application running on a given processor configuration, they can then be used also to improve the global behaviour of the system in a very dynamic environment. Indeed, the steering of the scheduling and processor assignment of these task clusters on a set of processor and storage resources (a "platform") can then be dynamically improved in the presence of "foreign" tasks that are entered on the platform as agents or applets (see New Task3 in FIG. 11). The cost-time behaviour (the Pareto curve) of these entering tasks will then typically not be known, but their required time budget is almost always derivable (or estimatable). The required extra time on the resources then has to be subtracted from the currently running task clusters (Task1 and Task2 in FIG. 11) and this involves an optimisation problem because depending on how much each of them is squeezed, the cost effect will be lower for one/some of them compared to the others. For instance, in the example of FIG. 11 it is clear that when the initial time budgets of Task1 and Task2 are to the right side of TB1, it is best to squeeze Task2. As soon as that point is reached, it is better to start squeezing Task1 until it cannot be speeded up further. Such trade-offs to be taken can be effectively taken into account at run-time (by a customized part of the embedded operating system) by analyzing their precomputed Pareto curves. This will allow to significantly decrease the energy or size costs while still meeting all the timing constraints, because each of the task clusters can operate close to one of its optimal points in the overall search space.

Extraction of the Grey-Box Model

The C++ code is considered as a description of tasks performing specific logical operations. These tasks consist in their turn of threads that run continuously and independently from each other. The threads are a CDF description of functions triggered by an event signal. The primitive semantic that forms the thread is a thread node. This three-layer approach is described further in detail. In the lower level, the CDF parts of the functions are split in "seen" and "hidden" sublayers. The lowest (hidden) sublayer is a group of thread nodes consisting of CDF with purely primitive operations. In the highest (seen) sublayer, these thread nodes are grouped in threads that also include CDF with the thread nodes as primitive. The distinction between a thread and a thread node is the dynamic, non-deterministic behavior of the former in comparison to the primitive operations performed by the latter. In the middle level the "seen" and "hidden" approach is again applied. The dynamic threads are connected with MTG semantics and grouped in higher-level tasks. The criterion for this grouping is the logical functionality of the system and therefore could change after the transformation step. Since the main functionality remains the same and the general steps are called again and again in the process, a global view of the system can be generated. In that sense a grey-box model can be extracted both for the MTG (middle) and the CDF (lower) layers. The steps to be performed to get from the initial system specification (C/C++ code or high level information) to the grey-box model to be used as input for TCM exploration are the following:

Extraction of the black-box model based on the high-level system specification, which is in most cases available. The global view of the system's functionality is represented in black boxes with no information about their content, the algorithms used, the operations performed on the data types or the detailed dependencies between them. It is only a very abstract representation of the system to give the general picture of the function boundaries that must be retained during the changes later in the exploration process.

Looking inside the black-boxes, the operations of the main functionality are drawn with the function scope of the C/C++ code. The functions are considered as thread nodes for the moment and the black-box approach is extended with control and data flow edges to connect these thread nodes.

Operations like variable assignment or primitive functions are grouped together in a thread node because they are considered as an implementation of an abstract CDFG functionality.

Conditional guards of branches that are not local in a function but depend on a completely different functionality indicate an ordering or a dependency between the two threads. From this point on, the top-down approach is taken, so we work on the details of the functions but always keeping the global picture of the system. The "for" and "while" loops are detected and represented inside the function scope. They are considered as important if the number of iterations is data dependent or if the loop body times the number of loop iterations is large and hence represents a high execution time on the final target processor.

Non-deterministic behavior that has to do with synchronization is taken into account. Semaphore reserve and release indicate the boundary of a group of functionalities interacting with another one as far as data interchange is concerned. Other non-deterministic issues like the creation of threads or/and tasks are also annotated on the diagrams inside the function scope.

Task-Level Transformations

In this section we will present first the real-life results of task-level transformations. Afterwards, we will give an overview of the different types of transformations that we distinguish.

Real-Life Examples of Transformations that Improve the Amount of Concurrency Description of the Transformations When developing an initial model of a system, specification engineers normally spend neither time nor energy to expose all possible concurrent behavior. They are mainly concerned with the functionality and the correctness of the system. As a result, the software model that they create hides almost all concurrency. However, for the design engineers it becomes an almost unmanageable and very time consuming problem to extract the concurrency from this initial specification and to map it on a concurrent architecture within stringent time constraints. Therefore, they will either redesign the system from scratch or use a faster and thus more power consuming architecture. In our design flow, on the contrary, we model the initial specification on a grey-box level that allows us to systematically identify and transform the time critical parts. We start to analyze the data dependencies that inhibit concurrency. When no recursion is involved, the scope of these data dependencies can be reduced by adding extra buffering (and possibly a small additional routine to synchronize the data). However, the main difficulty is to detect these data dependencies. Software designers often prefer to use run-time constructs to model data dependencies between the boundaries of tasks as this gives them more flexibility to change their initial specification afterwards. Hence, they conceal data dependencies with semaphores or mutexes, seemingly required for a non-deterministic behavior. Therefore, we carefully analyze all these constructs in our grey-box model to determine the really needed ones. This is an enabling step that to allow us to then actually break dependencies by introducing a small buffer. We will illustrate this approach with two real examples extracted from the IM1 player. To make the examples comprehensible, we will give here a short introduction of the parts that we have invested.

The IM1 player is based on the MPEG4 standard, which specifies a system for the communication of interactive audio-visual scenes composed of objects. The player can be partioned in four layers (see FIG. 12): the delivery layer, the synchronization layer, the compression layer and the composition layer. The delivery layer is generic mechanism that conveys streaming data to the player. Input streams flow through the different layers and are gradually interpreted. We mainly focus on the compression layer. This layer contains several decoders. Two important ones are the BIFS and the OD decoder. The BIFS decoder interprets the data packets that describe the composition of the scene objects. The output of this decoder is a graph. Each node in this graph presents either an object in the scene or describes the relation between the different objects. However, to represent some of the scene objects extra AV-data is needed. How this data needs to be conveyed to the compression layer and how it needs to be decoded is described in Object Descriptors (OD). These ODs are encoded in one or more streams entering the compression layer and are decoded by the OD decoder. The ODs are linked with the nodes requiring the extra AV-data.

Figures 13, 13A:
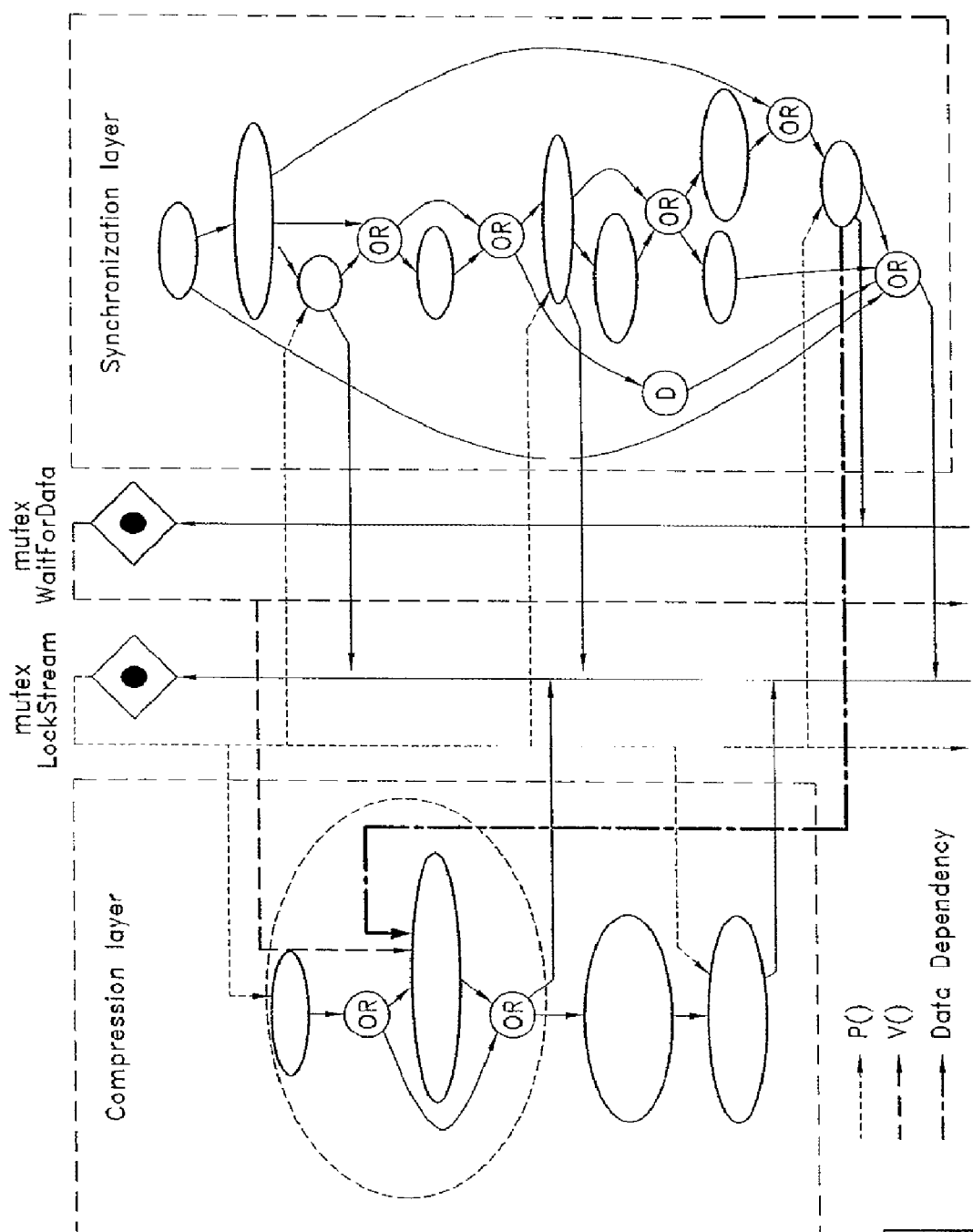
Figure 13B:
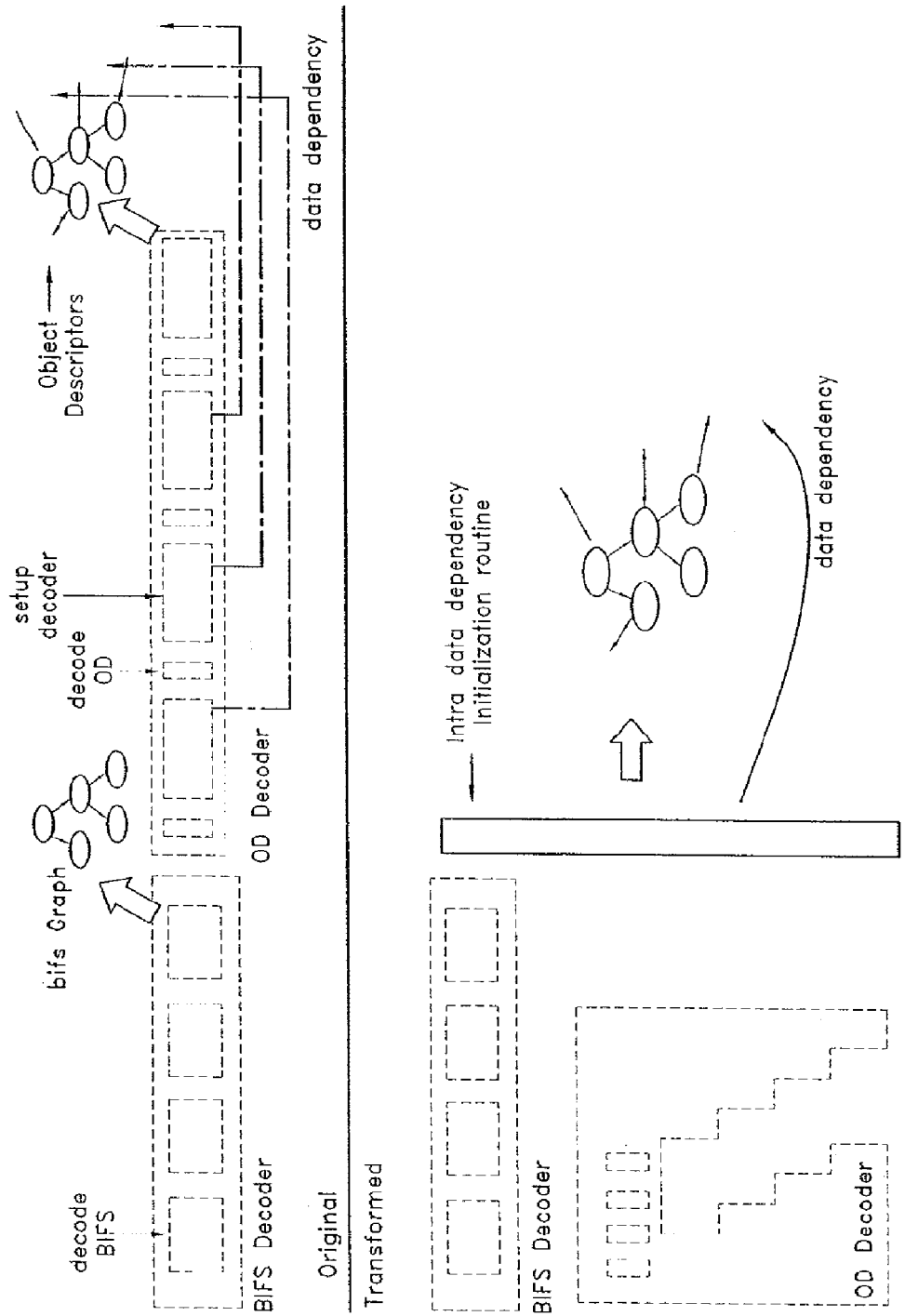
Figure 14:
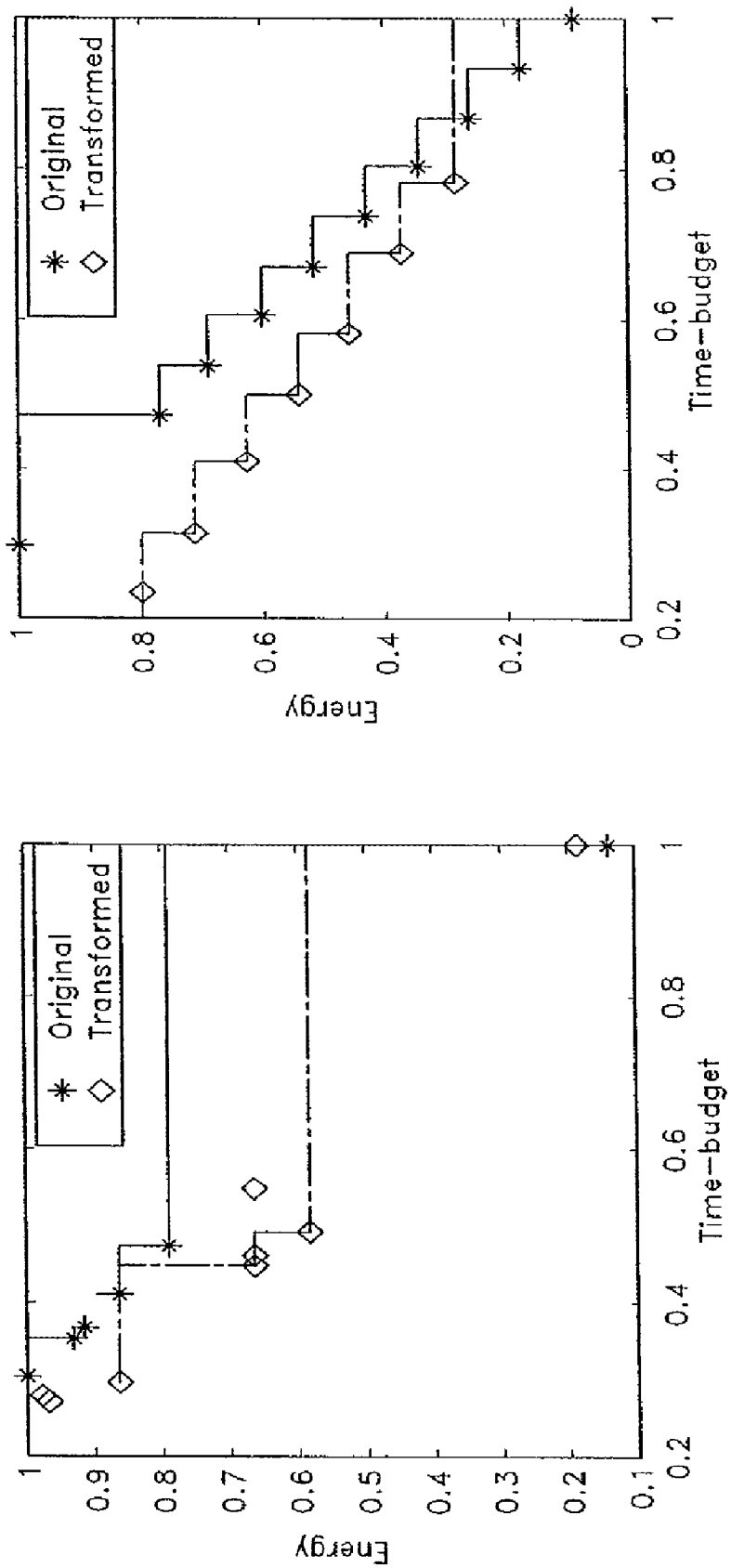

In the first example, we have changed the relation between the synchronization and compression layer. Originally, the two tasks were separated with a buffer protected against simultaneous access with a mutex, i.e. WaitForData mutex presented in FIG. 13 left. This figure is a part of the grey-box model that we have used for our analysis. As a result of this semaphore, both tasks were always executed sequentially. However, this semaphore was only needed to model a data dependency: the compression layer cannot start to decode before data is available at the output of the synchronization layer. Therefore, we have replaced the semaphore with a data dependency, indicated in the figure with the bold dashed dotted line. Moreover, no recursion was involved with this data dependency. Hence, by increasing the size of the (small) buffer, the synchronization layer is allowed to handle a next data packet, while the compression layer is decoding the previous one. At the cost of some extra buffering, we have succeeded in increasing the amount of concurrency.

A second example illustrates a similar principle. In the compression layer of the player, the OD and BIFS decoder share a data structure, i.e. the graph representing the scene. Above we have described that this graph is the output of the BIFS decoder. The OD decoder also accesses this graph to link ODs with the nodes in the graph. The graph is protected against simultaneous access by the BIFS and OD decoder with a semaphore. As a result, they cannot run in parallel. After a more thorough investigation, we have found out that the links between the ODs and the nodes in the graph are not needed during the execution of either the BIFS or the OD decoder. Therefore, we have broken the data dependency by postponing its initialization until after the execution of both decoders. Hence, the OD decoder does not need to access the graph and can work independently of the BIFS decoder (see FIG. 13 right). This again costs some extra buffering plus a small extra initialization routine.

As a side-effect of this transformation, extra concurrency inside the OD decoder becomes available. The ODs were previously decoded sequentially because of the access to the shared graph. By removing this dependency, they can now be executed in parallel. Using this concurrency we create extra freedom for the task scheduling.

We believe that such transformations can be generalized for similar graphs with other contents of task behavior. In the next section we will show how these transformations affect the overall cost-performance trade-off of the system even on a weakly parallel platform.

Results of the Transformations: Task Scheduling Experiment on a Weakly Parallel Platform Two parallel ARM7TDMI processors, running at 1V and 3.3V respectively, are used to illustrate the scheduling. The main constraint for scheduling is the time-budget. For one task, we use $t_L$ and $t_H$ to denote the its execution time on the 1V ARM7TDMI and 3.3V ARM7TDMI respectively and $\Delta t$ to denote the difference between these two execution times. Similarly, we use $E_L$ and $E_H$ to denote its energy cost of the processor to run on 1V ARM7TDMI and 3.3 ARM7TDMI and $\Delta E$ to denote the energy difference. Our calculations are based on the following formulae.

$$\Delta t = t_L - t_H = \left(1 - \frac{1}{3.3}\right)t_L \qquad (6.1)$$

$$\Delta E = E_H - E_L = (3.3^2 - 1)E_L \qquad (6.2)$$

Figure 12:
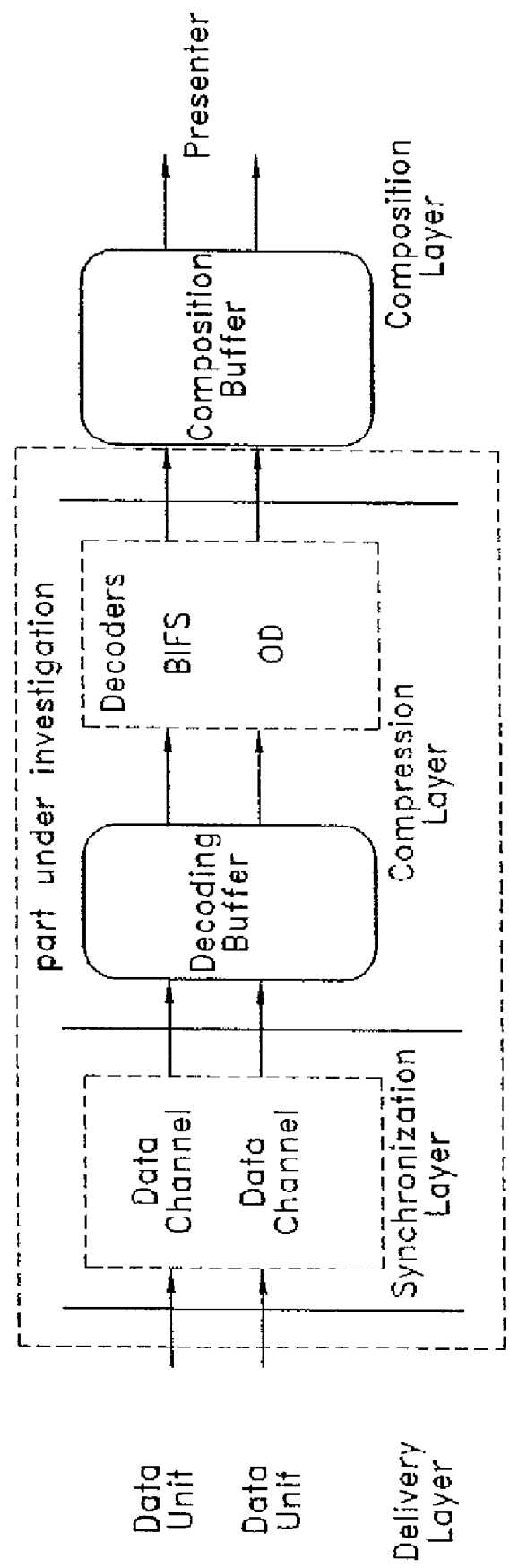

For the first experiment the time-budget starts at the reading of one VOP[1] data and expires at the end of the decoding of the data (see FIG. 12). The original implementation dictates that the data can only be read and decoded sequentially. Due to this limitation, we can only reduce the period by executing some tasks on a high Vdd processor.

[1] Video Object Plane

The second experiment gives similar results. Given is a group of media objects, i.e. a group of nodes. The time-budget starts now at the beginning of parsing the first node and expires at the end of the setting up the decoder for the last node. Each of these nodes will undergo three steps: first its description is parsed by the BIFS decoder, the related OD is then parsed by the OD decoder and finally the AV decoder described in the OD is set up by the OD decoder. Originally the BIFS and the OD decoder run sequentially. That is, OD decoding only starts after all the nodes finishes their BIFS decoding. The time-budget and total energy cost of the original Pareto-optimal points in the search space are shown with asterix points for both the first and second experiment on the left and right side of FIG. 34 respectively.

Figure 34:
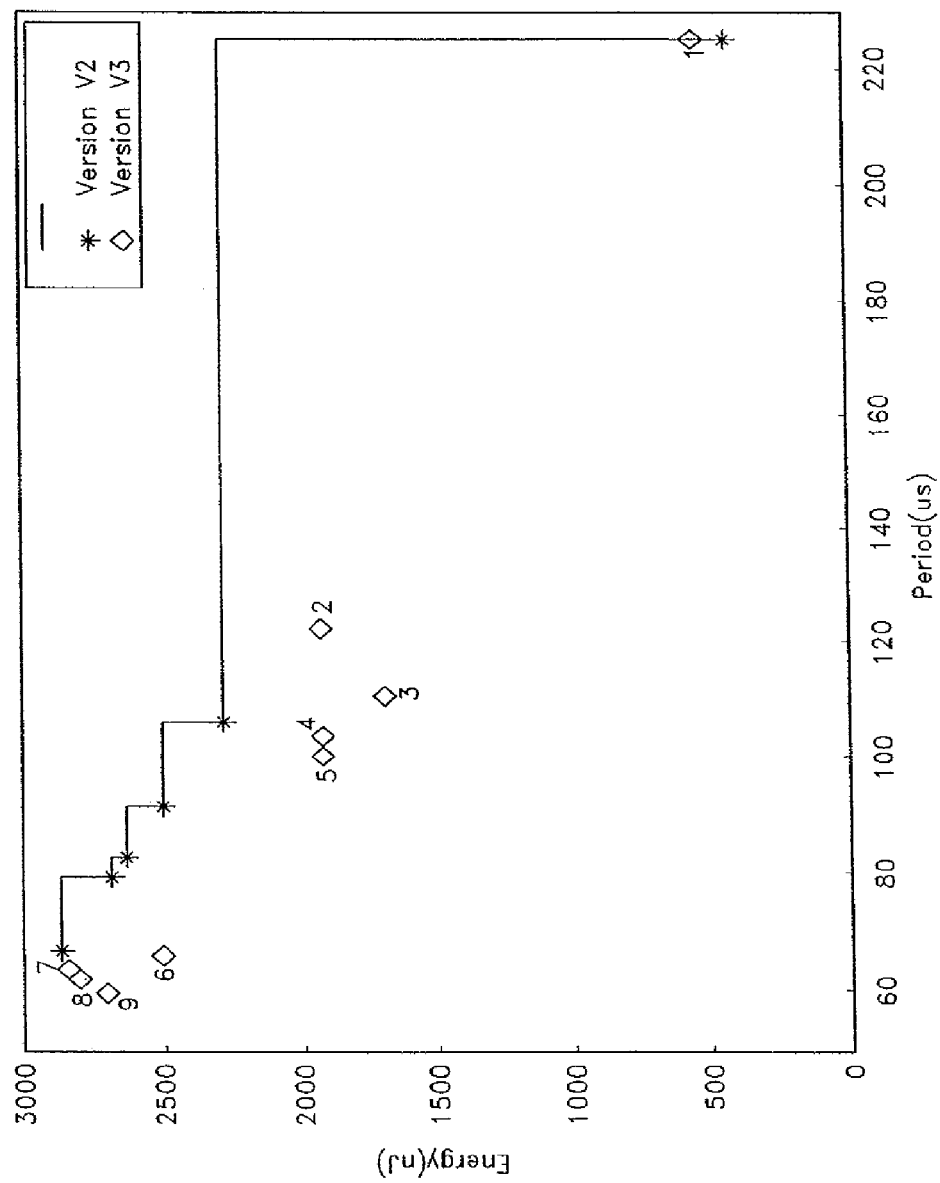

After the TCG related transformations discussed above that lead to the transformed task graph, we can remove these implicit sequential restrictions in the code. Consequently, we can better utilize the two processors by exploiting the concurrency. Hence, we can achieve the same time-budget with less energy cost or we can reduce the minimally achievable time-budget due to the added flexibility. The scheduling results for the transformed graphs are also shown in FIG. 34, with the diamond points. Gains of 20% and more are achievable in energy cost and the maximal speed can be increased with nearly a factor 2.

Overview of Different Transformations
Simplify the Grey-Box Model
Hierarchical Rewriting In the concept of focusing in the TCM related parts, the code that is not providing any freedom to the transformation and scheduling steps is hidden. This is done in two layers of hierarchy according to the following criteria:

The critical-path: the control flow and data flow of the data types that are relevant to the system main functionality.

The most important data types of the system and the dependencies on them like loops whose number of iterations is data dependent.

The existence of dynamic events that include the semaphores and the mutex, the dynamic creation of tasks and the event signals between the environment and the system.

Figure 15:
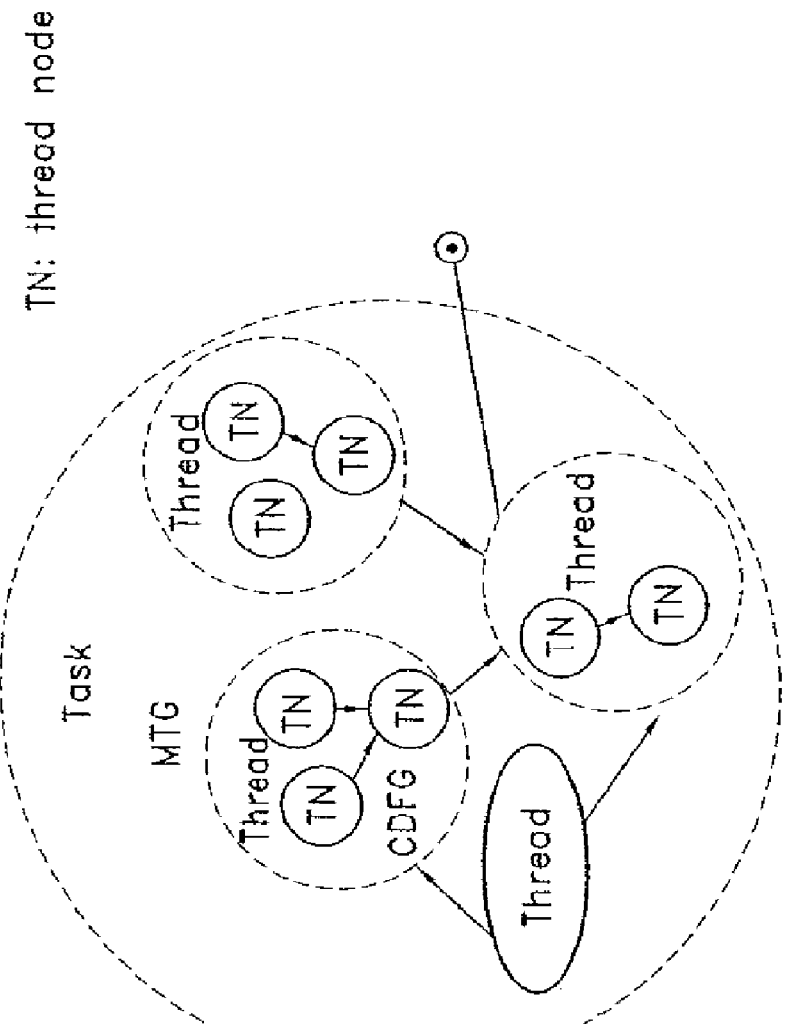
Figure 16:
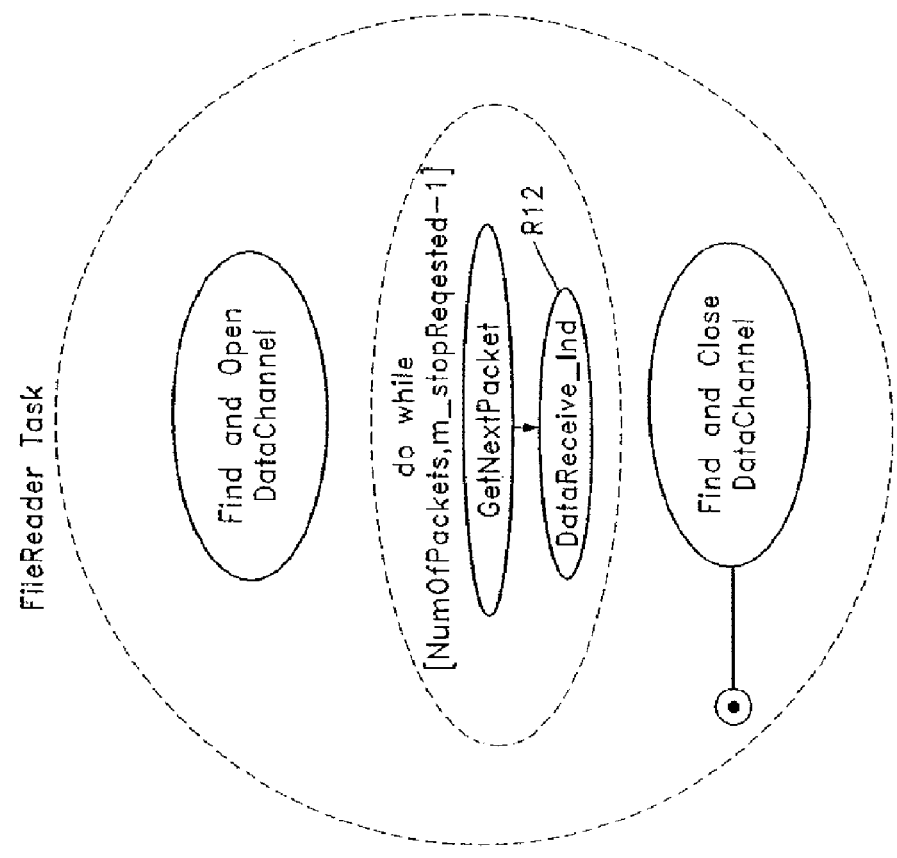

The timing information: this includes the average execution time of the functions and the execution time of a loop. The loops are important because of the fact that even if the loop body is not time consuming, the number of iterations may be large enough to make the total execution time of the loop "interesting." In the case where the white box specification is not available, the time information is being derived by the partial system specification or by estimates based on logical assumptions that are being verified later in the design process. Examples illustrating the transformation are in FIG. 15 and FIG. 16.

In the lower layer the CDF parts of the functions are "seen" or "hidden." The outcome at this level is thread nodes consisting of CDF of purely primitive operations. In the middle layer these thread nodes are grouped in threads that also include CDF with the thread nodes as primitive. In this layer the "seen" and "hidden" approach is again applied. Since the main functionality remains the same and the general steps are called again and again in the process, a global view of the system can be generated. In that sense a grey box model can be extracted. In each exploration step, we focus first locally in some parts that include the basic bottlenecks (see criteria below) and "hide" the rest threads in black boxes. The semantics of the MTG model are expanded for this two-layer distinction. For the "hide" parts in both layers a table of correspondence is used. The parts of a function body that are not relevant to the CDF and to the main functionality of the system are grouped and given a general name indicating the "functionality" that is performed. A function bubble is used for their representation in the TCG. The other parts of the function body that are important according to the criteria are kept in the "seen" part. In this way there is less details in the diagrams, a more global view of the functionality of the system and the complicated but unnecessary information is pruned away. On the other hand if later in the process we find that it is needed to split the "bubble" (because it takes considerable amount of time or because we need to take a closer look at the CDF) we still have the "lighter-grey" box model by using a table.

Hide Undesired Constructs

Figure 17:
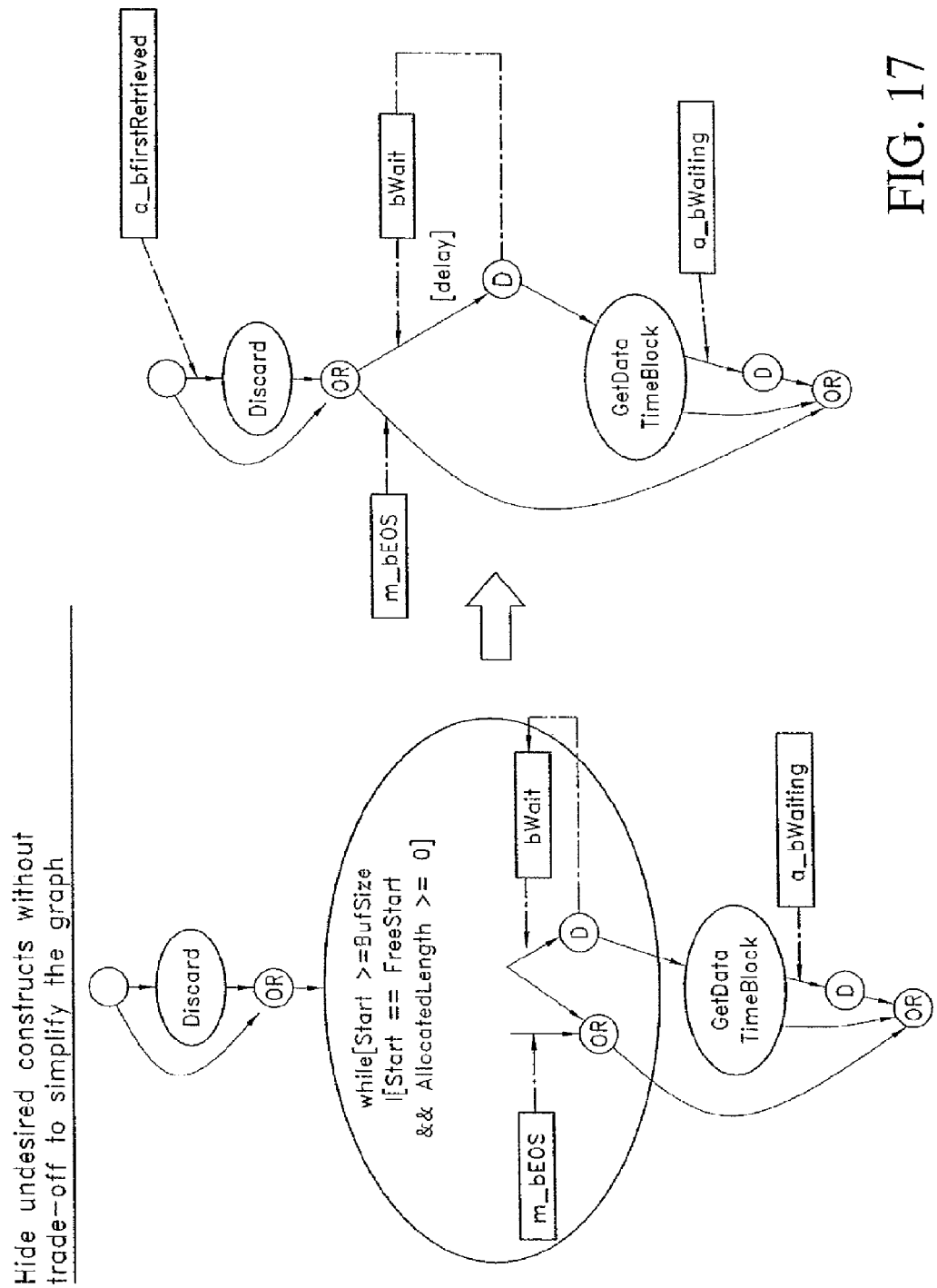

In this step we "hide" the parts of the graphs that introduce complexity without adding any new TCM related concepts. This "hiding" is done without trade-off because at this pre-processing level the transformation should just simplify the initial TCG. In that context, the transformations should not affect the CDF of the system. The functionality remains the same but parts that are not related to the TCM focus are pruned to the "hidden" 3rd layer of DTSE. Example: The ODDecoder is creating a FileReader thread if mActive is not set in the RequestChannels and the m_state is required. Illustrated in FIG. 17.

Create Freedom
Code Expansion

Figure 18:
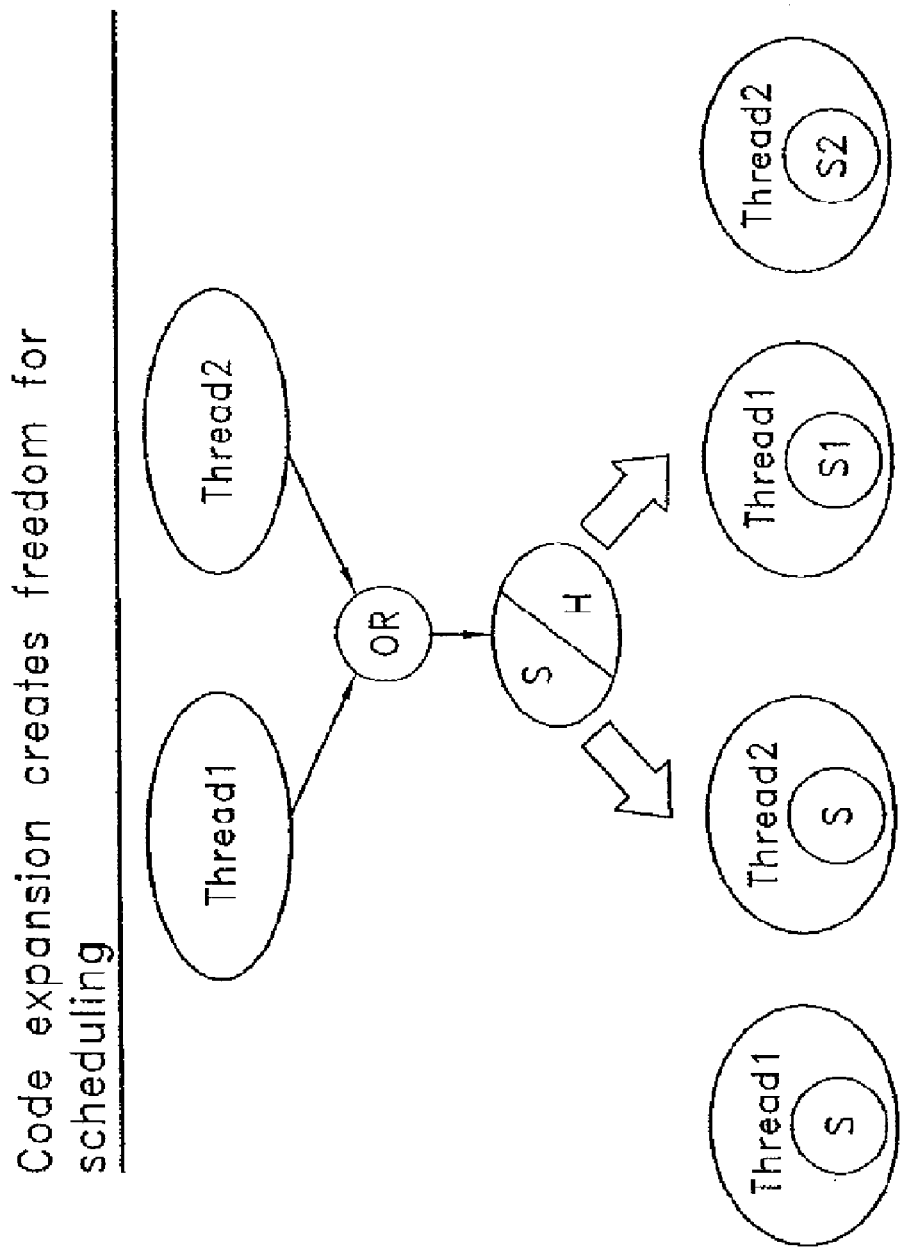
Figure 19:
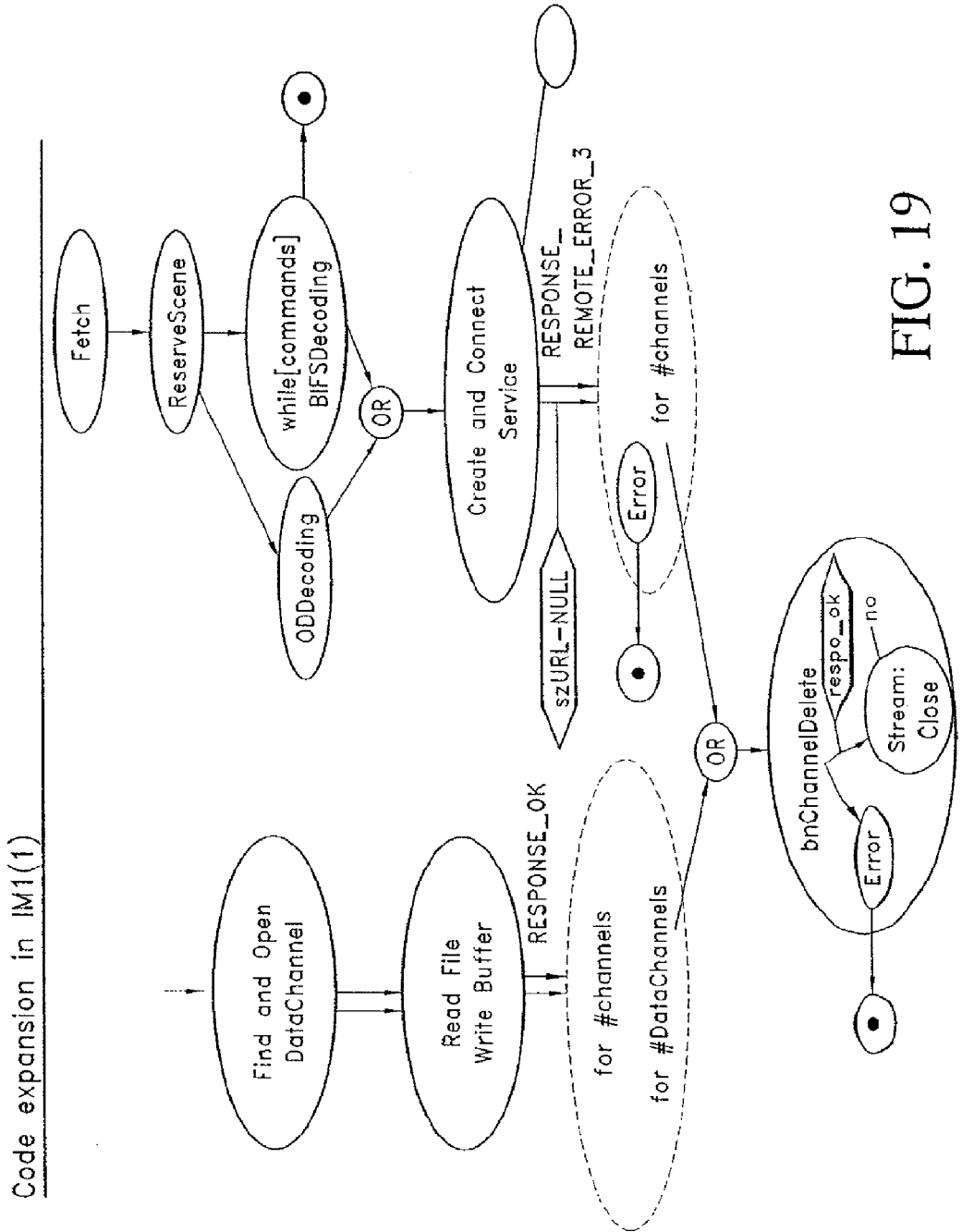
Figure 20:
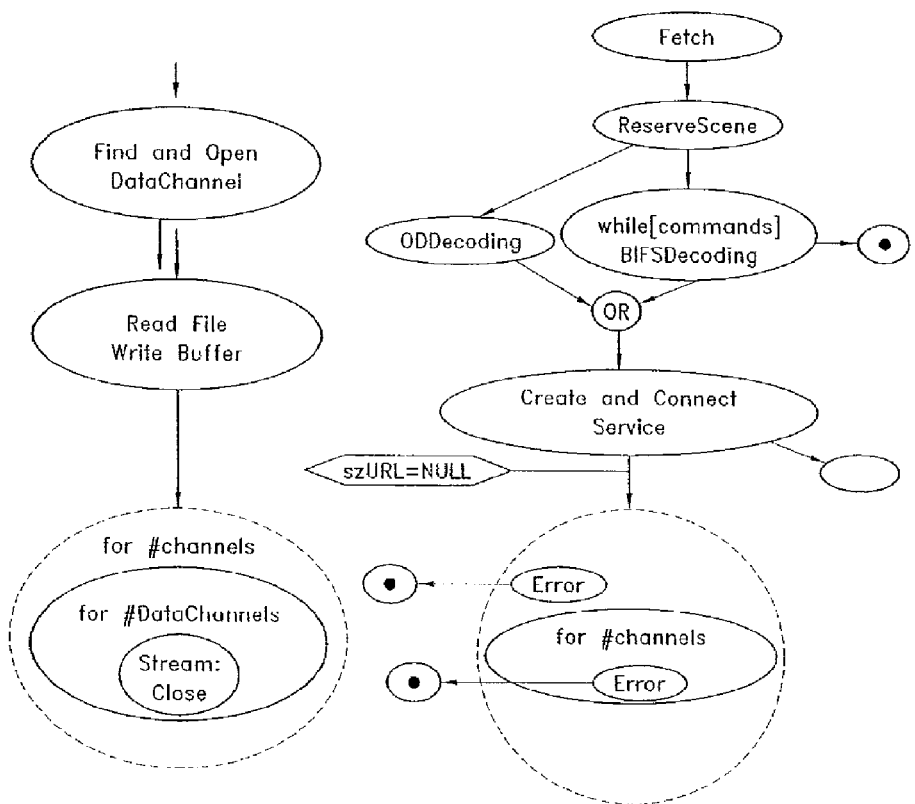

Example: a subroutine that is called by different threads and a part of it is "hidden" but the "seen" part is instantiated in the different calls to allow more freedom for the scheduling later on. There is however a more complex case where the "seen" part changes according to the context of the thread from which it is called. This can be achieved by passing different argument values or by setting different variable values. In this case, the "seen" part consists of two different instances according to the context. Each instance will be used in the corresponding thread. Examples illustrated in FIG. 18, FIG. 19 and in FIG. 20.

It should be stressed here, that this kind of transformations do not affect the functionality of the system but only give more freedom to scheduling by reducing the complexity in the diagrams.

Remove Constructs that Prohibit Concurrency Analysis

DTSE objective: The general concept is to propone the reading and postpone the writing.

TCM objective: the basic goal is to introduce as much concurrency as possible. In this context the parts of the system that are independent but executed sequentially because of the nature of C++, are being decoupled by the control flow and considered to be executed in parallel.

Figure 21:
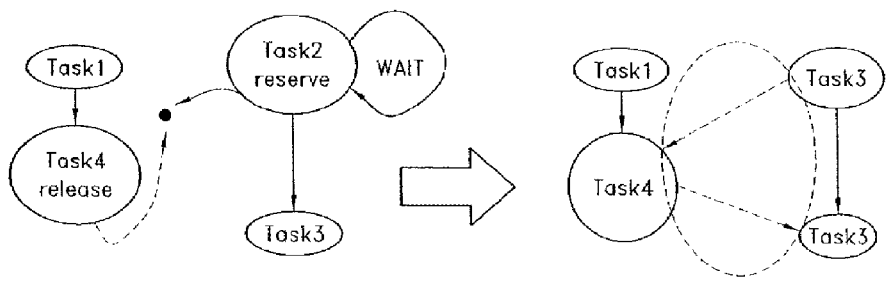

Example follows in FIG. 21:

Transform Constructs that Prohibit Concurrency Analysis

Figure 22:
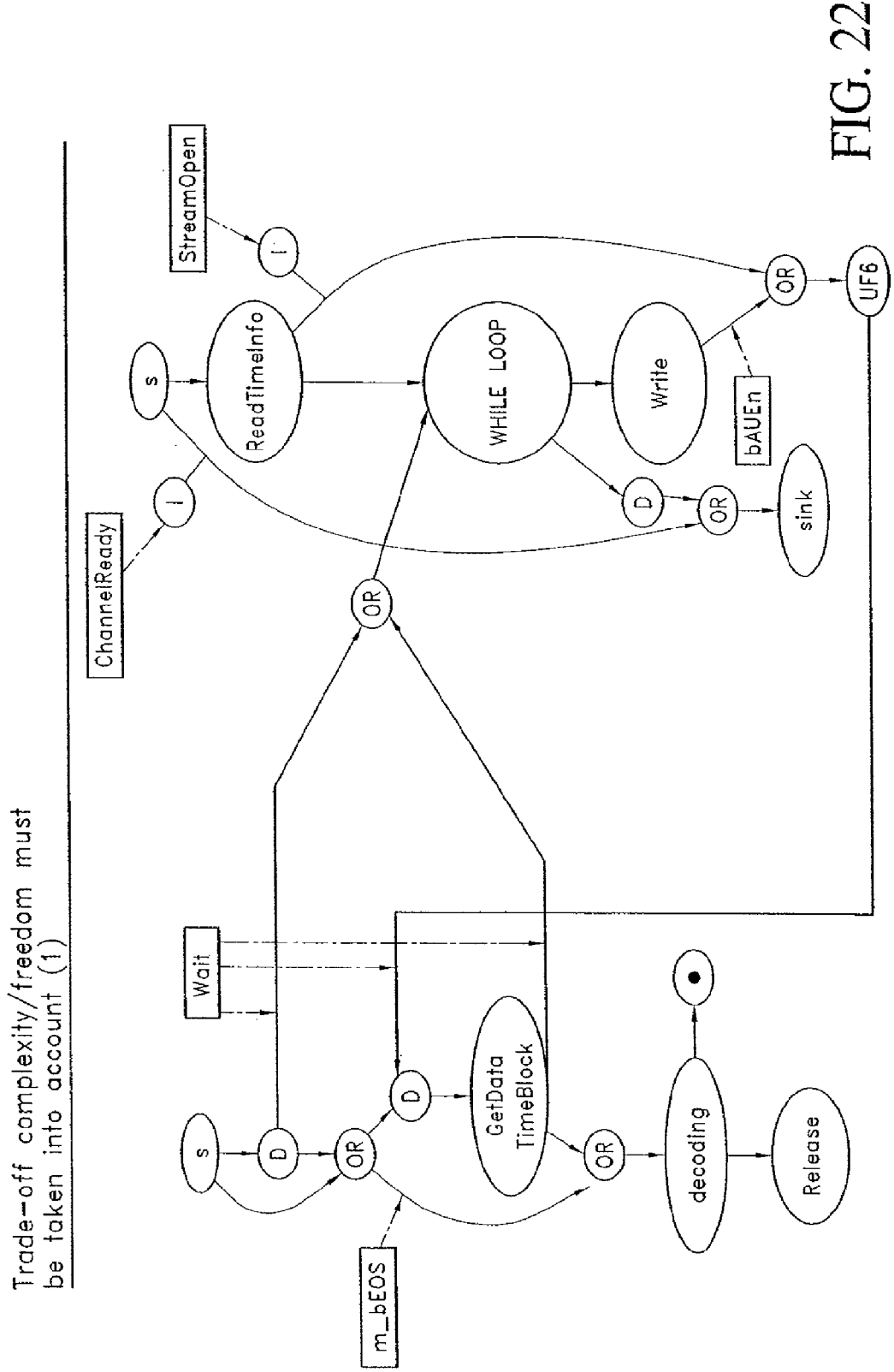
Figure 23:
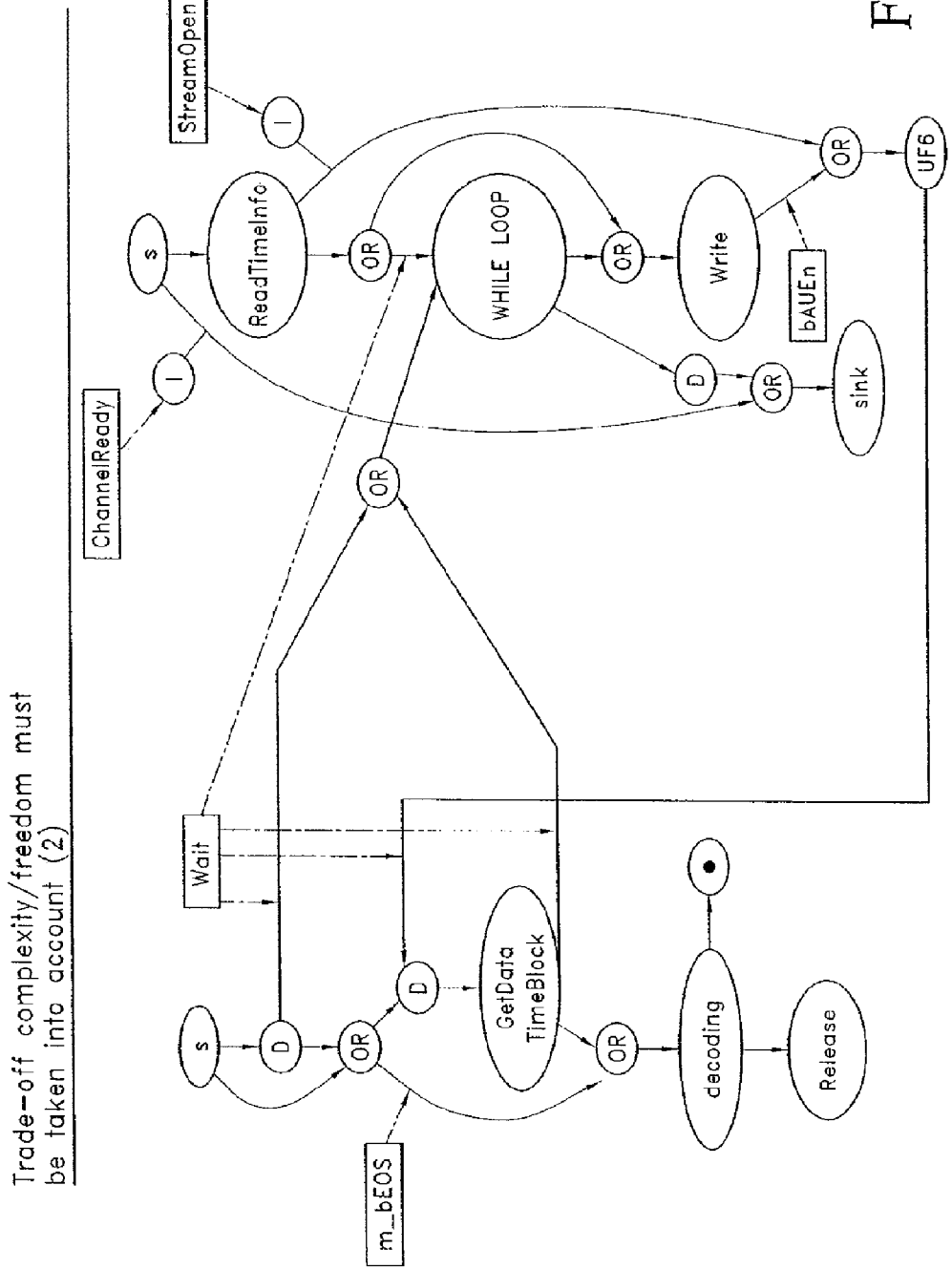

Trade-off: If the transformed graph is not equivalent to the initial one, the new degree of complexity and concurrency in compare to freedom should be taken into account. The control edges that impose strict constraints to TGM are moved or an assumption is introduced to create more freedom. An example of this transformation is given in section 6.3.1. Example follows in FIG. 22 and in FIG. 23

Figure 24:
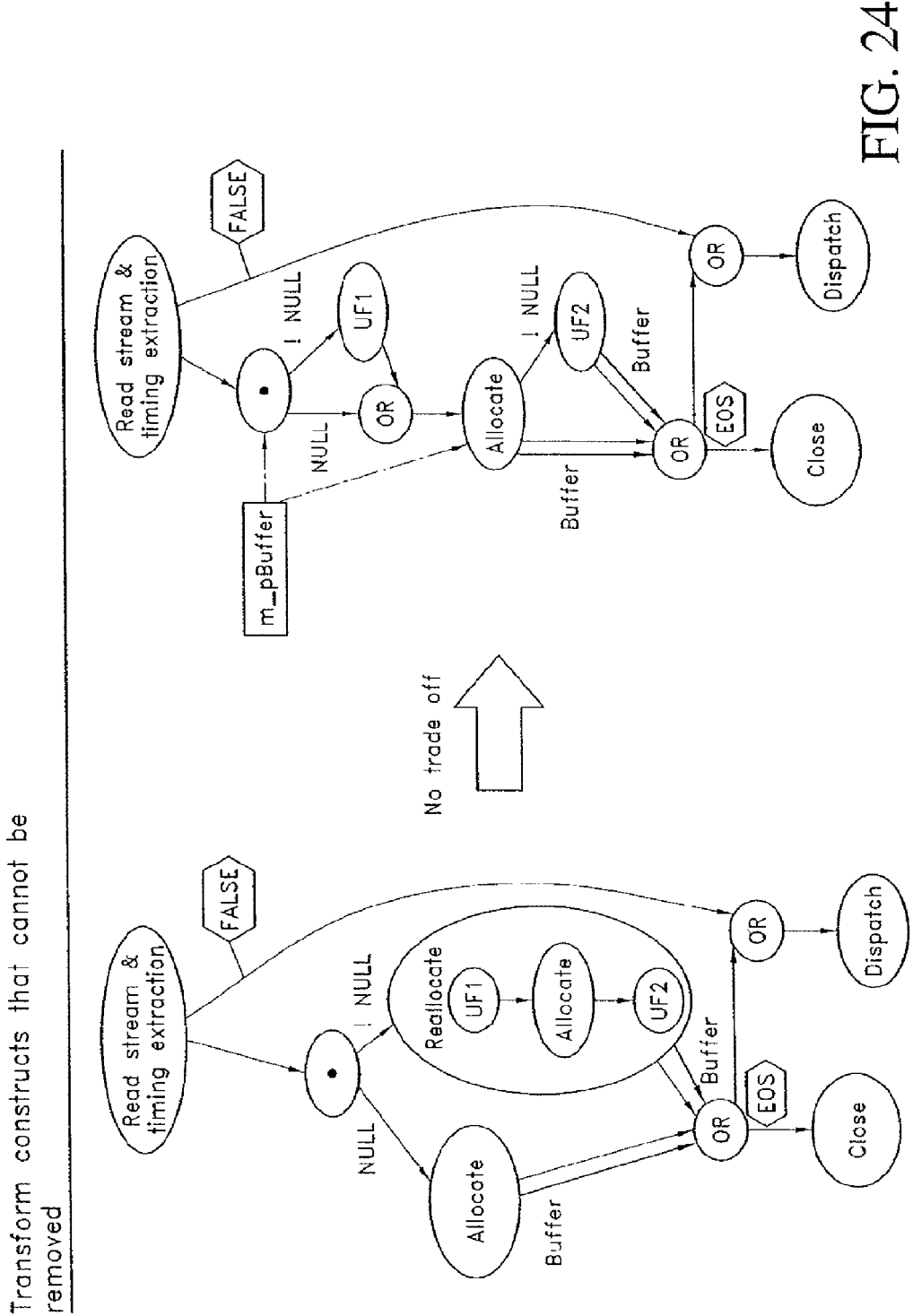

No trade-off: At this step only the transformations that result in the same functionality are performed. The functions are split into these thread nodes that are common between them and then merged into one. Example follows in FIG. 24.

Concurrency Analysis

Figure 25:
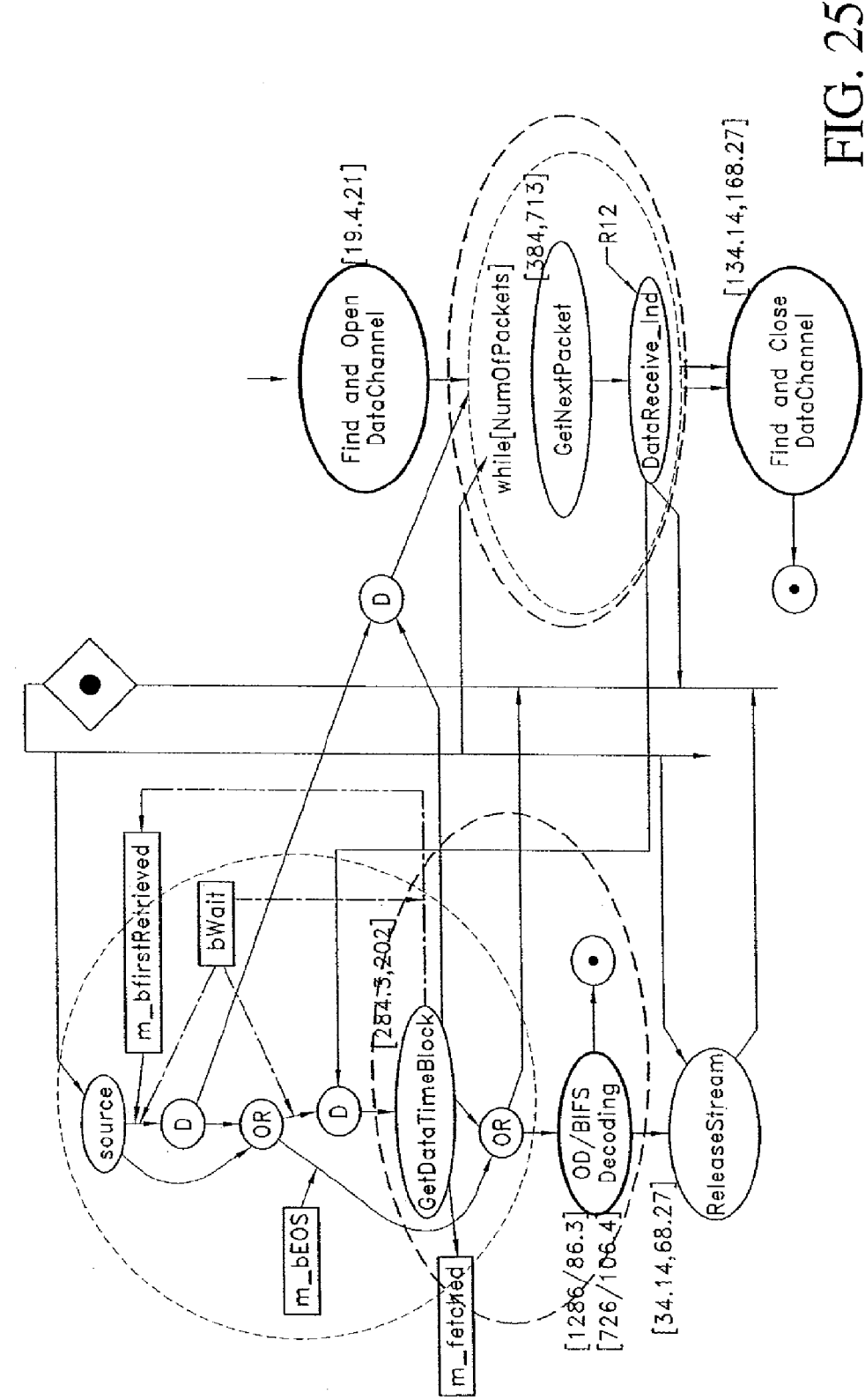

The system is analyzed globally in order to detect the parts that can run independently and thus concurrently. This step focuses on the potential parallelism and lists the bottlenecks that inhibit it. This is illustrated in FIG. 25.

Reduce Complexity Exposed by More Detailed Concurrency Analysis

Remove Unused Code

Figure 26:
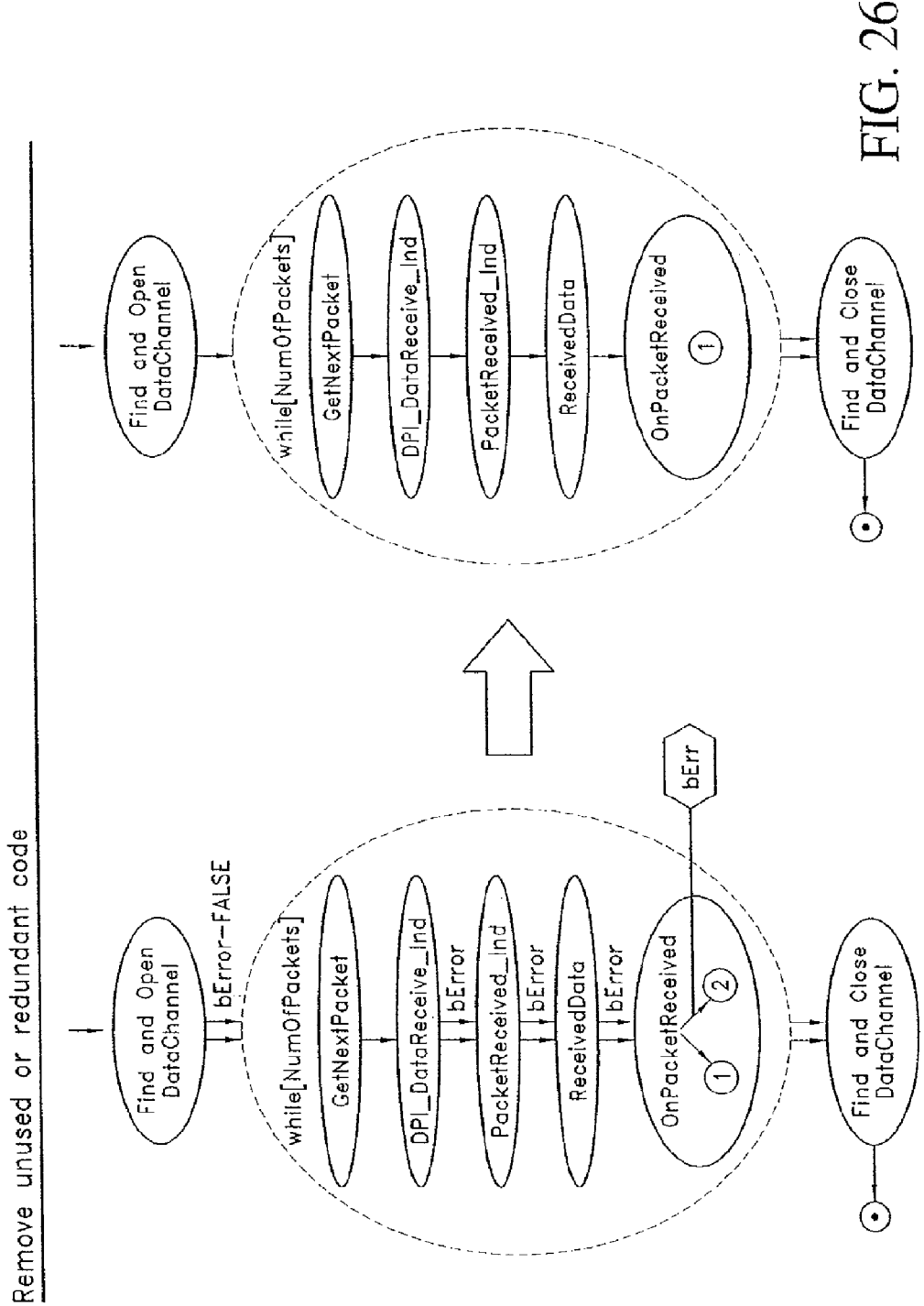
Figure 27:
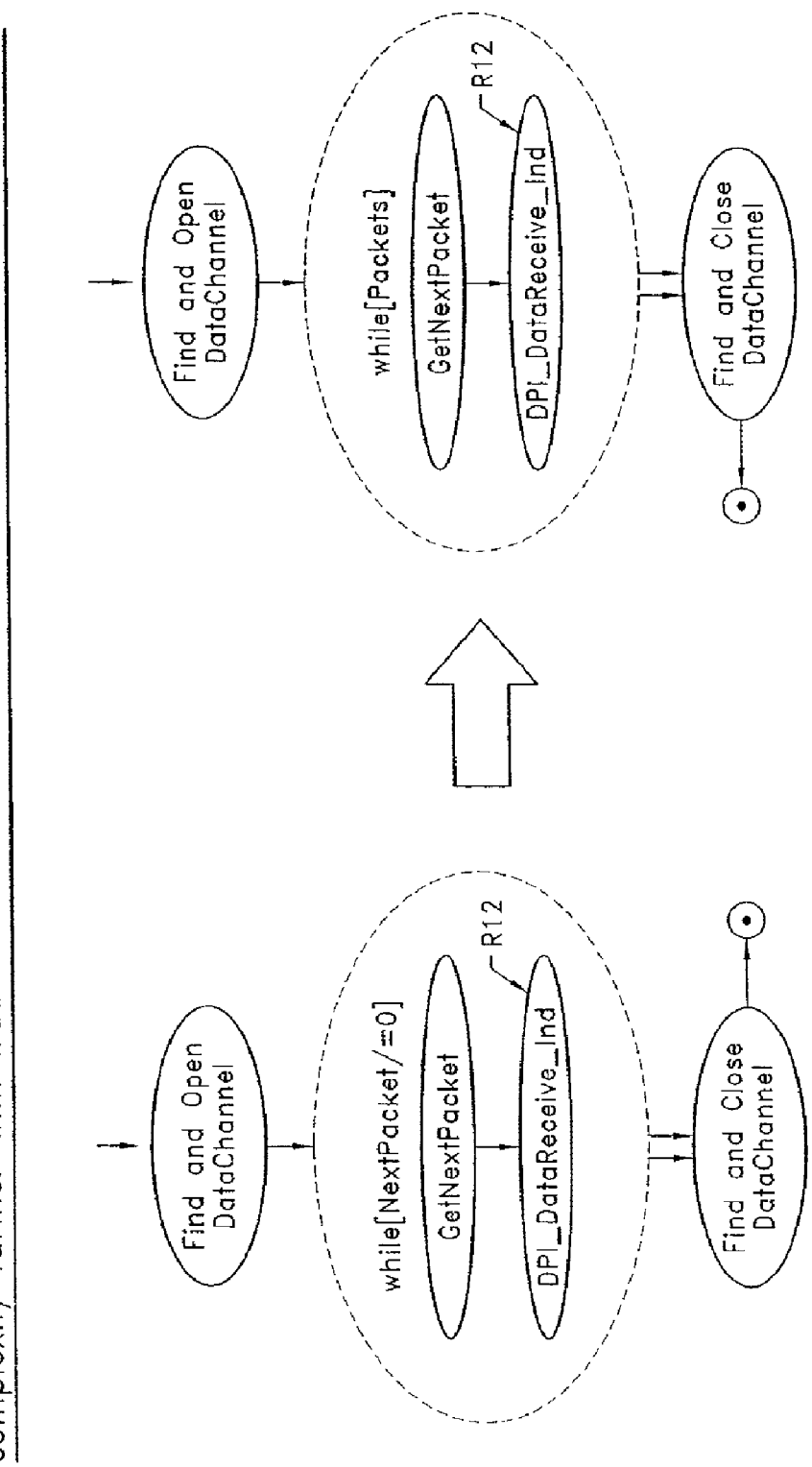

This step aims at keeping only the main operations of the system functionality and to remove the redundant code as far as the asserting (extra) checks and the variable-set are concerned. This is similar to step 2 for creating freedom but in this phase, the parts removed are those that were not obvious in the plane C++ code. Because of the concurrency analysis information (including data flow arrows) the redundant information is already abstracted away, the system functionality is handled more globally, allowing for extra redundant dependency/constraint/code detection. E.g. when the value of an argument (important data), which is passed from one function or instance of a class to another, is known in advance, only the body of the branch that is triggered depending on this value is left in the diagrams. Example follows in FIG. 26:

Reduce complexity by trading off globality of exploration and hence result quality Example follows in FIG. 27:

Weight-based hiding of less crucial constructs

Hide the code that is still complex Or even impossible to handle (i.e. non-determinism) and is less relevant in comparison to the other parts that are retained. The hiding is done by putting a threshold (complexity target based) on the list of retained code constructs, which are first ranked based on the relative importance of still difficult to handle issues.

Partitioning

Figure 28:
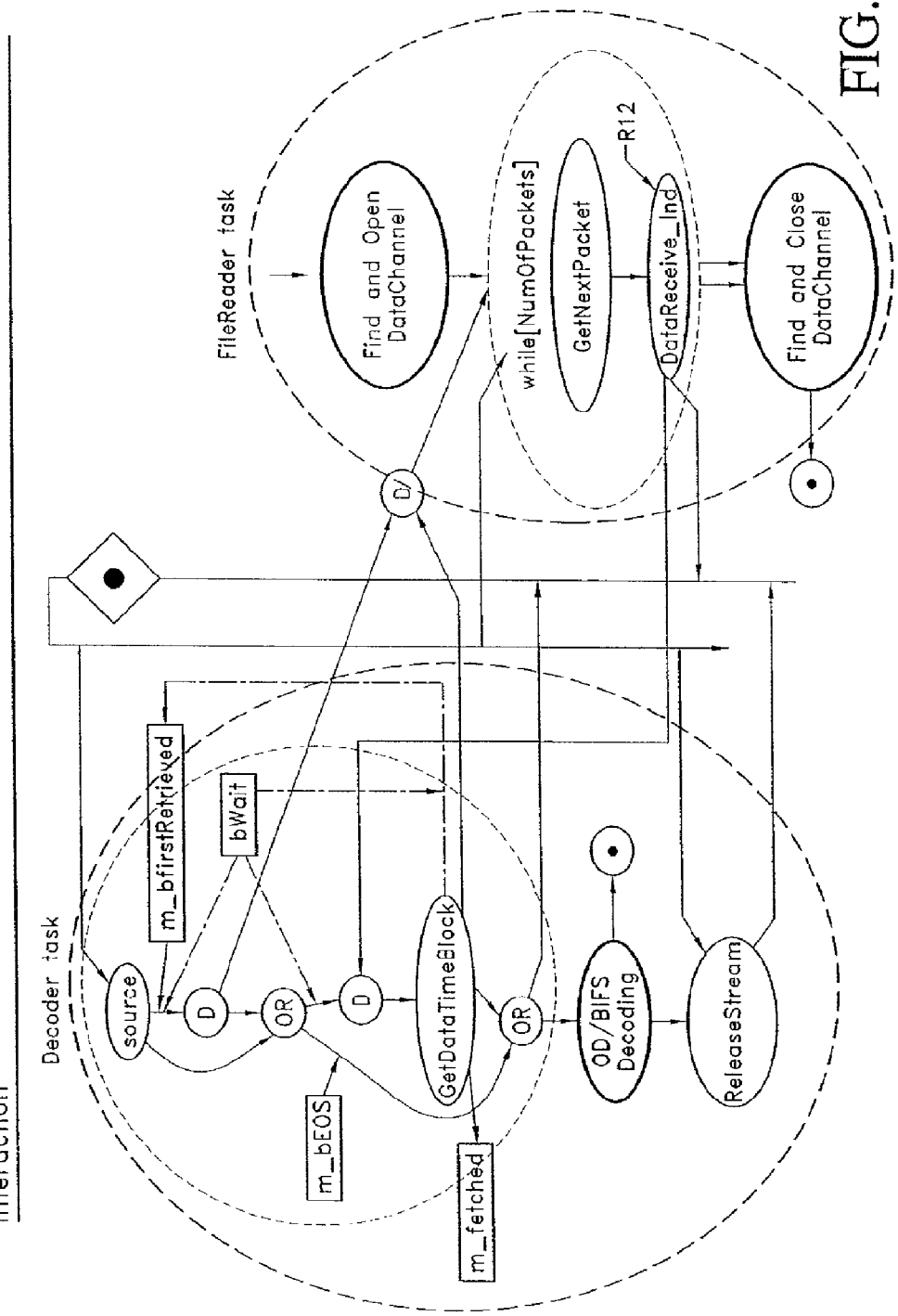

At this phase the threads are grouped in task clusters that form the dark-grey-box model of the system. This is the third and higher level of hierarchy (see above). In the highest layer of the grey-box model, tasks are grouped into task clusters where the main characteristic is that low communication and interaction are present between the combined tasks. So, one objective is to decouple them in the highest possible degree e.g. for later task scheduling Typically also the dynamic move of sets of tasks over a network (e.g. as Java applets) is captured through the concept of a task cluster that is dynamically created at other nodes. Example follows in FIG. 28:

Scheduling at the Task-Level

The first section presents how we organize scheduling at our abstraction level. Moreover, it illustrates the benefit that can be obtained using both our static and dynamic scheduling techniques on real-life example. The second section gives another illustration of the results that can be obtained with our static scheduling techniques.

Scheduling at the Task-Level

The design of concurrent real-time embedded systems, and embedded software in particular, is a difficult problem, which is hard to perform manually due to the complex consumer-producer relations, the presence of various timing constraints, the non-determinism in the specification and the sometimes tight interaction with the underlying hardware. Here we present a new cost-oriented approach to the problem of task scheduling on a set of processors. It fits in a global task concurrency management approach developed at IMEC. The approach uses as much as possible pre-ordering of the concurrent behavior under real-time constraints and minimizes the run-time overhead. At the same time, the scheduler will try to minimize cost such as the energy consumption. The approach is shown for two processors but it is easy to expand this method to include more than two PEs Overview An embedded system can be specified at a grey-box abstraction level in a combined MTG-CDFG model. This specification is functional in representing the idea of concurrency, time constraints and interaction at either an abstract or a more detailed level, depending on what is required to perform good exploration decisions afterwards. According to the IMEC TCM approach, the task concurrency management can be implemented in three steps. Firstly the concurrency extractionis performed. Task transformations on the specified MTG-CDFG will be applied to increase the opportunities for concurrency exploration and cost minimization. After the extraction, we will get a set of thread frames (TF), each of which consists of many thread nodes and which can be looked at as a more or less independent part of the whole task. Then static scheduling will be applied inside each TF at compile time, including a processor assignment decision in the case of multiple PEs. Finally, a dynamical scheduler will schedule these TFs at run time on the given platform.

The purpose of task concurrency management is to determine a cost-optimal constraint-driven scheduling, allocation and assignment of various tasks to one or more processors. In this report we consider a system consisting of two different processors, on which a thread node can be executed at different speed with different cost, here energy consumption. Given a thread frame (TF), static scheduling is done at compile time to explore the possible points on the global Pareto curve, where each point means a different choice in cycle budget and energy consumption trade-off. The idea here is that each thread node in the TF can be allocated to either of the two processors at different relative order if such an assignment can satisfy all the time constraints internal or external to that TF. By doing this, the cycle budget and energy consumption for the while thread frame will also change accordingly. Each of these points is a different choice of all the possible allocation and scheduling options for this TF and the lowest edge of all these points is just the Pareto curve. Since the static scheduling is done at compile time, computation efforts can be paid as much as needed, provided that it can give a better scheduling result and reduce the computation efforts of dynamic scheduling.

At run time, the dynamic scheduler will then work at the granularity of thread frames. Whenever new thread frames come, the dynamic scheduler will try to schedule them to satisfy their time constraints and minimize the system energy consumption as well. The details inside a thread frame, like the execution time or data dependency of each thread node, can remain invisible to the dynamic scheduler and reduces its complexity significantly. Only some useful features of the Pareto curve will be passed to the dynamic scheduler by the static scheduling results, and be used to find a reasonable cycle budget distribution for all the running thread frames.

We separate the task concurrency management into two separate phases, namely static and dynamic scheduling, for three reasons. First, it can better optimize the embedded software design. Second, it lends more run time flexibility to the whole system. Third, it minimizes the run time computation complexity. The static scheduler works at the grey-box level but still sees quite a lot of information from the global specification. The end result hides all the unnecessary details and the dynamic scheduler only operates on the granularity of thread frame, not single thread node.

Static Scheduling

Figure 29:
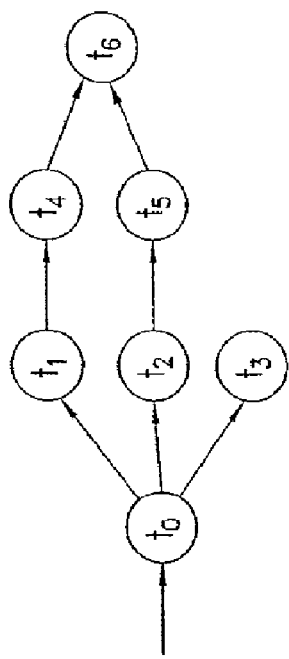

The behavior of a thread frame can be described by task graphs like FIG. 29, where each node represents what functions to perform and their performance requirements. Each edge represents the data dependency between these nodes. The task graph we use here can be seen as a simplified subset of the MTG model and each function is a thread node in MTG. This example is part of a real voice coder. Tab. 1 gives the performance of each node on our two processors. Here some assumptions similar to those in the later ADSL example are made. Though it is not showed here, we can add some other time constraints to the task graph, for instance, task $t_4$ must start n time units after task $t_0$ ends. The TF is scheduled in a non-preemptive way here because we have the a priori knowledge of all the nodes involved.

We use a MILP algorithm to solve the static scheduling problem. Other algorithms can be used here as well. Before giving the algorithm, we need some variable definitions.

Definition all Variables Used for Static Scheduling.

L,H two processors $$\delta_{i,L} = \begin{cases} 1 & \text{task } i \text{ is allocated to processor } L, \\ 0 & \text{otherwise} \end{cases}$$

$$\delta_{i,H} = \begin{cases} 1 & \text{task } i \text{ is allocated to processor } H, \\ 0 & \text{otherwise} \end{cases}$$

$C_{i,L}$ the execution time of task i on processor L
$C_{i,H}$ the execution time of task i on processor H
$E_{i,L}$ the energy consumption of task i on processor L
$E_{i,H}$ the energy consumption of task i on processor H
$T_i^S$ the start time of task i
$T_i^E$ the end time of task i $$b_{i1,i2} = \begin{cases} 1 & \text{task } i1 \text{ ends before task } i2 \text{ starts,} \\ 0 & \text{otherwise} \end{cases}$$

Our aim is to minimize the energy consumption of the whole thread frame, so the object function can be easily defined, $$\text{Minimize: } \sum_i E_{i,H}\delta_{i,H} + E_{i,L}\delta_{i,L}. \tag{6.3}$$

The following constraints have to be fulfilled.

1. Mapping Constraints. Each thread node $t_i$ is executed on only one processor, which is represented in Eq. 6.6.

$$\delta_{i,L} \leq 1 \tag{6.4}$$

$$\delta_{i,H} \leq 1 \tag{6.5}$$

$$\delta_{i,L} + \delta_{i,H} = 1 \tag{6.6}$$

2. Timing Constraints. The task end time is the addition of task start time and execution time.

$$T_i^E = T_i^S + C_{i,L}\delta_{i,L} + C_{i,H}\delta_{i,H} \tag{6.7}$$

3. Precedence Constraints. If thread node $t_i$ is the immediate predecessor of thread node $t_j$, then $$T_i^E \leq T_j^S \tag{6.8}$$

4. Processor Sharing Constraints. For any two thread nodes $t_i$ and $t_j$ that are allocated to the same processor, if $t_i$ is a predecessor or successor of $t_j$, it can never happen that one node will start before the other one ends due to the precedence constraints. Otherwise, the binary variable $b_{i,j}$ is used to describe the processor sharing situation.

$$T_i^E \leq T_j^S + (3-b_{i,j}-\delta_{i,L}-\delta_{j,L})*C_1 \tag{6.9}$$

$$T_j^E \leq T_i^S + (2+b_{i,j}-\delta_{i,L}-\delta_{j,L})*C_2 \tag{6.10}$$

$$T_i^E \leq T_j^S + (3-b_{i,j}-\delta_{i,H}-\delta_{j,H})*C_1 \tag{6.11}$$

$$T_j^E \leq T_i^S + (2+b_{i,j}-\delta_{i,H}-\delta_{j,H})*C_2 \tag{6.12}$$

(6.13)

In the above equations, Eq. 6.9 and Eq. 6.10 are sharing constraints on processor L. When thread node i and j are both allocated to processor L, i.e., $\delta_{i,L}=\delta_{j,L}=1$, if $b_{i,j}$ equals one, i.e., task i ends before task j starts, Eq. 6.9 gives the exactly same hard constraint $T_i^E \leq T_j^S$ and Eq. 6.10 becomes $T_j^E \leq T_i^S + C_2$, which can be ignored if $C_2$ is large enough; if $b_{i,j}$ equals zero, Eq. 6.10 gives the hard constraint $T_j^E \leq T_i^S$ and Eq. 6.9 can be ignored. Eq. 6.11 and Eq. 6.12 describe the similar sharing constraints on processor H. When node i and j are allocated to different processors, all of the above equations will be ignored. Constants $C_1$ and $C_2$ should be large numbers to ensure that the ignored equation will bring no effect.

At the end, a deadline for the whole thread frame can be given, which introduces a global constraint to all the nodes, $$T_i^E \leq \text{Deadline.}$$

Now our problem becomes a deadline constrained energy minimization problem. To every given thread frame deadline, the above MILP equations will give an energy optimized solution. In fact, time constraints other than the whole thread frame deadline can be added easily. For instance, there can be a separate deadline for each node.

Figure 30:
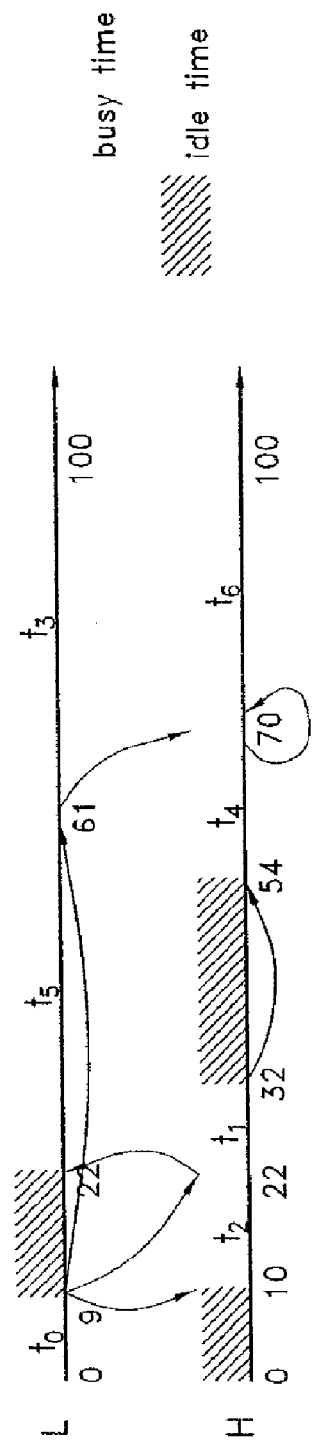

We have done the static scheduling for the thread frame shown in FIG. 29 with the performance given in Tab. 1. When the deadline of the whole thread frame is 100 time units, the result given by the MILP solver is shown in FIG. 30.

Changing the deadline for the whole thread frame, we can obtain a series of points. Each of these points is the optimized energy cost at the fixed deadline and they make up the well known Pareto curve in FIG. 9.

From these points, several ones will be chosen by the static scheduler as typical cases (those indicated by triangles) and will be passed to the dynamic scheduler. The more points are passed, the better a result the dynamic scheduler can achieve, but at a higher run time computation complexity.

Dynamic Scheduling.

Static scheduling provides a series of possible options of allocation and scheduling inside one thread frame, but actually which option would be chosen is decided only by the dynamic scheduler at run time. The dynamic scheduler takes into consideration all the computation requests from all the ready to run thread frames and tries to find a choice for each thread frame so that the whole combinational energy consumption is optimal. At this stage, the clustered entities, namely thread frames, have already been distributed and assigned across the allocated processors. The dynamic scheduler operates on the base of thread frames and tries to satisfy the inter-task timing constraints.

Figure 31:
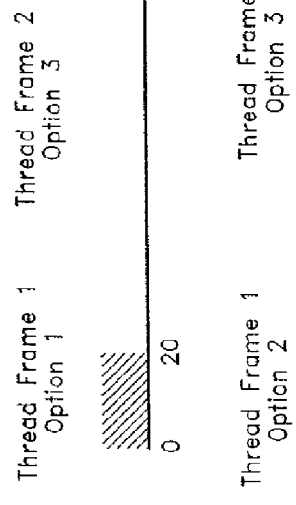
Figure 32:
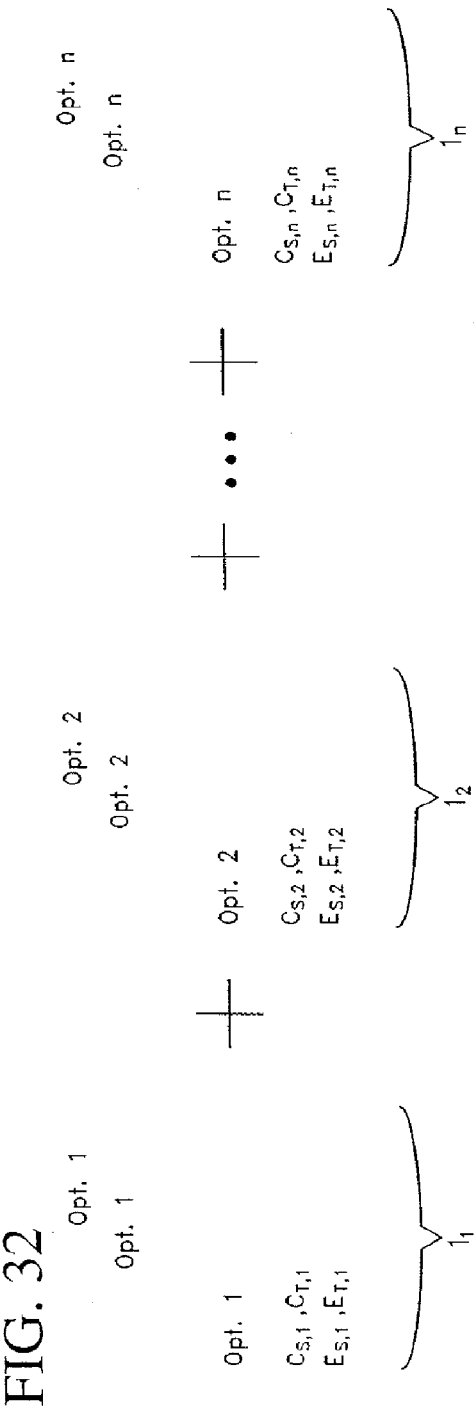

Take the two thread frames in Tab. 2 as instance. Each of these two thread frames has three options corresponding to different cycle budget and energy cost combination. These options are identified by the static scheduler. At run time, if the total cycle budget for these two thread frames is 100, the energy optimal scheduling is option 1 for thread frame 1 and option 3 for thread frame 2. However, the optimal scheduling will become option 2 for thread frame 1 and option 3 for thread frame 2 when the cycle budget is 140. Both cases are depicted in FIG. 31.

Inter-task time constraints, such as the data dependency or execution order among the thread frames, can also be taken into account at this step.

Experiment On ADSL.

In the last section, we have only illustrated the general method we proposed in the task concurrency management context. To better assess the viability of our approach, we have applied it to a more complex ADSL (Asynchronous Digital Subscriber Line) modem application.

ADSL System Architecture.

Figure 33:
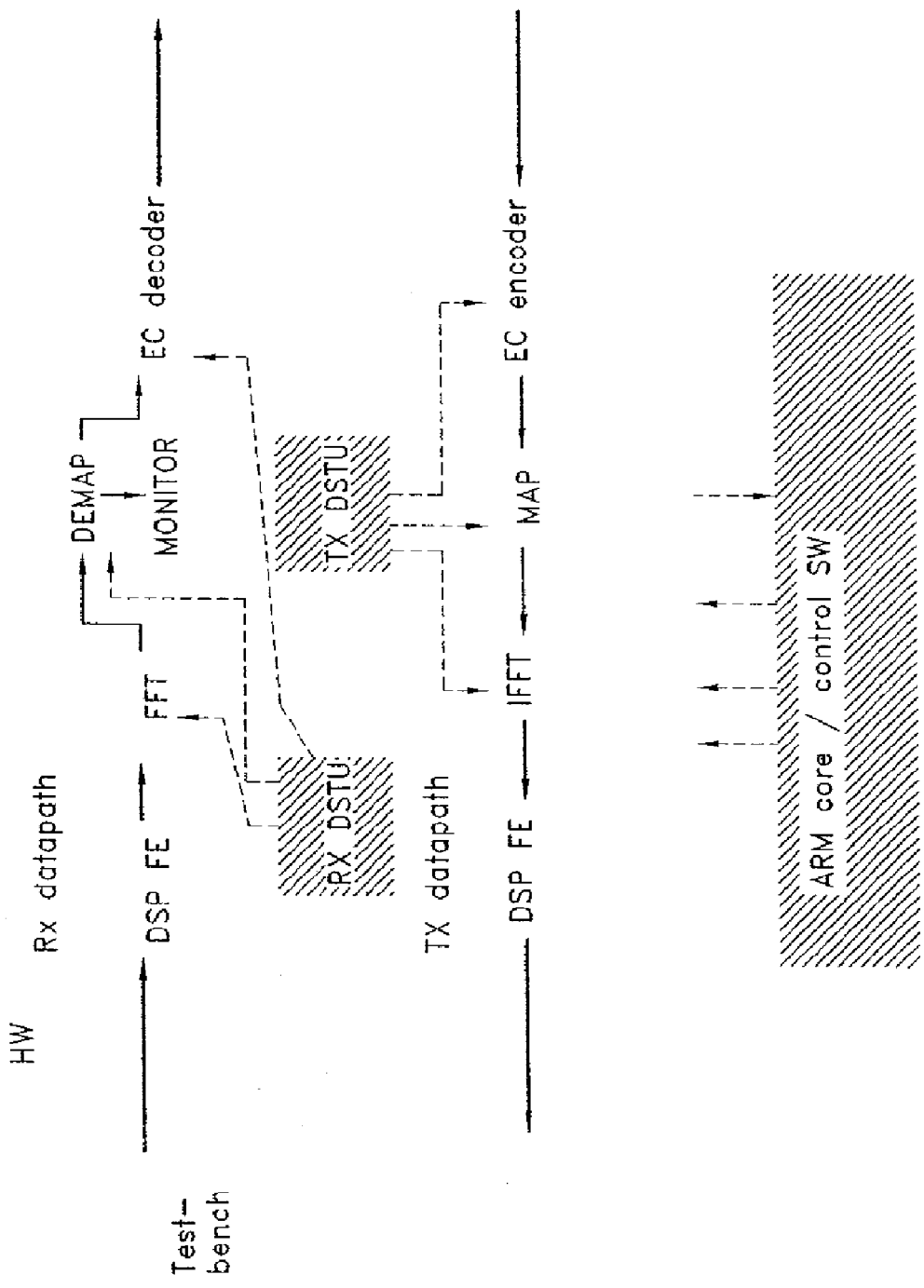

FIG. 33 shows the system architecture of the ADSL modem.

This design consists of both hardware components and an important part of embedded software which exhibits real-time constraints. The digital hardware part includes two parallel datapaths for the receiver and transmitter respectively. The receiver datapath consists of a front-end, a FFT transformer, a QAM demapper, an error and noise monitor and an error-correction decoder. The transmitter datapath has a similar structure. Both datapaths have their own hardware timing controller (DSTU=DMT Symbol Timing Unit). These DSTUs will activate the processors at the correct moments to do the appropriate processing of the DMT (Discrete Multi-tone) symbols.

Next to the hardware components, an ARM core processor runs the software that is responsible for programming and configuring the hardware. It has a control part, that configures the hardware to execute the different stages of the initialization sequence, and an algorithmic part to execute DSP functionality not implemented in hardware. The control part of the embedded software can be described as a reactive system, reacting on events generated by the monitor and other hardware modules, taking into account real-time constraints imposed by the ADSL standard.

In our example, we try to schedule the system consists of the two DSTU and SW modules (the modules in shadow) and model it into two threads. The two DSTU controller make up a thread frame which is generated periodically every 230 μs and the deadline equals the period. The SW module generates another thread frame dynamically when the corresponding event has been triggered. The deadline for the SW thread frame is derived from the ADSL standard. The SW is executed serially, i.e., no new SW thread frame will be generated when there is another SW thread frame being processed. THence, at most two thread frames are executed at any time, one from the DSTU thread and one from the SW thread.

Assumptions.

For the first step, we consider only two processors, one working at a higher voltage ($V_{HIGH}$=3, 4 or 5 V) and the other working at a lower voltage ($V_{LOW}$=1 V). The reason to use the two processor architecture is that it can provide a way to exploit the concurrency inherent in the tasks and consume less energy than the one processor architecture. Regarding the latter point, if there is only one processor, it has to be fast enough to handle the heavy load bursts, and a fast processor is typically also a power greedy processor. However, heavy load bursts come only occasionally. At other times, all the tasks will still be executed on that fast, power greedy processor, though it needs not to be so fast. Even with modern power control technique that the fast processor can be shut down at idle time, it still consumes more energy than the set-up with the two processors working at different voltage, as we will prove later.

The maximal work frequency $f_{max}$ of the processors can be computed as below, $$t_{delay} \alpha \frac{CV_{dd}}{I} \alpha \frac{CV_{dd}}{(V_{dd} - V_{th})^2} = \frac{C}{V_{dd}},$$

$$\therefore f_{max} \alpha V_{dd}.$$

We assume also that the work frequency f is proportional to $V_{dd}$. In CMOS digital circuits, most of the power dissipation comes from dynamic power dissipation. For one time cycle, the average dynamic power dissipation can be computed as, $$P_d \alpha V_{dd}^2 f \alpha V_{dd}^3.$$

For our experiment, we use the values in Tab. 3.

Other assumptions taken here are: the processor is powered down automatically when it is idle and no context switch overhead is considered in the current experiments.

The timer threads work at a rigid 230 μs period and provide the needed control on the hardware, one for the transmitter and the other for the receiver. In the original design, the microcontroller of the timer will execute 128 instructions at most in one period, which is also its deadline. Most of the timer microcontroller instructions are testing, setting and resetting some signal line or register field, which can not be executed on a general processor like the ARM as efficiently as it is done on the specific microcontroller. Thus we assume each microcontroller instruction will take 5 general purpose processor cycles to execute it. Therefore, the worst case execution time of one timer is 64 μs on a 10 MHz processor.

The SW thread is a sequence of sporadic tasks, or events. They are released by the hardware part and have to be completed by their deadline. Another issue worth noticing is that they are executed in a strict sequential order, one task will only start after the previous one ends and no overlap will happen between them. The deadlines and execution times of these tasks are listed in Tab. 4, where the deadline is extracted from the initialization sequence of the ADSL standard and the execution time is measured on a 10 MHz processor.

Algorithms.

Two threads are presented in this experiment, one consists of the two DSTU and the other is the SW controller. For the SW thread, a thread frame is generated dynamically and it has only one thread node. For the timer thread, two thread nodes are generated every symbol period. A thread frame can cover one, two or even more symbol periods and we call it a time block (TB). The more symbol periods in a timer thread frame, the less processor utility ratio we will get due to the increasing idle time. But also less computation efforts are needed at run time since there are less thread frames to be considered by the dynamic scheduler now. There is another difference from what we state in the last section. The execution time and deadline of the SW thread, varying from tens to hundreds of symbol periods, is much longer than the timer TF time granularity, which is only a few symbol periods. Therefore, one SW TF will have to be scheduled simultaneous with many timer TFs so the SW TF is intersected into many pieces by them. Accordingly we changed the dynamic scheduling method a little. When no SW event is triggered, the dynamic scheduler will choose the lest energy consumptive scheduling in which all the timer thread nodes are executed on the low voltage processor. Whenever a SW event is triggered, the dynamic scheduler will find out the execution order of all the TFs involved to save the energy consumption as much as possible.

We use (L,H) pairs to represent a scheduling decision. L is the set of thread nodes assigned to the low voltage processor; H is the set of thread nodes on the high voltage processor. For instance, (1,1)+(s,_) means one DSTU timer thread node and the SW thread are assigned to L, the other DSTU thread node is assigned to H at that TB.

To formalize the problem, suppose we have n static scheduling options for one time block. For each option, $C_{T,i}$ and $C_{S,i}$ (i=1,2,K, n) represent the time that can be used to execute the timer and SW thread in one TB respectively. Similarly, $E_{T,i}$ and $E_{S,i}$ (i=1,2,K, n) represent the energy consumption for timer and SW part in one TB. We will schedule with a time granularity of TB. Suppose the execution time of the coming SW thread node is C and the deadline is D. If we have n possible choices for a TB and let $l_i$(i=1,2,K, n) represent the number of TBs for each choice in the scheduling, to find a feasible scheduling is to find a set if $l_i$ which can provide enough execution time for that task before the deadline meets. To find an optimal scheduling in energy cost is to choose one with the minimal energy consumption among these feasible schedulings. This can be restated as a constrained Integer Linear Programming (ILP) problem as below, $$\sum_{i=1}^{n} l_i \cdot C_{S,i} \geq C, \quad (6.14)$$

$$\sum_{i=1}^{n} l_i \leq \frac{D}{TB}, \quad (6.15)$$

$$\text{minimize: } \sum_{i=1}^{n} l_i \cdot (E_{S,i} + E_{T,i}). \quad (6.16)$$

Eqn. 6.14 is the constraint on execution time for SW; Eqn. 6.15 makes sure that it is done before the deadline meets; Eqn. 6.16 is the optimizing objective function. By solving that ILP problem, we can get an energy optimal, deadline satisfying task schedule.

Experimental Results.

In total five cases are considered in our experiment.

Case 1.

Conditions:

1. TB=1 symbol period;
2. $V_{LOW}$=1V, $V_{HIGH}$=3 V;
3. The two timers and SW threads are scheduled independently.

The Eq. $C_{S,i}$ in Tab. 5 is the equivalent execution time on the 10 MHz processor.

The optimal schedule result derived from the ILP solver is shown in Tab. 6. It is interesting to notice that though task 4 and task 12 have the same execution time, the scheduling result and energy consumed are quite different because of their different deadlines. For a stricter deadline, more part of the thread frame will be executed on the higher voltage processor and that means more power. Task 7 and task 14 also have the same execution time but different scheduling.

Case 2.

Conditions:

1. TB=1 symbol period;
2. $V_{LOW}$=1 V, $V_{HIGH}$=3 V;
3. The two timers are grouped together.

Figure 36:
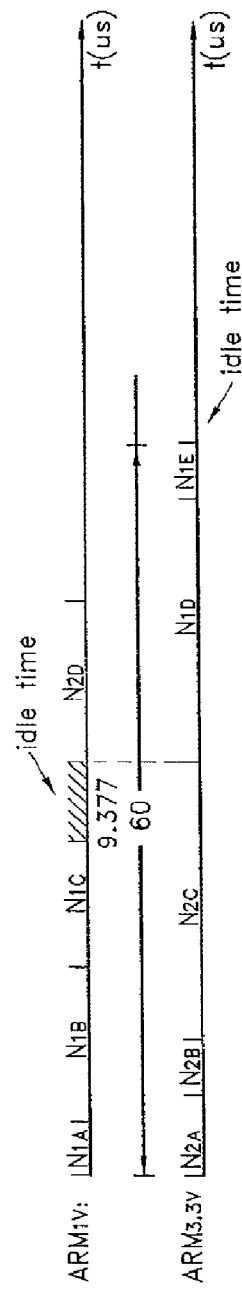
Figure 36:
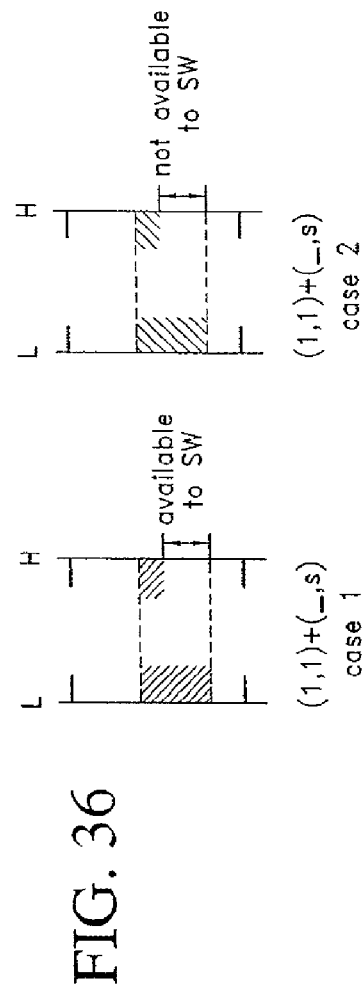

The difference between case 1 and case 2 can be seen in FIG. 36, where the shadowed areas represent the processor time occupied by the DSTU thread nodes. In case 2, the two timers are integrated in one group and scheduled as a unit. Though there is idle time in that group, it is not available to the processes outside that group. The optimal schedule result derived from the ILP solver is shown in Tab. 8.

Case 3.

Conditions:

1. TB=2 symbol periods;
2. $V_{LOW}$=1 V, $V_{HIGH}$=3 V;
3. The two timers are grouped together for two symbols.

Figure 37:
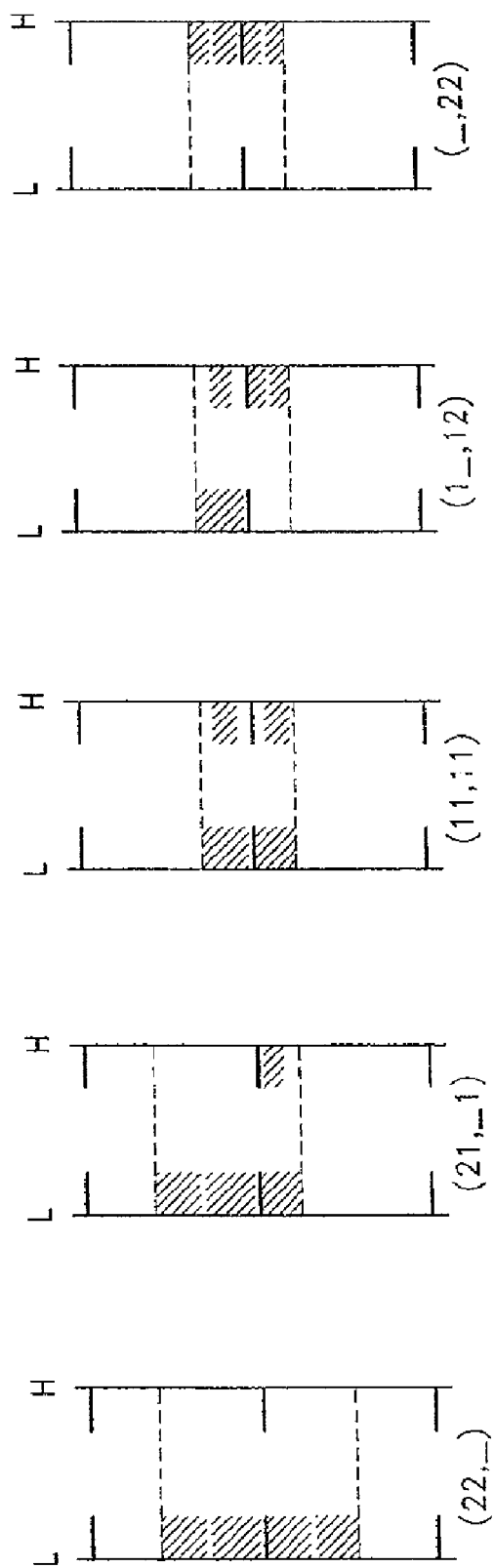

All possible schedules of the timers in two symbol periods that make a reasonable distinction can be found in FIG. 37. The optimal schedule result derived from the ILP solver is shown in Tab. 10.

Case 4.

Conditions:

1. TB=3 symbol periods;
2. $V_{LOW}$=1V, $V_{HIGH}$=4 V;
3. The two timers are grouped together for three symbols.

The reason we change the higher voltage to 4V is that it is unschedulable with a 3V processor. The possible schedules of the timers for one TB is similar to case 3. The only difference is that one symbol, in which both timers are scheduled to L, is inserted between the original two symbols. The optimal schedule result derived from the ILP solver is shown in Tab. 12.

Case 5.

Conditions:

1. TB=4 symbol periods;
2. $V_{LOW}$=1 V, $V_{HIGH}$=5 V;
3. The two timers are grouped together for four symbols.

For the same reason as in case 4, we change the higher voltage to 5V. The possible schedules of the timers for one TB are similar to case 3 except for the two inserted symbols. The schedule result derived from the ILP solver is shown in Tab. 14.

Further Analysis.

Checking the result above carefully one will find that the energy cost of task7 and task11 in case2 is higher than those in case3. That is because we have more scheduling options in one TB for case3, which can be interpreted as a less power costly scheduling result but with more effort in overhead and communication.

To get an idea of the energy cost versus different scheduling cases we can refer to Tab. 15. Remember case4 and case5 have a working voltage different from the first three cases to keep it still schedulable. To make a fair comparison, we change the high voltage of all cases to 5 V. The result is shown in Tab. 16. It can be found out that while the granularity of a TB increases, the energy consumption increases also. However, as mentioned before, the whole overhead cost will decrease since there are fewer TBs to be scheduled dynamically. We also computed the energy consumption under only one processor architecture. It's 18.3 when that processor works at 3 V and 51.2 when it works at 5 V. Compared with the one processor architecture, there is an energy saving of about 20% even at the biggest TB in case 5. This energy saving percentage varies with the system load. The heavier the load, the less the saving percentage because more work will be done on the high voltage processor. When all the tasks are done on the high voltage processor, it is reduced to the one processor case.

The overhead of the above dynamical scheduling process can be divided into two parts. First, the computation to find an optimal scheduling at the coming of a new TF; secondly, the effort to control the thread nodes when a TF is being executed. An MILP model is chosen here for the first part and the branch and bound approach is used to solve that problem.

Conclusions.

In this proposal, we present our approach of doing task concurrency management on a multiprocessor architecture for power saving consideration. The TCM is done in three steps, namely the concurrency extraction, the static scheduling and the dynamic scheduling steps. A static scheduling method is proposed to get an power optimal static scheduling for a thread frame under given time constraints or deadline. Varying the frame deadline will give a series of cycle budget and power cost tradeoff points, on which a dynamic thread frame scheduling will be done. At present, we used a MILP method for the dynamic scheduling. Other scheduling methods can be applied as well. This three step approach can bring flexibility and reduced design time to the embedded SW design.

These techniques are applied to a ADSL modem application and some interesting results are derived. First, more than 20% power saving can be obtained. Second, we changed the granularity of a TF and demonstrate that a tradeoff exists between the dynamical scheduling overhead and scheduling optimality.

A New Static Scheduling Heuristic and its Experiment Results on the IM1 Player

In this section we will introduce a new static scheduling heuristic. Its major difference from existing algorithms are explained then. Finally, it is applied to the IM1 player. Experiment results are used to illustrate the above arguments. The example is again derived from the IM1-player. The part scheduled here is similar to the one illustrated in the previous section (cfr. 6.3.1).

Our approach can be applied to the multiprocessor platform without the need of changing the processor voltage dynamically. Given a multiple processor platform, i.e., the number of high-speed processors and low-speed processors, we aim at deriving an energy-cost vs time-budget curve. Compared with other scheduling algorithms, like MILP (mixed integer linear programming), our approach has the following difference. In the first place, our heuristic derives a set of working points on the energy-cost vs time-budget plane instead of only one point. These working points range from the most optimal performance point within that given platform to the point barely meeting timing constraints. For a given platform, these working points form a Pareto curve, which enables designer to trade off between cost (energy-consumption) and performance (time-budget). For example, when combining subsystems into a complete system or during the dynamic scheduling stage, we need to select working points of subsystems and combine them into a globally optimal working point. Existence of these different working points is mostly due to the different thread node to processor assignments (some of it is due to idle time in the schedule). As a result this heuristic deal with both a crucial assignment problem and ordering problem. Secondly, it uses an intelligent policy to prune the search space heavily. Hence, the computation complexity is reduced. Thirdly, it does not need to change the processor voltage dynamically.

To achieve the above objective, the heuritic uses the following two criteria to make the assignment and scheduling decisions. The first criterion is the self-weight of a thread node. It is defined as the execution time of the thread node on the low-speed processor. The larger the self-weight of a thread node, the higher its priority to be mapped on a high-speed processor.

The second criterion is the load of a thread node. If some thread nodes are depending on a thread node, the sum of the self-weights of all the dependent thread nodes is defined as the load of the thread node. It is worth noting that "dependent" means control dependence. The more load a thread node has, the earlier it should start to execute.

From the above criteria, when a processor is available, the following strategy takes care of selecting a candidate thread node.

1. When a thread node is dominant both in the self-weight and load over the other candidate thread nodes, it will be scheduled first.

2. When one thread node has a dominant self-weight and another thread node has a dominant load, either of them can be scheduled first. By alternating their order different points on the energy-cost vs time-budget plane can be generated.

It is better to realize that the heuristic implicitly includes energy considerations. Because for a given processor, the energy consumption is directly related to the execution time. The self-weight and load in the heuristic are merely two interpretations of execution time from different perspectives. Applying this heuristic to the IM1 player will be discussed in the following section. Even though it seems relatively simple, it turns out to be very effective for scheduling the tasks in the MPEG-4 IM1 player.

When applied to the IM1 player, the heuristic the task graph of the IM1 player as input. Two parellel ARM7TDMI processors, running at 1V and 3.3V respectively, are used to illustrate the scheduling. The main constraint for scheduling is the period. It starts at the reading of one $VOP^2$ data and expires at the end of the decoding of the data. Energy is the cost function used here. Currently, it includes both the processor energy and DTS energy. The DTS energy is mainly used for buffering between the reading and decoding of the data.

[2] Video Object Plane

The period we have measured for the initial V1 version is around 1000 μs per packet. Such a long period is caused by reserving and releasing semaphores. The period varies due to the jitter of the operating system. After our initial transformations, we have produced version V2 of the task graph.

Without loss of generality, we assume that one VOP data consists of two packets of data. The current implementation dictates that the two packets be read and decoded sequentially. That is, only after one packet is read and decoded, a second packet can be read and decoded. Due to such a limitation, we can only reduce the period by executing some nodes on a high VDD processor.

For one node, we use $t_L$ and $t_H$ to denote the its execution time on the 1V ARM7TDMI and 3.3V ARM7TDMI respectively and $\Delta t$ to denote the difference between these two execution times. Similarly, we use $E_L$ and $E_H$ to denote its cost of the processor energy to run on 1V ARM7TDMI and 3.3 ARM7TDMI and $\Delta E$ to denote the energy difference. Our calculations are based on the following formulae.

$$\Delta t = t_L - t_H = \left(1 - \frac{1}{3.3}\right) t_L \qquad (6.17)$$

$$\Delta E = E_H - E_L = (3.3^2 - 1) E_L \qquad (6.18)$$

For transformed graph V2, we start scheduling by assigning every node to the low Vdd processor and moving selected nodes to high Vdd processor when a shorter period is needed. We end up at assigning every node to the high Vdd processor. The period and total energy cost of the Pareto-optimal points in the search space are shown in FIG. 34.

After additional transformations that lead to V3, we remove the implicit sequential restriction in the code. Consequently, it is feasible to read and decode more than one data packet concurrently. We can better utilize the two processors by exploiting the concurrency and hence we can shorten the period with less energy cost.

Figure 35:
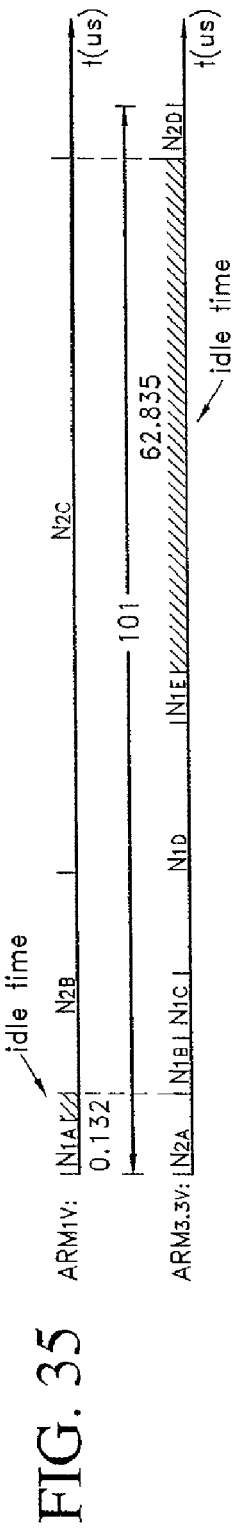

Two scheduling examples of the V3 task graph are shown in FIG. 35. We use $N_{1A}$, $N_{1B}\Lambda$ and $N_{2A}$, $N_{2B}$, $\Lambda$ to denote the nodes for reading and decoding of the two data packets respectively. FIG. 35 shows that the period varies significantly due to different scheduling. The scheduling result is shown in FIG. 34.

FIG. 34 shows that scheduling point 2, 7 and 8 are not on the Pareto curve because point 3 and 9 offer a shorter period with a lower energy cost. It is clear that version V3 is better than version V2.

Notice that reading two data packets concurrently has a higher memory energy cost than reading the packets sequentially since a larger buffer is needed. In the graph, the total energy cost for version V3 is initially higher due to the above reason. At smaller period points, scheduling the transformed graph V3 offers a shorter period with a lower energy cost.

Management of Data Structures at the Task-Level

The data used by the tasks needs to be managed and mapped efficiently on the target platform at the task-level. More in particular, we propose several transformations that optimize the energy consumption and memory occupation of data structures which dependent on the dynamic behavior of the application. Note that these transformations will be applied on a system using the grey-box model presented above. The main advantage of this model is that is exposes all relevant information about the dynamic behavior and the most important data structures of the application.

Reducing the Dynamic Memory Requirements

When developing an initial model of a system, specification engineers normally spend neither time nor energy to accurately use dynamic memory. They are mainly concerned with the functionality and the correctness of the system. As a result, the software model is often very memory inefficient. However, for the design engineers it afterwards becomes an almost unmanageable and at least an error-prone process to improve the dynamic memory usage due to dangling pointers and memory leaks. Therefore, they will either redesign the system from scratch or use the same system but increase the memory, which results in a more power hungry architecture. We will present two formalizable transformations that allow us to systematically reduce the amount of dynamic memory required by the application. The benefit of these transformations can be exploited on different multi-processor platforms. Therefore, we will discuss the influence of the platform on the DM requirements of an application and we will explain how these can be relaxed.

Control/Data-flow Transformations Enabling a Reduction of the Dynamic Memory Requirements. With the first transformation we reduce the life-time of the dynamically allocated memory by allocating the memory as late as possible and deallocating it as soon as possible. As a result of our approach, we are able to increase the storage rotation, which can significantly reduce the amount of memory required by the application. Indeed, in most applications memory is allocated in advance and only used a long time after. This design principle is applied to obtain flexible and well structured code which is easy to reuse. Although this can be a good strategy to specify systems on a powerful general purpose platform, the extra memory cost paid is not acceptable for cost-sensitive embedded systems. This allocation policy could also be implemented using a garbage collector. However, transforming the source code instead of relying on a run-time garbage collector to implement this results in a lower power consumption. The transformation acts as an enabling step for the second transformation and the task-ordering step discussed below, By postponing the allocation we are able to gather more accurate information on the precise amount of memory needed. This information can be used to optimize the amount of memory allocated for each data type. The ratio behind this transformation is that specification engineers often allocate conservatively large amounts of memory. In this way, they try to avoid cumbersome and difficult debugging. They hereby forget that it is much harder for implementation engineers to re-specify afterwards the amount of memory as they do not have the same algorithmic background. For the same reason, automation of this transformation is particularly hard.

We have applied both transformations on the dynamically allocated buffers in the IM1-player. These buffers are used to store the input and output of the compression layer. The size of the input buffers is transmitted in the OD data packets; the size of the output buffers is fixed at design-time and differs for each decoder type.

Figure 38:
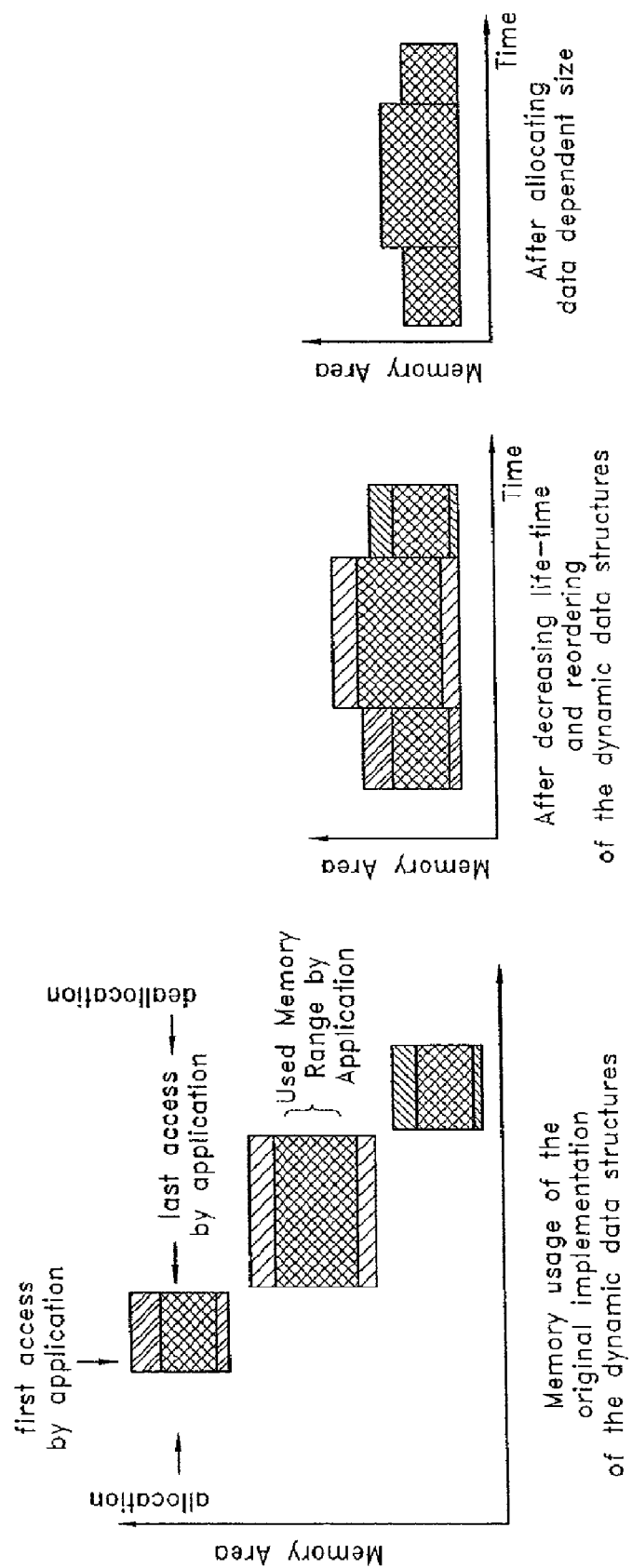

We have profiled the time-instants at which each buffer is (de)allocated and is first (last) used. All the input buffers are allocated and freed at the same time. However, on the original one processor-platform, the buffers are used sequentially. As a consequence, by reducing the life-time of these buffers it is possible to overlap them and significantly decrease the amount of memory needed. This principal is illustrated on the left part of FIG. 38.

By analyzing the memory accesses to the allocated memory, we have found out that a large part of the dynamically allocated output buffers is never accessed. By applying our first transformation, we are able to reduce the output buffer size by making it data dependent. Instead of using worst case sizes, the more average data dependent sizes required by the input stream can now be used (see right part of FIG. 38).

Constraints on Static and Dynamic Task-Schedule Reducing the Dynamic Memory Cost on a Multi-Processor Platform. After improving the characteristics of the application with the transformations mentioned above, its tasks still need to be assigned and scheduled on a 'platform.' By constraining the task-schedule of the application (e.g. scheduling the task that requires the largest amount of memory first) it is possible to avoid consecutive (de)allocations of the same memory. In this way, not only some memory accesses can be avoided (and as a result power saved), but also the fragmentation of the memory can be reduced.

In addition, when exploiting the parallelism inside the application, the amount of memory needed by the application will normally increase proportional to the amount of processors. This relation can be improved by avoiding that two tasks both using a large amount of memory, are executed simultaneously. Our transformations applied prior to this step will relax the constraints on the task-schedule.

Figure 39:
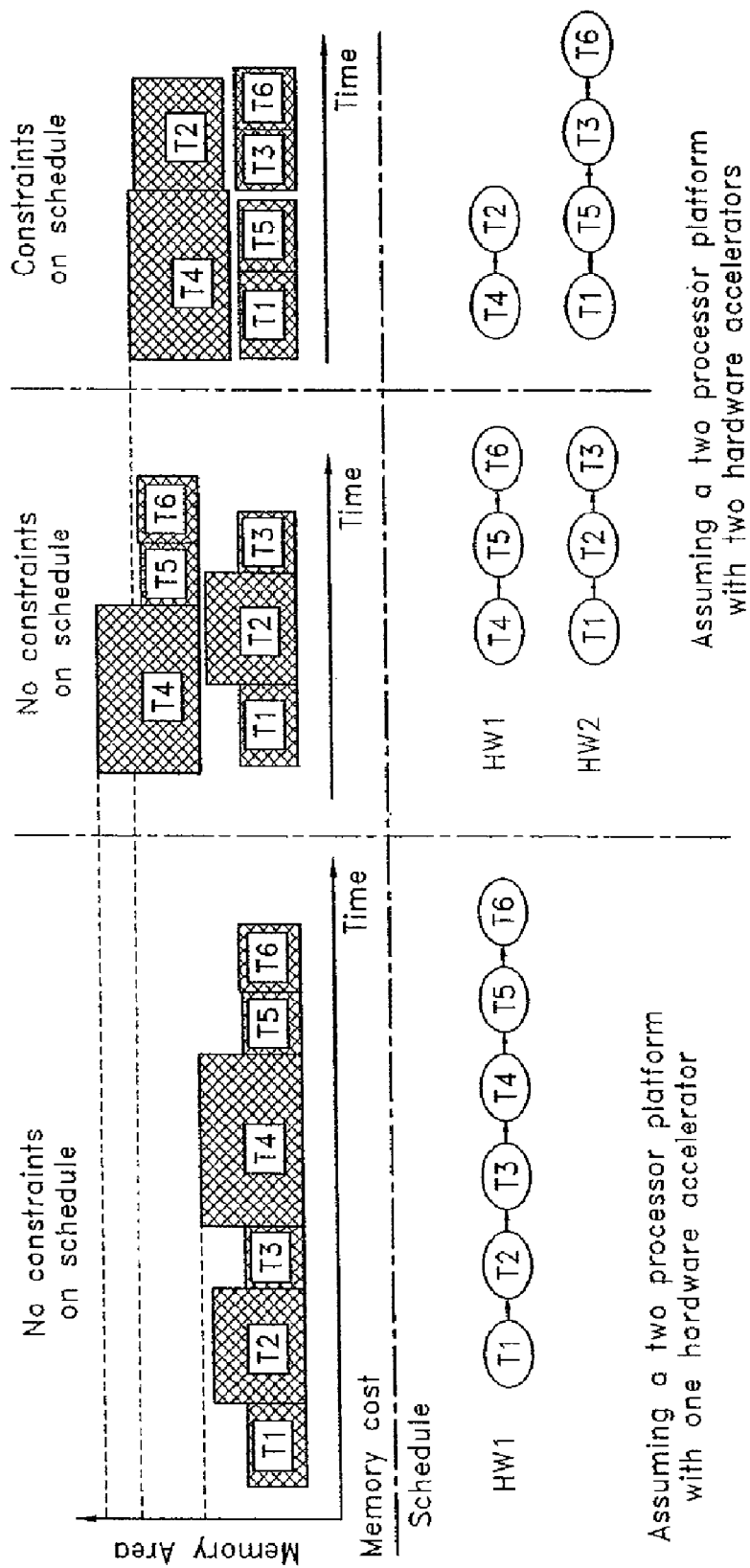

We will illustrate this with the same example as above. Initially, it is useless to reorder the different tasks to decrease the DM cost of the input-buffers. All buffers have the same life-time and no gain can be made by reordering the different tasks. After applying the enabling transformations discussed above, we obtain more freedom to reorder (or constrain) the task-schedule to decrease the DM cost. E.g. we can avoid decoding simultaneously the wavelet decoders that require much memory. As a consequence, the total amount of required memory increases less than proportional to the amount of parallelism (see FIG. 39).

Experiments and Results

In this section we will prove quantatively the results of our transformation methodology. In a first part we will present the benefit of our transformations on the input buffers. In a second part we will briefly explain the potential benefit of our methodology on the output buffers.

We will schedule the IM1-player on a representative platform consisting of two software processors with extra hardware accelerators added to decode the AV-data. The system layer of the player consists of three tasks running on the software processors, i.e. the delivery layer, BIFS- and OD decoder. The two parallel SA110 processors running both at 1V are used to illustrate the scheduling. The main constraint for scheduling is the time-budget, i.e. 30 ms to render one frame. The two SA110 processors consume 40 mW each. The energy consumed by the hardware accelerators is estimated based on realistic numbers that we obtained by measuring the a wavelet decoding oriented chip that we have developed at IMEC. The cost of the memory is calculated based on recent memory-models supplied by vendors (Alcatel 0.35u DRAM for the embedded memory and Siemens Infineon DRAM for the external memory).

In a first experiment we have scheduled the IM1-player using only one hardware accelerator. We have added afterwards an extra one to improve the performance of the system and decode more objects per frame. We have compared all our results with the performance of the initial specification mapped on the same platform.

The results in Tab. 18 and 17 clearly show the potential benefit of the transformations as they allow us to reduce the global power cost (including both processor and memory cost) with almost 20%. Moreover, this methodology still can be applied on other parts of the player and does not need to be restricted to the input buffers only. We have obtained this power gain because we are able to significantly reduce the amount of memory required by the application. As a consequence, the data can be stored on embedded DRAM instead of on off-chip DRAM. We believe that two reasons make our approach scalable to future applications: if embedded DRAM would become available that is large enough to contain the initial data structures, our transformations will still be needed because the power consumption of embedded DRAM scales at least super logarithmic with its size. Moreover, we believe that the amount of data required by the applications will increase at least proportional to the size of embedded DRAM.

As indicated above, the buffer size would normally increase proportionally with the amount of parallelism. By constraining the schedule this can be avoided. The results for a two hardware accelerator context are represented in Tab. 18. One can also derive from Tab. 17 and Tab. 18 that the fraction of the memory cost increases in the total energy budget when more parallelism is exploited in the system. This illustrates the importance of these constraints on highly parallel platforms.

In this final paragraph we present the effect of our transformations on the output buffers. We are able to significantly reduce the size of these buffers, i.e. from 750 kB to 105 kB. Consequently, it further reduces the power cost of the memory accesses and allows us to embed the IM1 protocol on a portable device.

Conclusion

In this paper we have presented several systematic data/control flow transformations for advanced real-time multimedia applications which reduce the power (area) cost of the dynamically allocated memory or increase the performance of the system. The first transformation has reduced the lifetime of the dynamically allocated data structures. As a result, the memory rotation could be significantly increased which reduces the required amount of memory. It also functioned as an enabling step for the second transformation, in which we have defined more accurately the amount of memory needed for each data structure. Finally, we have given some constraints which help to relax the effect of parallel execution of tasks on the increasing buffer cost. We have illustrated these techniques with examples extracted from a real multi-media application, the MPEG4 IM1-player. They allowed us to reduce the energy consumption of the memories with at least a factor of 5. As a consequence, the global power cost of a significant part of this particular application has decreased with 20% without even touching the other subsystems.

Conclusion

Figure 2:
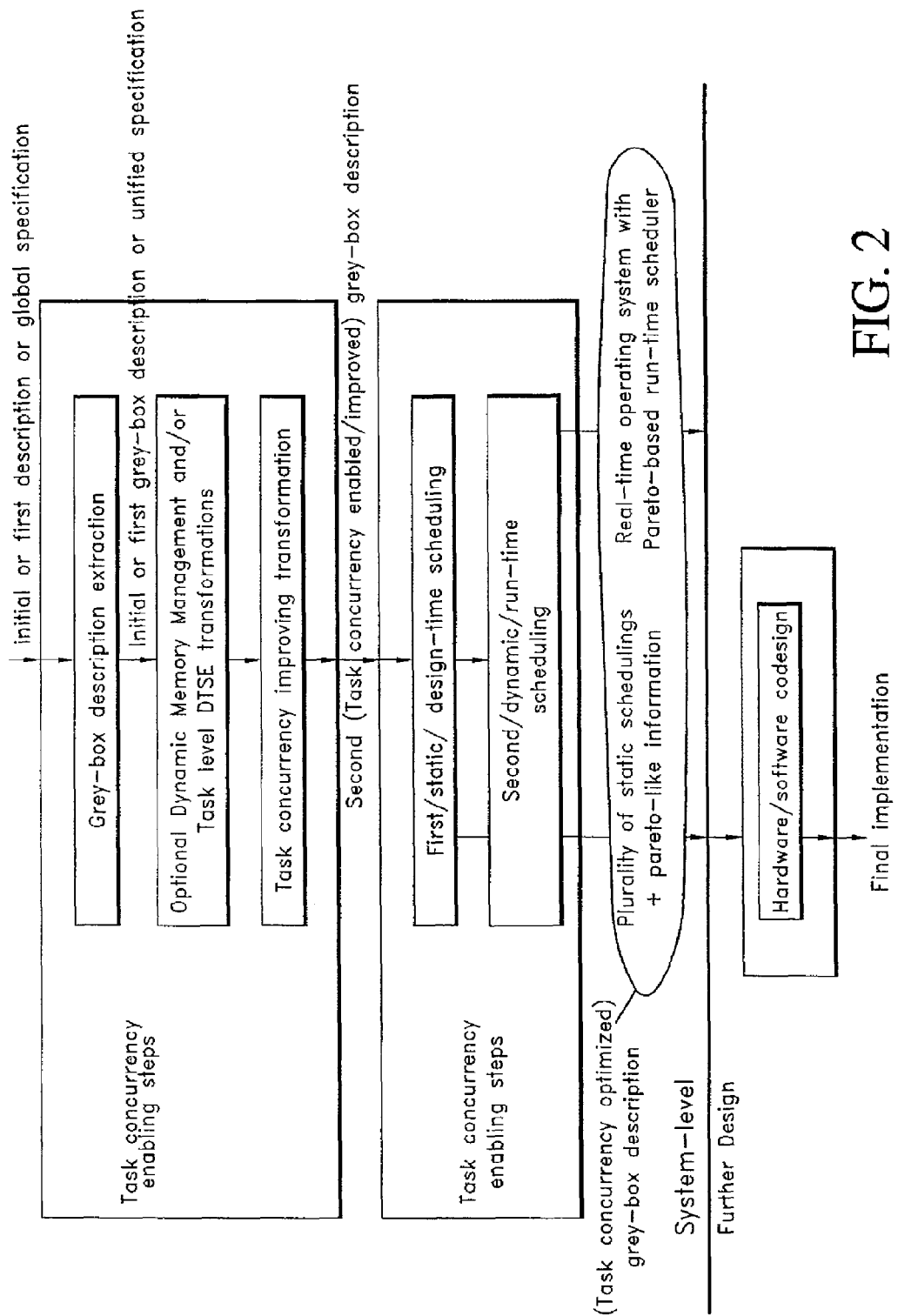
Figure 3:
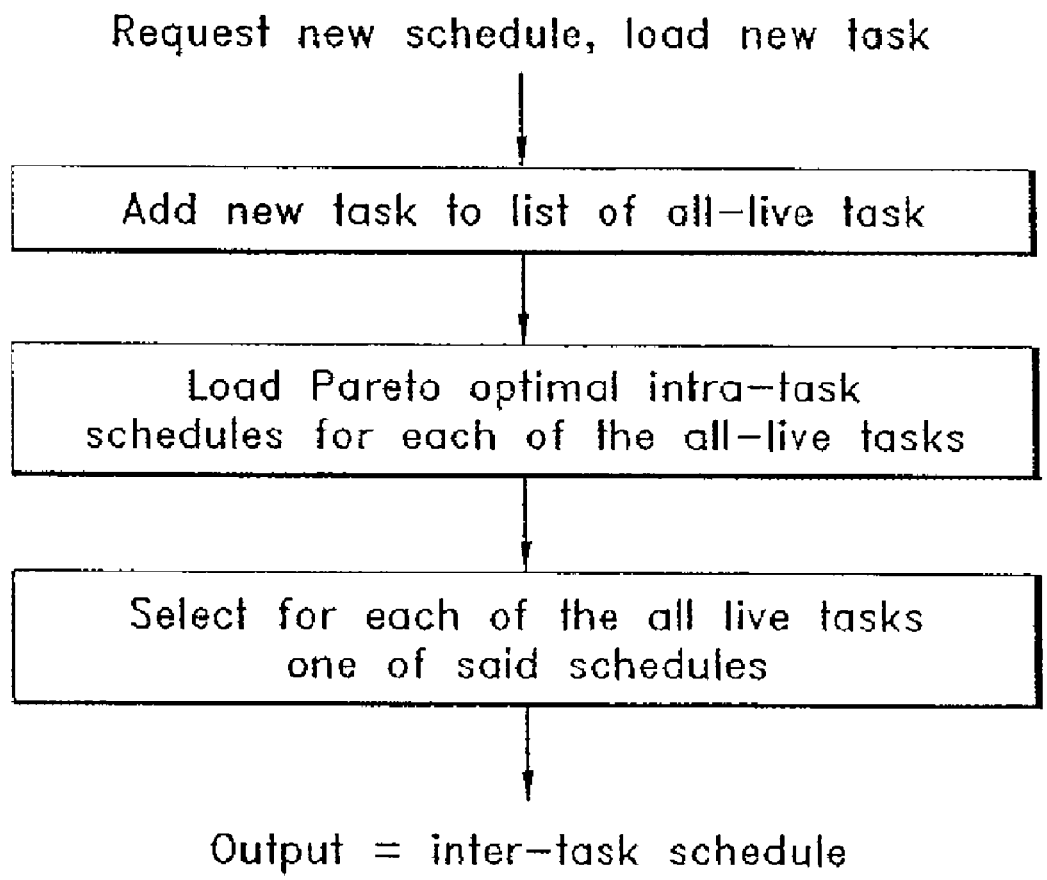
Figure 4:
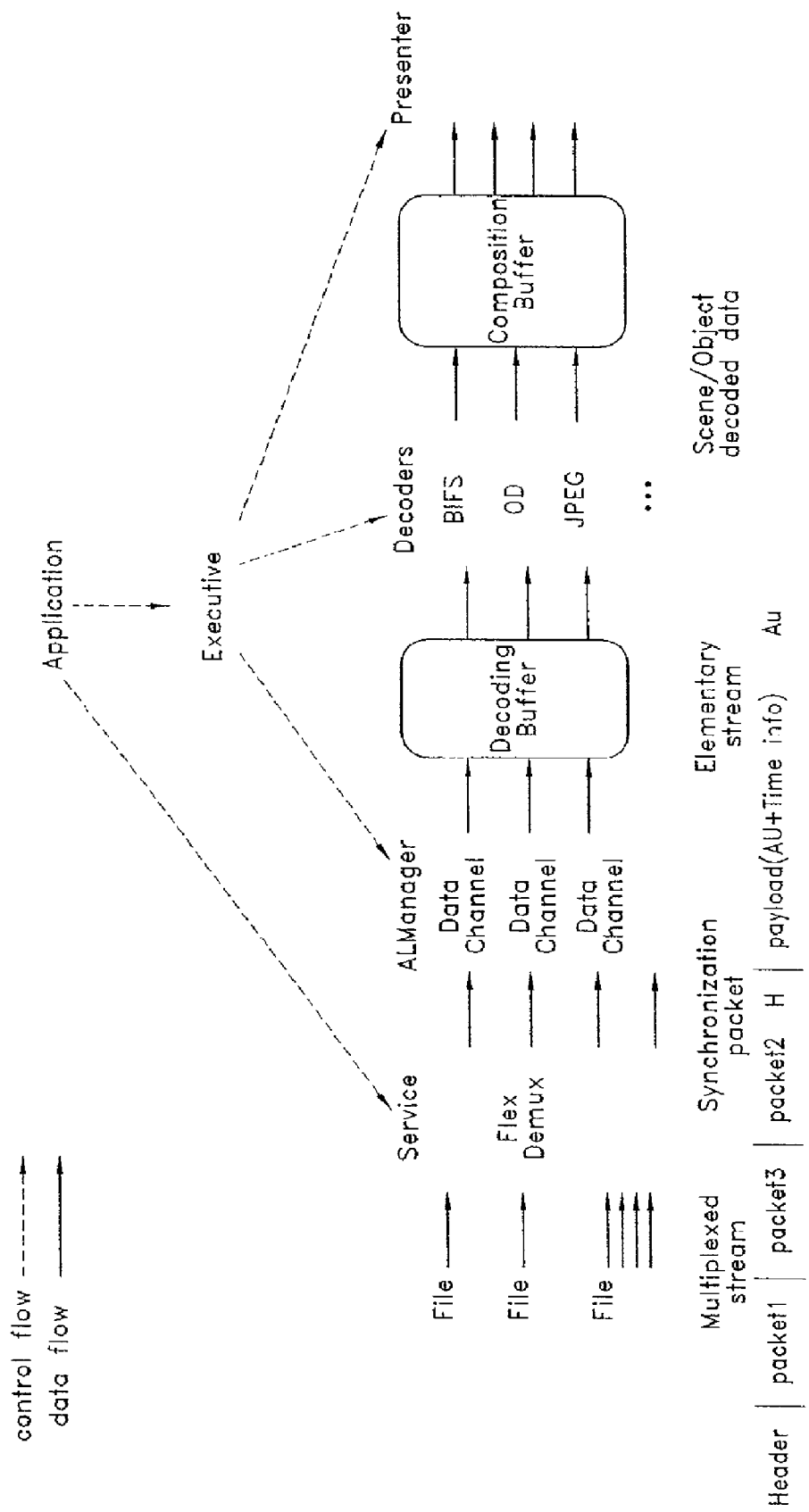
Figure 5:
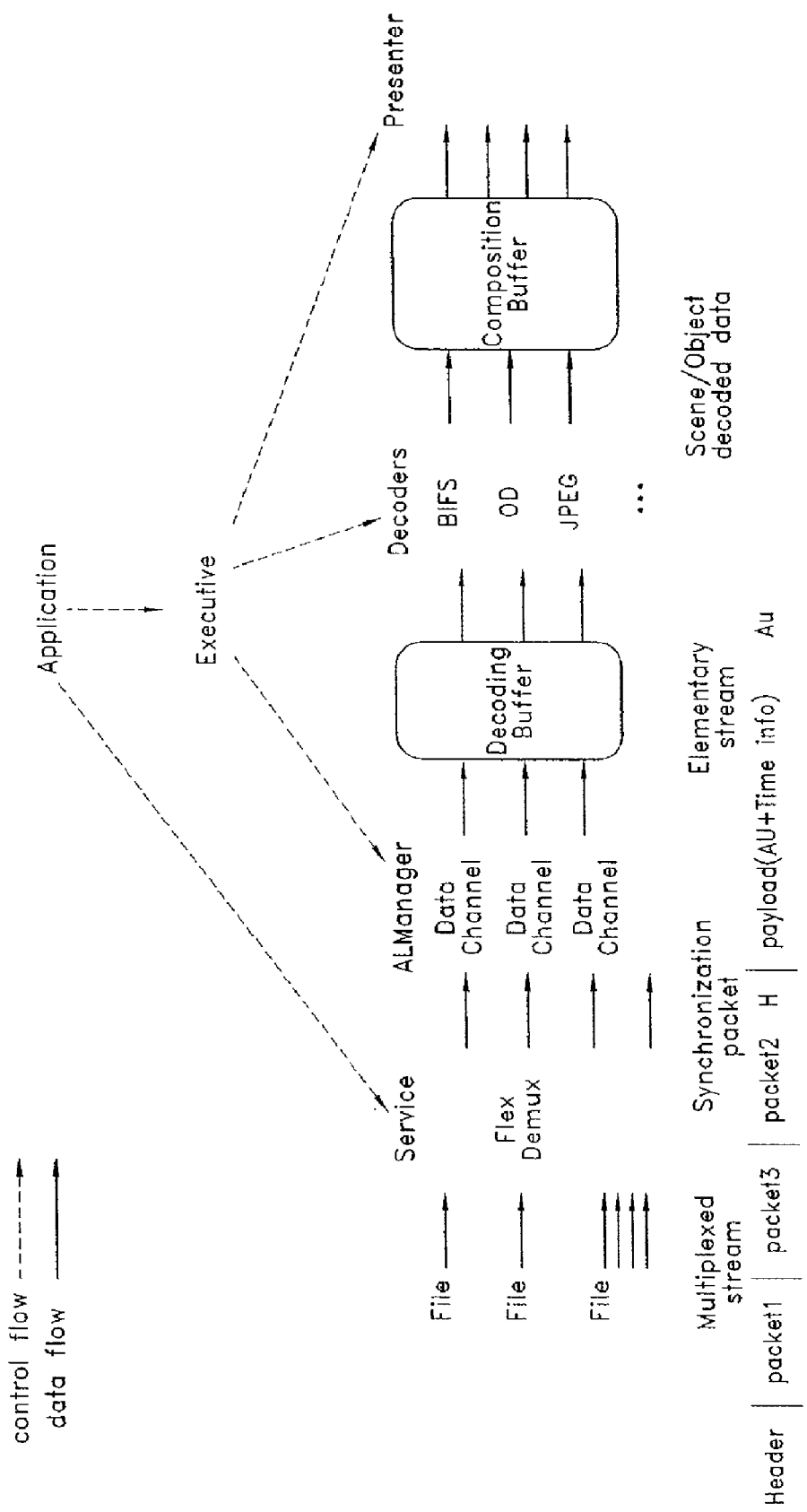

It is clear from the description and FIG. 1 that the invented design flow differs from the prior art flows as it include an extra task concurrency optimization step being located before hardware/software co-design. Further the new design flow works on a grey-box model, containing only part of the logical operations and the co-design step starts of with a partial scheduled description. The TCM step also generates a real-time operating system and a dynamic scheduler therefor FIG. 2 illustrates that the TCM optimization step comprises of a design-time and run-time step. Also extra step, such as grey-box description extraction, dynamic memory management, task-level data transfer and storage, and task concurrency improvement steps are indicated. It is shown that the static or design-time step generates static schedules and pareto information, being used within the run-time scheduler. FIG. 3 shows a possible implementation of the real-time operating system with a dynamic scheduler, accepting a request for a new schedule. A new task is loaded. For each of tasks on the list on alive tasks a subset of all possible intra-task schedules, more in particular the Pareto optimal ones, are loaded. The dynamic scheduler selects for each of these alive task one schedule. The selected schedules define an overall schedule for the alive tasks. This schedule is executed, starting with executing the first scheduled node of the first scheduled task.

TABLE 1

| | Execution Time | | | | | | | Energy Consumption | | | | | | |
|---|---|---|---|---|---|---|---|---|---|---|---|---|---|---|
| | $t_0$ | $t_1$ | $t_2$ | $t_3$ | $t_4$ | $t_5$ | $t_6$ | $t_0$ | $t_1$ | $t_2$ | $t_3$ | $t_4$ | $t_5$ | $t_6$ |
| P1(H) | 3 | 10 | 12 | 13 | 16 | 13 | 30 | 27 | 90 | 108 | 117 | 144 | 117 | 270 |
| P2(L) | 9 | 30 | 36 | 39 | 48 | 39 | 90 | 3 | 10 | 12 | 13 | 16 | 13 | 30 |

TABLE 2

| | Thread Frame One | | | Thread Frame Two | | |
|---|---|---|---|---|---|---|
| | opt. 1 | opt. 2 | opt. 3 | opt. 1 | opt. 2 | opt. 3 |
| Cycle Budget | 20 | 60 | 100 | 40 | 60 | 80 |
| Energy Cost | 110 | 80 | 50 | 90 | 60 | 50 |

TABLE 3

| | Vdd | | | |
|---|---|---|---|---|
| | 1 V | 3 V | 4 V | 5 V |
| Frequency | 10 MHZ | 30 MHZ | 40 MHZ | 50 MHZ |
| Power (normalized) | 1 | 27 | 64 | 125 |

TABLE 4

| | Task | | | | | | | | | | | | | |
|---|---|---|---|---|---|---|---|---|---|---|---|---|---|---|
| | 4 | 5 | 6 | 7 | 8 | 9 | 10 | 11 | 12 | 14 | 15 | 16 | 17 | 18 |
| Deadline (symbol) | 128 | 96 | 128 | 128 | 768 | 256 | 128 | 132 | 16 | 64 | 16 | 2048 | 64 | 576 |
| Ex. Time (ms)(10 MHZ) | 3 | 3 | 3 | 21 | 240 | 9 | 60 | 12 | 3 | 21 | 3 | 864 | 18 | 285 |

TABLE 5

| | (L, H) | | | | | |
|---|---|---|---|---|---|---|
| | 1, 1 | | 2, _ | | _, 2 | |
| | s, _ | _, s | s, _ | _, s | s, _ | _, s |
| Eq. $C_{S,i}$ (μs) | 166 | 624 | 102 | 690 | 230 | 564 |
| $E_{S,i} + E_{T,i}$ (×10⁻⁶) | 797 | 6247 | 230 | 6338 | 1364 | 6210 |

TABLE 6

| | (L, H) | | | | | | Energy |
|---|---|---|---|---|---|---|---|
| | 1, 1 | | 2, _ | | _, 2 | | |
| | s, _ | _, s | s, _ | _, s | s, _ | _, s | (×10⁻⁶) |
| task4 | | | 30 | | | | 6900 |
| task7 | 1 | | 65 | | 62 | | 100315 |
| task8 | 1 | | | 138 | 629 | | 1.73 × 10⁶ |
| task9 | | | 89 | | | | 20470 |
| task10 | | | 2 | 67 | 59 | | 505582 |
| task11 | | | 3 | 11 | 18 | | 94960 |
| task12 | | | 5 | | 11 | | 16154 |
| task14 | | | 1 | 14 | 49 | | 155798 |
| task16 | 1 | | 2 | 855 | 1190 | | 7.04 × 10⁶ |
| task17 | | | 3 | 8 | 53 | | 123686 |
| task18 | 1 | | 1 | 332 | 242 | | 2.44 × 10⁶ |
| | | | | | | Total | 1.22 × 10⁷ |

TABLE 7

| | (L, H) | | | | | |
|---|---|---|---|---|---|---|
| | 1, 1 | | 2, _ | | _, 2 | |
| | s, _ | _, s | s, _ | _, s | s, _ | _, s |
| Eq. $C_{S,i}$ (μs) | 166 | 498 | 102 | 306 | 188 | 564 |
| $E_{S,i} + E_{T,i}$ (×10⁻⁶) | 797 | 5113 | 230 | 2882 | 1322 | 6210 |

TABLE 8

| | (L, H) | | | | | | Energy |
|---|---|---|---|---|---|---|---|
| | 1, 1 | | 2, _ | | _, 2 | | |
| | s, _ | _, s | s, _ | _, s | s, _ | _, s | (×10⁻⁶) |
| task4 | | | 30 | | | | 6900 |
| task7 | 123 | | 4 | | 1 | | 100273 |
| task8 | 429 | 339 | | | | | 2.075 × 10⁶ |
| task9 | | | 89 | | | | 20470 |
| task10 | 10 | 117 | 1 | | | | 606421 |
| task11 | 12 | 19 | | | | 1 | 112921 |
| task12 | 14 | 1 | | | 1 | | 17593 |
| task14 | 32 | 30 | | | 1 | 1 | 186426 |
| task16 | 467 | 1579 | | 2 | | | 8.45 × 10⁶ |
| task17 | 40 | 22 | 1 | 1 | | | 147478 |
| task18 | 4 | 570 | | | 1 | 1 | 2.92 × 10⁶ |
| | | | | | | Total | 1.464 × 10⁷ |

TABLE 9

| | (L,H) | | | | | | | | | |
|---|---|---|---|---|---|---|---|---|---|---|
| | 22, _ | | 21, _1 | | 11, 11 | | 1_, 12 | | _, 22 | |
| | s, _ | _, s | s, _ | _, s | s, _ | _, s | s, _ | _, s | s, _ | _, s |
| Eq. $C_{S,i}$ (μs) | 204 | 612 | 268 | 804 | 332 | 996 | 352 | 1056 | 376 | 1128 |
| $E_{S,i} + E_{T,i}$ (×10⁻⁶) | 460 | 5764 | 1027 | 7975 | 1594 | 10226 | 2117 | 11269 | 2644 | 12420 |

TABLE 10

| | (L, H) | | | | | | | | | | Energy |
|---|---|---|---|---|---|---|---|---|---|---|---|
| | 22, _ | | 21, _1 | | 11, 11 | | 1_, 12 | | _, 22 | | |
| | s, _ | _, s | s, _ | _, s | s, _ | _, s | s, _ | _, s | s, _ | _, s | (×10⁻⁶) |
| task4 | 15 | | | | | | | | | | 6900 |
| task7 | | | 4 | | 69 | | 1 | | | | 100271 |
| task8 | | | | 2 | 213 | 168 | 1 | | | | 2.076 × 10⁶ |
| task9 | 45 | | | | | | | | | | 20700 |
| task10 | | | 2 | | 5 | 57 | | | | | 606802 |
| task11 | | | | | 6 | 9 | | 1 | | | 112867 |
| task12 | | | 2 | 1 | 5 | | | | | | 17999 |

TABLE 10-continued

| | (L, H) | | | | | | | | | |
|---|---|---|---|---|---|---|---|---|---|---|
| | 22, __ | | 21, _1 | | 11, 11 | | 1_, 12 | | __, 22 | Energy |
| | s, __ | __, s | s, __ | __, s | s, __ | __, s | s, __ | __, s | s, __ | __, s | ($\times 10^{-6}$) |
| task14 | | | 1 | 1 | 14 | 15 | 1 | | | | 186825 |
| task16 | | | | | 234 | 787 | 1 | 2 | | | $8.446 \times 10^6$ |
| task17 | | | | | 20 | 10 | 1 | 1 | | | 147526 |
| task18 | | | | | 2 | 284 | 1 | | | 1 | $2.92 \times 10^6$ |
| | | | | | | | | | Total | | $1.464 \times 10^7$ |

TABLE 11

| | (L, H) | | | | | | | | | |
|---|---|---|---|---|---|---|---|---|---|---|
| | 222, __ | | 221, __1 | | 121, 1_1 | | 12_, 1_2 | | _2_, 2_2 | |
| | s, __ | __, s | s, __ | __, s | s, __ | __, s | s, __ | __, s | s, __ | __, s |
| Eq. $C_{S,i}(\mu s)$ | 204 | 816 | 268 | 1072 | 332 | 1328 | 364 | 1456 | 396 | 1584 |
| $E_{S,i} + E_{T,i}(\times 10^{-6})$ | 588 | 13440 | 1612 | 18496 | 2636 | 23552 | 3628 | 26560 | 4620 | 29568 |

TABLE 12

| | (L, H) | | | | | | | | | | |
|---|---|---|---|---|---|---|---|---|---|---|---|
| | 222, __ | | 221, __1 | | 121, 1_1 | | 12_, 1_2 | | _2_, 2_2 | | Energy |
| | s, __ | __, s | s, __ | __, s | s, __ | __, s | s, __ | __, s | s, __ | __, s | ($\times 10^{-6}$) |
| task4 | 15 | | | | | | | | | | 8820 |
| task7 | | | | | 33 | 7 | 1 | | 1 | | 260100 |
| task8 | | 1 | | | 99 | 154 | 1 | 1 | | | $3.93 \times 10^6$ |
| task9 | 45 | | | | | | | | | | 26460 |
| task10 | | | | | | 25 | | 1 | | 16 | $1.09 \times 10^6$ |
| task11 | | | | 1 | 1 | 8 | | | | | 209548 |
| task12 | 1 | 1 | | | 2 | 1 | | | | | 42852 |
| task14 | | | | | 5 | 14 | 1 | | 1 | | 351156 |
| task16 | | | | | 41 | 639 | 1 | 1 | | | $1.52 \times 10^7$ |
| task17 | | | | | 8 | 11 | 1 | 1 | | | 288408 |
| task18 | | | | | | 74 | 1 | | | 117 | $5.23 \times 10^6$ |
| | | | | | | | | | Total | | $2.665 \times 10^7$ |

TABLE 13

| | (L, H) | | | | | | | | | |
|---|---|---|---|---|---|---|---|---|---|---|
| | 2222, __ | | 2221, __1 | | 1221, 1_1 | | 122_, 1_2 | | _22_, 2_2 | |
| | s, __ | __, s | s, __ | __, s | s, __ | __, s | s, __ | __, s | s, __ | __, s |
| Eq. $C_{S,i}(\mu s)$ | 204 | 1020 | 268 | 1340 | 332 | 1660 | 370 | 1850 | 408 | 2040 |
| $E_{S,i} + E_{T,i}(\times 10^{-6})$ | 716 | 26012 | 2065 | 35297 | 3710 | 44878 | 5309 | 51189 | 6908 | 57500 |

TABLE 14

| | (L, H) | | | | | | | | | | |
|---|---|---|---|---|---|---|---|---|---|---|---|
| | 2222, __ | | 2221, __1 | | 1221, 1_1 | | 122_, 1_2 | | _22_, 2_2 | | Energy |
| | s, __ | __, s | s, __ | __, s | s, __ | __, s | s, __ | __, s | s, __ | __, s | ($\times 10^{-6}$) |
| task4 | 15 | | | | | | | | | | 10740 |
| task7 | | | | 1 | 33 | 7 | | | 1 | | 441681 |
| task8 | | | | 1 | 1 | 57 | 132 | 1 | | | $6.18 \times 10^6$ |
| task9 | 45 | | | | | | | | | | 32220 |
| task10 | | | | 1 | | | | 24 | | 7 | $1.67 \times 10^6$ |

TABLE 14-continued

| | (L, H) | | | | | | | | | | | |
|---|---|---|---|---|---|---|---|---|---|---|---|---|
| | 2222, | | 2221, | 1 | 1221,1 | 1 | 122 ,1 | 2 | 22 ,2 | 2 | Energy |
| | s,_ | _,s | s,_ | _,s | s,_ | _,s | s,_ | _,s | s,_ | _,s | ($\times 10^{-6}$) |
| task11 | | 4 | | | 4 | | | | | | 320700 |
| task12 | | | 1 | 1 | | | 1 | | | 1 | 68584 |
| task14 | | | | 1 | 3 | 11 | | | 1 | | 546993 |
| task16 | | | | 1 | | 437 | | 72 | | 2 | $2.34 \times 10^7$ |
| task17 | | | 6 | 5 | | 5 | | | | | 454722 |
| task18 | | | | | | | | 46 | | 98 | $7.99 \times 10^6$ |
| | | | | | | | | | | Total | $4.11 \times 10^7$ |

TABLE 15

| | Case Number | | | | |
|---|---|---|---|---|---|
| | 1 | 2 | 3 | 4 | 5 |
| Total Energy Cost | 12.2 | 14.64 | 14.64 | 26.65 | 41.1 |

TABLE 16

| | Case Number | | | | |
|---|---|---|---|---|---|
| | 1 | 2 | 3 | 4 | 5 |
| Total Energy Cost | 31.2 | 34.6 | 34.6 | 39.1 | 41.1 |

TABLE 17

| | 1 HW accelerator | | 2 HW accelerators | |
|---|---|---|---|---|
| | Execution Time | Processor Energy | Execution Time | Processor Energy |
| OD | 9 ms | 0.37 mJ | 9 ms | 0.37 mJ |
| BIFS | 24 ms | 0.98 mJ | 24 ms | 0.98 mJ |
| Delivery | 8.1 ms | 0.32 mJ | 16.2 ms | 0.64 mJ |
| Wavelet | 30 ms | 1 mJ | 30 ms | 2 mJ |
| Total | 30 ms | 2.58 mJ | 30 ms | 4 mJ |

TABLE 18

| | 1 HW accelerator | | | 2 HW accelerators | | |
|---|---|---|---|---|---|---|
| ZEBRA | Mem. Accesses | Mem. Size Pre | Mem. Size Post | Mem. Accesses | Mem. Size Pre | Mem. Sixe Post |
| OD | 0.58k | 10 kB | 0.58 kB | 0.58 kB | 10 kB | 0.58 kB |
| BIFS | 2.41k | 41 kB | 2.41 kB | 2.41k | 41 kB | 2.41 kB |
| Delivery | 35.9k | 35.9 kB | 12.4 kB | 71.8k | 71.8 kB | 17 kB |
| Wavelet | 35.9k | 35.9 kB | 12.4 kB | 71.8k | 71.8 kB | 17 kB |
| Total | 174.9k | 86.9 kB | 14.8k | 146k | 193 kB | 19.4k |

| 1 HW accelerator | | 2 HW accelerators | |
|---|---|---|---|
| Energy Pre | Energy Post | Energy Pre | Energy Post |
| 0.78 mJ | 0.16 mJ | 1.54 mJ | 0.19 mJ |

What is claimed is:

1. A method of designing an essentially digital system, the method comprising:
   generating a description of the functionality and timing of the digital system, the description comprising a plurality of tasks;
   determining trade-off task optimization information; and
   designing the essentially digital system based at least upon an optimized description, wherein the optimized description further includes a description of a real-time operating system that uses the trade-off task optimization information,.
   wherein the method is executed on a processor-based system.

2. The method of claim 1, wherein the trade-off task optimization information comprises Pareto task optimization information.

3. The method of claim 1, wherein the description comprises a system-level description wherein non-deterministic behavior of the digital system is modeled by interacting the tasks, while each of the tasks describe part of the deterministic behavior of the digital system.

4. The method of claim 1, wherein determining trade-off task optimization comprises optimizing task concurrency in the description to obtain a task concurrency optimized description that includes partly trade-off task optimization information.

5. The method of claim 4, wherein designing the essentially digital system comprises designing the essentially digital system based at least in part upon the task concurrency optimized description, wherein the task concurrency optimized description further includes a description of a real-time operating system that uses the trade-off task optimization information.

6. A method of designing an essentially digital system, the method comprising:
generating a description of the functionality and timing of the digital system, wherein the description includes a system-level description comprising a plurality of tasks, and wherein the system-level description comprises a multi-thread graph for inter-task descriptions and a control data flow graph for intra-task descriptions;
optimizing the system-level description; and
designing the essentially digital system based in part upon the optimized system-level description,
wherein the method is executed on a processor-based system.

7. The method of claim 6, wherein optimizing the system-level description comprises optimizing task concurrency in the system-level description, thereby obtaining a task concurrency optimized system-level description.

8. The method of claim 6, wherein the optimized system-level description comprises a task concurrency optimized system-level description.

9. The method of claim 8, wherein the task concurrency optimized system-level description further includes a description of a real-time operating system.

10. The method of claim 8, wherein optimizing task concurrency comprises separately performing design-time intra-task scheduling for at least two of the tasks, thereby generating a plurality of intra-task schedules for each of the tasks.

11. The method of claim 10, wherein the plurality of intra-task schedules are subset of all possible intra-task schedules, wherein the subset includes Pareto optimal schedules.

12. The method of claim 10, wherein the digital system comprises at least one processor, and wherein the design-time intra-task scheduling uses processor power consumption optimization information to determine an appropriate scheduling.

13. The method of claim 12, wherein said real-time operating system exploits said multi-voltage character of said processor.

14. The method of claim 5 or 8 wherein optimizing task concurrency comprises designing a run-time scheduler that is part of the real-time operating system, wherein the run-time scheduler dynamically schedules at least two of the plurality of tasks.

15. The method of claim 10, wherein the digital system comprises a plurality of processors, and wherein the design-time intra-task scheduling uses processor power consumption optimization information to assign at least one of the tasks to at least one of the processors.

16. The method of claim 15, wherein at least one processor is a multi-supply voltage processor.

17. The method of claim 16, wherein said real-time operating system exploits said multi-voltage character of said processor.

18. The method of claim 6, wherein the system-level description comprises a grey box system-level description.

19. A method of designing an essentially digital system, the method comprising:
generating a description of the functionality and timing of the digital system, the description comprising a plurality of tasks;
determining trade-off task optimal schedules;
obtaining an optimized description, including trade-off task optimization information, and a subset of the optimized description defining the trade-off task optimization information; and
designing the essentially digital system based on the optimized description,
wherein the method is executed on a processor-based system.

20. The method of claim 19, wherein determining trade-off task optimal schedules comprises:
optimizing task concurrency in the description by separately performing design-time intra-task scheduling for at least two of the tasks to generate a plurality of intra-task schedules for each of the tasks, wherein the plurality of intra-task schedules is a subset of all possible intra-task schedules, the subset including partly trade-off task optimal schedules.

21. The method of claim 19, wherein the description comprises a system-level description wherein non-deterministic behavior of the digital system is modeled by interacting the tasks, while each of the tasks describe part of the deterministic behavior of the digital system.

22. The method of claim 19, wherein the trade-off task optimization comprises Pareto task optimization.

23. The method of claim 19, wherein the optimized description comprises a task concurrency optimized description obtained by optimizing task concurrency.

24. The method of claim 23, wherein optimizing task concurrency comprises separately performing design-time intra-task scheduling for at least two of the tasks, thereby generating a plurality of intra-task schedules for each of the tasks.

25. A method of designing an essentially digital system, the method comprising:
generating a description of the functionality and timing of a digital system, the description comprising a plurality of tasks;
determining trade-off task optimization information; and
designing the essentially digital system based in part upon an optimized description,
wherein non-deterministic behavior of the digital system is modeled by interacting the tasks, wherein each of the tasks describe part of the deterministic behavior of the digital system,
wherein the method is executed on a processor-based system.

26. The method of claim 25, wherein the trade-off task optimization information comprises Pareto task optimization information.

27. The method of claim 25, wherein the description comprises a system-level description wherein non-deterministic behavior of the digital system is modeled by interacting the tasks, while each of the tasks describe part of the deterministic behavior of the digital system.

28. The method of claim 25, wherein determining trade-off task optimization information comprises optimizing task concurrency in the description to obtain a task concurrency optimized description that includes partly trade-off task optimization information.

29. The method of claim 25, wherein the optimized description comprises a task concurrency optimized description obtained by optimizing task concurrency.

30. The method of claim 29, wherein optimizing task concurrency comprises designing a run-time scheduler that is part of the real-time operating system, wherein the real-time operating system is configured to dynamically schedule at least two of the tasks.

31. The method of claim 29, wherein optimizing task concurrency comprises separately performing design-time intra-task scheduling for at least two of the tasks, thereby generating a plurality of intra-task schedules for each of the tasks.

32. A program storage device readable by a machine, tangibly embodying a program of instructions executable by the machine to perform the method, comprising:
- optimizing a description of the functionality and timing of a digital system, wherein the description comprises a plurality of tasks,
- wherein optimizing includes separately performing design-time intra-task scheduling for at least two of the tasks to generate a plurality of intra-task schedules for each of the tasks,
- wherein the plurality of intra-task schedules are a subset of all possible intra-task schedules, and wherein the subset defines partly task trade-off optimization information.

33. The program storage device of claim 32, wherein optimizing a description comprises optimizing a task concurrency description.

34. The program storage device of claim 32, wherein the description comprises a system-level description wherein non-deterministic behavior of the digital system is modeled by interacting the tasks, while each of the tasks describe part of the deterministic behavior of the digital system.

35. The program storage device of claim 32, wherein the trade-off task optimization information comprises Pareto task optimization information.

36. The method of claim 32, wherein the description comprises a system-level description wherein non-deterministic behavior of the digital system is modeled by interacting the tasks, while each of the tasks describe part of the deterministic behavior of the digital system.

37. A program storage device readable by a machine, tangibly embodying a program of instructions executable by the machine to perform the method comprising: selecting one or more schedules for a plurality of tasks from a plurality of partly trade-off task optimal intra-task schedules; and executing one of the tasks in accordance with the selected schedule.

38. The program storage device of claim 37, wherein the trade-off task optimal intra-task schedules comprise Pareto optimal intra-task schedules.

39. A method of designing an essentially digital system, the method comprising:
- generating a description of the functionality and timing of the digital system, the description comprising a plurality of tasks;
- optimizing the description to determine cost cycle budget trade-off information; and
- designing the essentially digital system based at least upon the optimized description, wherein the optimized description further includes a description of a real-time operating system that uses the cost-cycle budget tradeoff information,
- wherein the method is executed on a processor-based system.

40. The method of claim 39, wherein optimizing the description to determine cost cycle budget trade-off information comprises optimizing task concurrency in the description, to obtain a task concurrency optimized description that includes cost-cycle budget tradeoff information.

41. The method of claim 39, wherein the optimized description comprises a task concurrency optimized description obtained by optimizing task concurrency.

42. The method of claim 41, wherein optimizing task concurrency comprises separately performing design-time intra-task scheduling for at least two of the tasks, thereby generating a plurality of intra-task schedules for each of the tasks.

43. A method of designing an essentially digital system, the method comprising:
- generating a system level description of the functionality and timing of the digital system, the system level description comprising a plurality of tasks;
- optimizing the system level description by separately performing design-time intra-task scheduling for at least two of the tasks to generate a plurality of intra-task schedules for each of the tasks, wherein the plurality of intra-task schedules is a subset of all possible intra-task schedules, the subset including cost-cycle budget tradeoff information;
- obtaining a task scheduling optimized description, including cost-cycle budget tradeoff information; and
- designing the essentially digital system based on the task scheduling optimized description,
- wherein the method is executed on a processor-based system.

44. The method of claim 43, wherein the task scheduling optimized description comprises a task concurrency optimized description.

45. The method of claim 43, wherein the system-level description comprises a description of non-deterministic behavior of the digital system is modeled by interacting the tasks, while each of the tasks describe part of the deterministic behavior of the digital system.

46. A program storage device readable by a processor-based system, tangibly embodying a program of instructions executable by the processor-based system machine to perform a method, comprising:
- optimizing a system-level description of the functionality and timing of a digital system, wherein the system-level description comprises a plurality of tasks, wherein optimizing includes separately performing design-time intra-task scheduling for at least two of the tasks to generate a plurality of intra-task schedules for each of the tasks, wherein the plurality of intra-task schedules are a subset of all possible intra-task schedules, and wherein the subset defines cost-cycle budget tradeoff information.

47. The program storage device of claim 46, wherein optimizing a description comprises optimizing a task concurrency description.

48. The program storage device of claim 46, wherein the description comprises a system-level description wherein non-deterministic behavior of the digital system is modeled by interacting the tasks, while each of the tasks describe part of the deterministic behavior of the digital system.

49. A program storage device readable by a processor-based system, tangibly embodying a program of instructions executable by the processor-based system to perform a method comprising:
- selecting one or more schedules for a plurality of tasks from a plurality of intra-task schedules based upon cost-cycle budget tradeoff information; and executing one of the tasks in accordance with the selected schedule.

50. A method of designing an essentially digital system, the method comprising:
- generating a description of the functionality and timing of the digital system, wherein the description includes a system-level description comprising a plurality of tasks; and optimizing the system-level description; and designing the essentially digital system based at least upon the optimized system-level description, wherein non-deterministic behavior of the digital system is modeled by interacting the tasks, while each of the tasks describe part of the deterministic behavior of the digital system and wherein the method is executed on a processor-based system.

51. The method of claim 50, wherein the optimized system-level description comprises a task concurrency system-level description obtained by optimizing task concurrency.

52. The method of claim 51, wherein optimizing task concurrency comprises designing a run-time scheduler that is part of the real-time operating system, wherein the real-time operating system is configured to dynamically schedule at least two of the tasks.

53. The method of claim 50, wherein optimizing task concurrency comprises separately performing design-time intra-task scheduling for at least two of the tasks, thereby generating a plurality of intra-task schedules for each of the tasks.

54. The method of claim 50, wherein the system-level description comprises a grey box system-level description.

55. The method of claim 54, wherein the grey box comprises a multi-thread graph for inter-task descriptions and a control data flow graph for intra-task descriptions.

* * * * *